United States Patent
Iwakiri

(10) Patent No.: US 6,795,488 B1
(45) Date of Patent: Sep. 21, 2004

(54) SPREAD SPECTRUM COMMUNICATION APPARATUS

(75) Inventor: Naohiko Iwakiri, Yokohama (JP)

(73) Assignees: YRP Telecommunications Key Technology Research Laboratories Co., Ltd., Tokyo (JP); Sony Corporation, Tokyo (JP)

(*) Notice: Subject to any disclaimer, the term of this patent is extended or adjusted under 35 U.S.C. 154(b) by 0 days.

(21) Appl. No.: 09/505,967

(22) Filed: Feb. 17, 2000

(30) Foreign Application Priority Data

Mar. 17, 1999 (JP) .......................................... 11-072774
Mar. 17, 1999 (JP) .......................................... 11-072775
Mar. 17, 1999 (JP) .......................................... 11-072776

(51) Int. Cl.[7] .......................... H04B 1/707; H04B 7/216
(52) U.S. Cl. ...................................... 375/148; 370/342
(58) Field of Search ................................ 375/141, 144, 375/147, 148, 346, 347, 349; 370/320, 335, 342, 441; 455/65, 303

(56) References Cited

U.S. PATENT DOCUMENTS

| | | | | |
|---|---|---|---|---|
| 5,799,004 A | * | 8/1998 | Keskitalo et al. | 370/335 |
| 6,157,685 A | * | 12/2000 | Tanaka et al. | 375/148 |
| 6,404,760 B1 | * | 6/2002 | Holtzman et al. | 370/342 |
| 6,473,415 B1 | * | 10/2002 | Kim et al. | 375/346 |

FOREIGN PATENT DOCUMENTS

| | | |
|---|---|---|
| JP | 62-135017 | 6/1987 |
| JP | 9-247045 | 9/1997 |
| JP | 10-150378 | 6/1998 |

* cited by examiner

Primary Examiner—Betsy L. Deppe
(74) Attorney, Agent, or Firm—Lowe Hauptman Gilman & Berner, LLP

(57) ABSTRACT

A searcher detecting signal indicating conditions of propagation paths is detected from incoming waves of a pilot signal transmitted at the highest electric power. In a RAKE reception for one code channel, an interference replica signal functioning as an interference signal for an incoming wave of the code channel to be demodulated in one finger unit is produced from reference signals produced in the other finger units and the searcher detecting signal, an interference removal is performed for a receiving signal according to the interference replica signal, and the demodulation of the RAKE reception is performed. In the demodulation based on a plural code channel, a reference signal is produced in one of the finger units, an interference replica signal is produced from the reference signal and the searcher detecting signal, an interference removal is performed for the receiving signal according to the interference replica signal, and the demodulation based on the plural code channel is performed. Accordingly, a service of a high speed data transmission can be performed without increasing an occupied band as well as a service mainly performing a low speed data transmission.

8 Claims, 30 Drawing Sheets

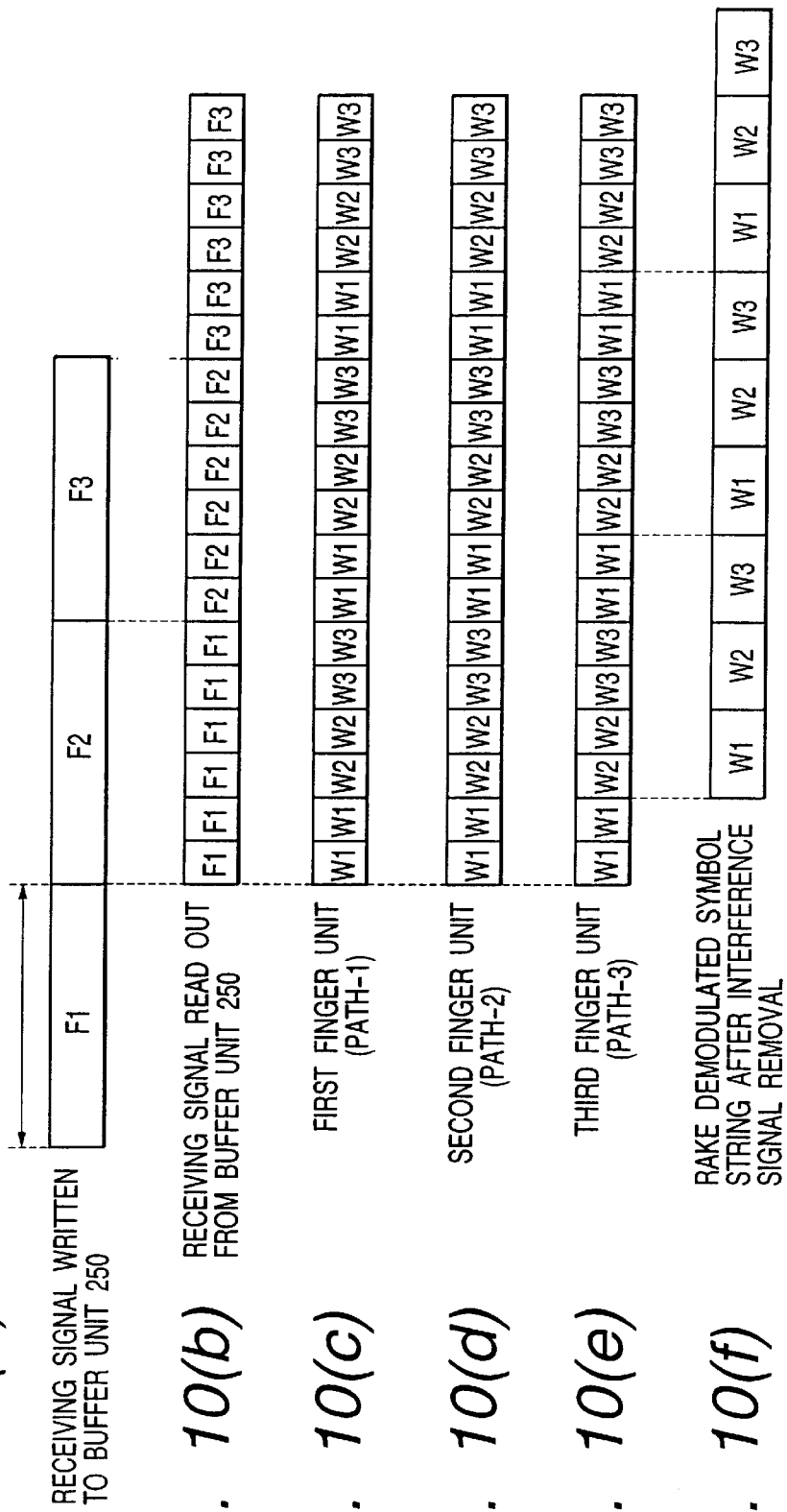

FIG. 11A

| FINGER UNIT CHANNEL (POWER) | INFORMATION OF TRANSMISSION DATA FORMAT |
|---|---|
| PILOT CH (0dB) | |
| 1ST DATA CH1 (-9dB) | a[0] a[1] a[2] a[3] a[4] a[5] a[6] a[7] a[8] a[9] a[10] a[11] a[12] a[13] a[14] a[15] |
| 2ND DATA CH2 (-9dB) | a[0] a[1] a[2] a[3] a[4] a[5] a[6] a[7] a[8] a[9] a[10] a[11] a[12] a[13] a[14] a[15] |
| 3RD DATA CH3 (-9dB) | a[0] a[1] a[2] a[3] a[4] a[5] a[6] a[7] a[8] a[9] a[10] a[11] a[12] a[13] a[14] a[15] |

FINGER ALLOCATING INFORMATION

FIG. 11B

| FINGER UNIT CHANNEL (POWER) | INFORMATION OF TRANSMISSION DATA FORMAT |
|---|---|
| PILOT CH (0dB) | |
| 1ST DATA CH1 (-3dB) | c[0] c[1] c[2] c[3] |
| 2ND DATA CH2 (-9dB) | a[0] a[1] a[2] a[3] a[4] a[5] a[6] a[7] a[8] a[9] a[10] a[11] a[12] a[13] a[14] a[15] |
| 3RD DATA CH3 (-9dB) | a[0] a[1] a[2] a[3] a[4] a[5] a[6] a[7] a[8] a[9] a[10] a[11] a[12] a[13] a[14] a[15] |

FINGER ALLOCATING INFORMATION

FIG. 11C

| FINGER UNIT CHANNEL (POWER) | INFORMATION OF TRANSMISSION DATA FORMAT |
|---|---|
| PILOT CH (0dB) | |
| 1ST DATA CH1 (-3dB) | c[0] c[1] c[2] c[3] |
| 2ND DATA CH2 (-6dB) | b[0] b[1] b[2] b[3] b[4] b[5] b[6] b[7] |
| 3RD DATA CH3 (-9dB) | a[0] a[1] a[2] a[3] a[4] a[5] a[6] a[7] a[8] a[9] a[10] a[11] a[12] a[13] a[14] a[15] |

FINGER ALLOCATING INFORMATION

INTEGRATION TIME PERIOD=Tc[X]
(IN SYNCHRONIZATION HOLDING UNIT 450)

REFERENCE SIGNAL IS SET TO Sa[X] FOR a[X]
REFERENCE SIGNAL IS SET TO Sb[X] FOR b[X]

MEASURED VALUE=SETTING VALUE

INTEGRATION TIME PERIOD=Tc[X]
(IN SYNCHRONIZATION HOLDING UNIT 450)

REFERENCE SIGNAL IS SET TO Sc[X]/4 FOR a[X]
REFERENCE SIGNAL IS SET TO Sc[X]/2 FOR b[X]

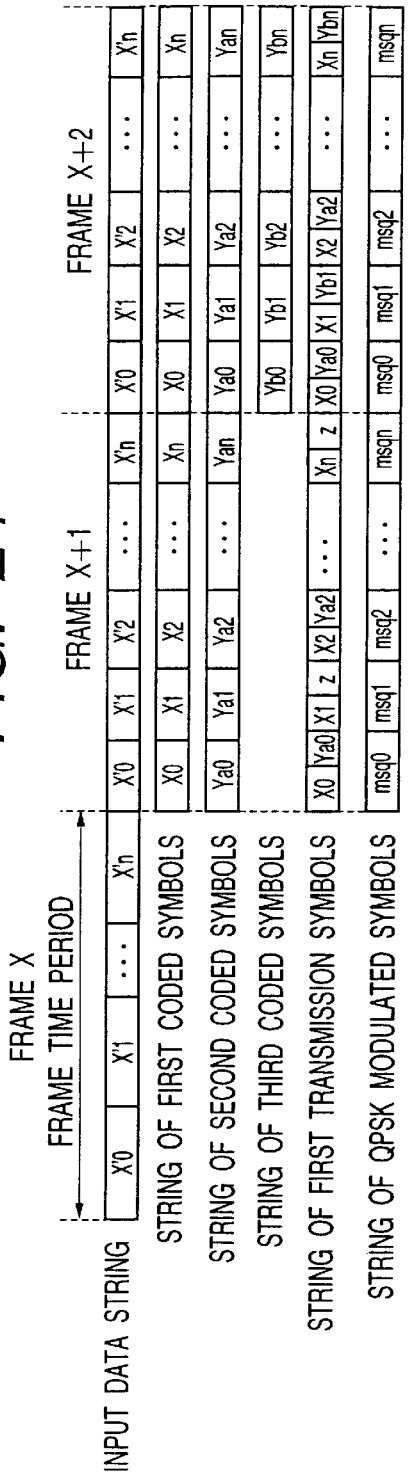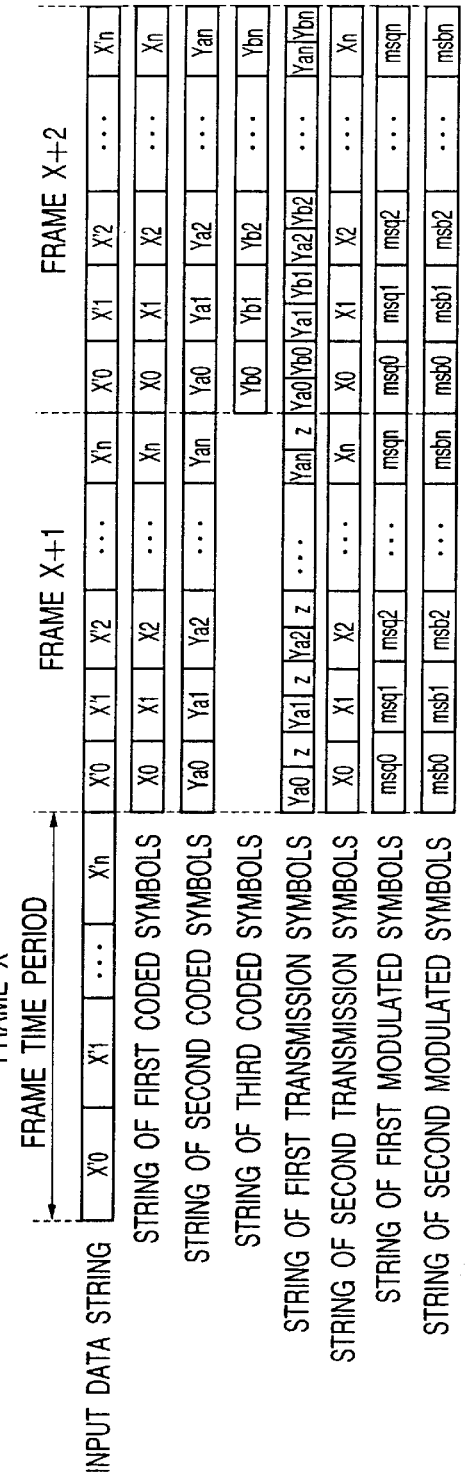

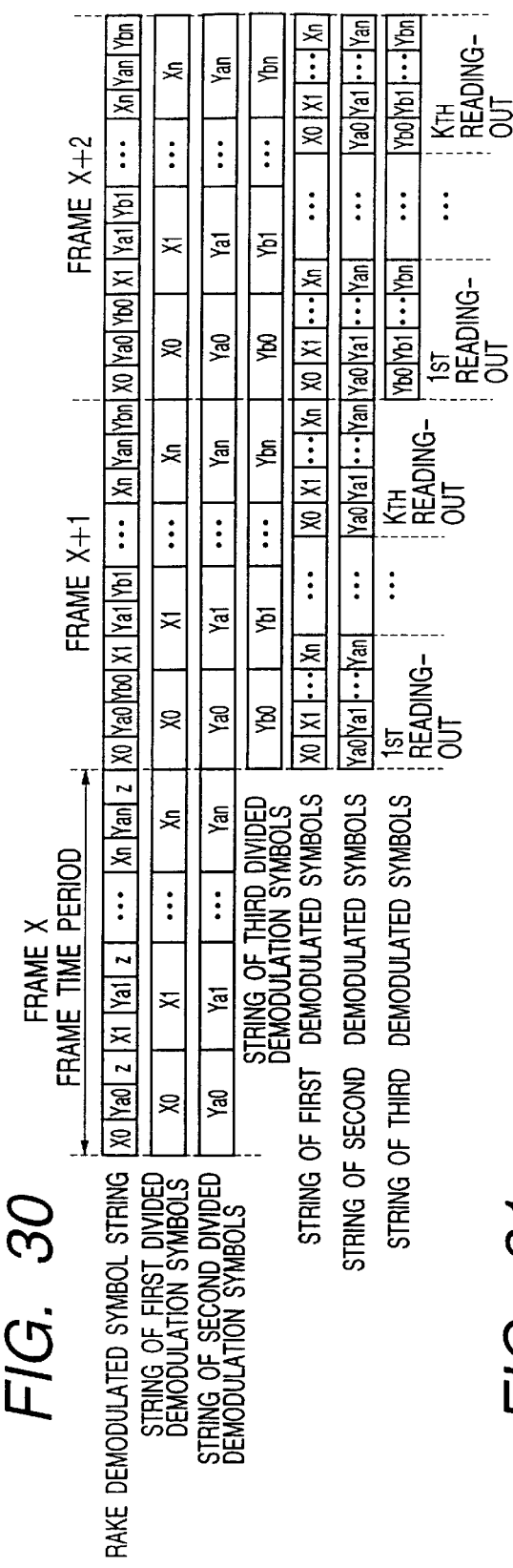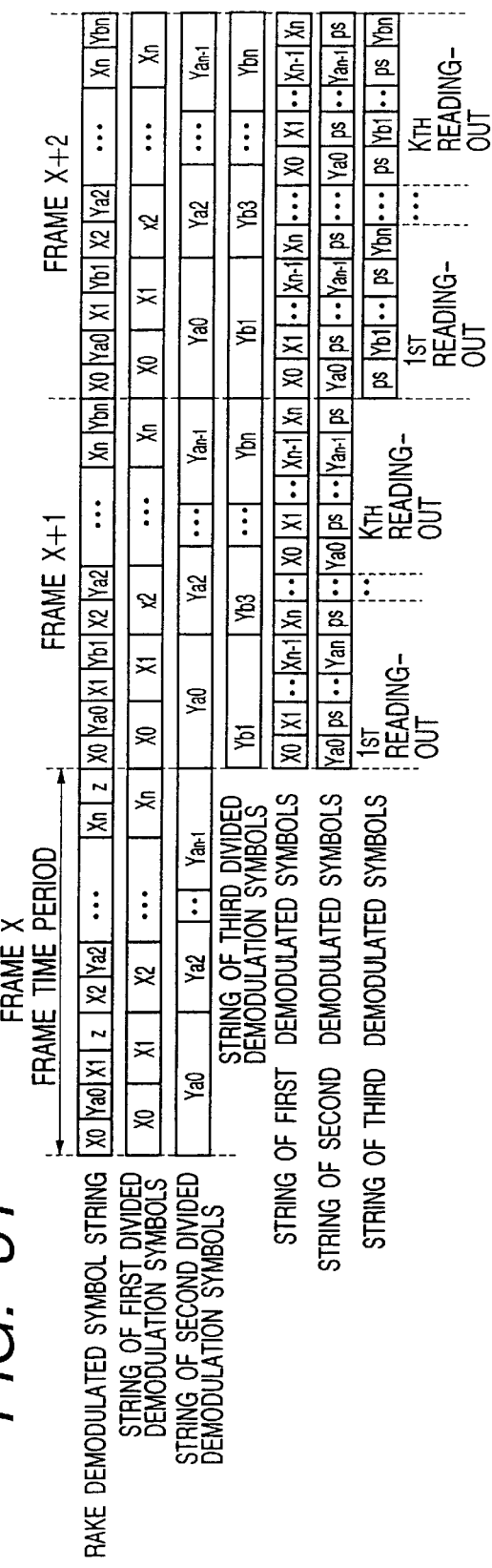

SPREAD SPECTRUM COMMUNICATION APPARATUS

BACKGROUND OF THE INVENTION

1. Field of the Invention

The present invention relates to a spread spectrum communication apparatus in which a spread spectrum signal obtained by performing a code division multiplex with orthogonal codes for transmission data is transmitted and the spread spectrum signal is received to reproduce the transmission data.

2. Description of the Related Art

To transmit data of a plurality of channels, a division multiplex is generally performed for the data. As a method of the division multiplex, a frequency division multiplex (FDM) method, a time division multiplex (TDM) method and a code division multiplex (CDM) method are well-known.

In the CDM method, a time-frequency-power space, in which orthogonal codes are spread, is divided into a plurality of sub-spaces corresponding to code channels along the power axis, an orthogonal transformation for data of each code channel is performed by using an orthogonal code spreading within one limited power zone of the time-frequency-power space, so that orthogonally-transformed transmission data is obtained for each code channel. Because a data rate and a weighting rate can be easily set for the transmission data for each code channel in the CDM method, this CDM method is appropriate for a hierarchical transmission.

In the CDM method used for a broadcasting field, a plurality of code channels are used for broadcast data, a weighting factor applied for the broadcasting data is set for each code channel, a broadcast signal is transmitted to a receiving side through each code channel, and the number of code channels, through which the broadcast signals added to each other on the receiving side are transmitted, is adjusted according to the quality of the broadcast signals received on the receiving side. Therefore, a graceful degradation for the broadcast data can be performed. A digital video signal transmission method performed in this graceful degradation has been studied for practical use.

In a mobile communication field, IS-95 method standardized as a code division multiple access (CDMA) cellular telephone system, in which a direct sequence (DS) type spread spectrum is used, is well-known. In this IS-95 method, code channels such as a control code channel and a communication code channel are used, control information and audio information are orthogonally coded with an orthogonal code in each code channel on a transmission side, the orthogonally coded information transmitted from the transmission side through one code channel is demodulated according to a communication procedure on a receiving side in a RAKE reception using a plurality of fingers, so that a communication quality for the control information and the audio information can be improved.

The RAKE reception is briefly described. The RAKE reception is a signal receiving processing peculiar to a spread spectrum communication method, and a path diversity reception can be performed in the RAKE reception.

In a digital communication such as a spread spectrum communication method, when a transmission signal is transmitted from a transmission side, a direct incoming wave directly incoming from the transmission side and a reflected wave transmitted from the transmission side while being reflected by buildings are generally received on a receiving side. In this case, because there are many paths for the reflected wave, a plurality of reflected incoming waves passing many transmission paths are received as a receiving signal on the receiving side. Therefore, a plurality of incoming waves, which each have a propagation delay time depending on the transmission path, are received on the receiving side. As a result, the incoming waves originated in the transmission signal interfere with each other, so that a receiving disturbance occurs on the receiving side.

However, in cases where a pseudo noise (PN) code used for the spread spectrum of the transmission signal is offset in point of time, a correlation among PN codes corresponding to various offsets (or phase offsets) is not obtained. This phenomenon that the correlation among the PN codes is not obtained is utilized to avoid the receiving disturbance occurring in a receiving signal composed of a plurality of incoming waves. In detail, in cases where a despread spectrum is performed for the receiving signal with a PN code in a despread spectrum unit of the receiving side after a phase offset corresponding to the propagation delay time of a particular incoming wave is given to the PN code, the despread spectrum is successfully performed only for the particular incoming wave, and the despread spectrum is not performed for the other incoming waves. Therefore, a despread spectrum can be selectively performed for each incoming wave without the interference of the incoming waves with each other by giving a phase offset corresponding to the propagation delay time of each incoming wave to the PN code.

Accordingly, in cases where a plurality of despread spectrum units are arranged in parallel to each other, a despread spectrum can be simultaneously performed for a plurality of incoming waves having different propagation delay times in the despread spectrum units by giving a phase offset corresponding to the propagation delay time of each incoming wave to the PN code in each despread spectrum unit, and a plurality of despread spectrum signals independent of each other can be obtained from the incoming waves.

The despread spectrum signals are weighted with weighting factors and are added to each other in an addition unit, so that a superior demodulated signal corresponding to the transmission signal can be obtained.

The spread spectrum signal receiving method described above is called a RAKE reception. Because a plurality of incoming waves of a receiving signal passing through different paths are selectively inverse-spread and are added to each other, the RAKE reception can be applied for a path-diversity reception.

Also, a W-CDMA method, in which a wide frequency band is used, is useful as a third generation type radio access method. In this W-CDMA method, a communication of audio data, video data and control data has been proposed by dividing the time-frequency-power space into a plurality of code channels in the code division multiplex.

3. Problems to be Solved by the Invention

In the digital video signal transmission method and the CDMA cellular telephone system described above, the number of code channels allocated to each user is generally fixed, and the incoming waves of the allocated code channels are demodulated in a demodulating unit of each user.

However, in the mobile communication field, though a service performing a high speed data transmission is required as well as a service mainly performing a low speed data transmission such as an audio data transmission, because the high speed transmission is performed in a conventional spread spectrum communication by heightening a data transmission rate for each code channel, there is a problem that an occupied zone for each code channel is increased. Therefore, it is difficult to perform the high speed data transmission in the conventional spread spectrum communication.

Also, conditions of each propagation path change with time in the mobile communication because of a selective fading and a non-selective fading occurring in the transmission signal and an interference between transmission signals of non-synchronized code channels, so that there is a problem that a communication quality for the receiving signal is degraded.

Also, to perform a data transmission based on the CDMA without widening a transmission band of each code channel, a data transmission method, in which a plurality of code channels are allocated to each user, is known. In this case, a degree of interference between the signals of the code channels is increased. Also, in cases where the number of code channels allocated to each user and a transmission electric power per code channel are adaptively changed or in cases where a plurality of code channels are used by a plurality of users, a degree of the interference is not stable, and it is required to hold the synchronization with each transmission signal even though the interference degree is changed. In addition, conditions of each propagation path change with time in the mobile communication because of a selective fading and a multipath fading occurring in the transmission signal and an interference between transmission signals of difference users, there is a problem that it is required to keep a signal electric power Eb/No standardized by a noise electric power No to a value more than a prescribed value for the purpose of holding a stable communication quality on the receiving side. Here, the symbol Eb denotes an energy per a bit.

In a radio communication system, an error control technique using a set of convolutional code and Viterbi decode or a set of error correcting code and Viterbi decode is mainly used to improve a communication quality. Also, the using of a Turbo code has been researched to obtain a higher coding gain, and the adopting of the Turbo code in the W-CDMA method has been examined. For example, in cases where the Turbo code is used in a static characteristic condition such as a white Gaussian noise (WGN) environment, it is reported that a superior characteristic such as a bit error rate (BER) $<10^{-5}$ is obtained even though a low signal electric power Eb/No<2 dB is set. However, in cases where a communication is performed at a low signal electric power such as Eb/No<2 dB, there is a problem that it is difficult to stably hold a synchronization with a receiving signal and to stably perform a phase detection for the transmission signal in a synchronized condition.

SUMMARY OF THE INVENTION

A first object of the present invention is to provide, with due consideration to the drawbacks of such a conventional spread spectrum communication apparatus, a spread spectrum communication apparatus in which a service of a high speed data transmission is performed without increasing an occupied band as well as a service mainly performing a low speed data transmission such as an audio data transmission.

A second object of the present invention is to provide a spread spectrum communication apparatus in which a service of a high speed data transmission is performed at a high quality in a low signal electric power (Eb/No) environment as well as a service mainly performing a low speed data transmission such as an audio data transmission while stably holding a synchronization with a transmission signal in the low signal electric power Eb/No environment and stably performing a phase detection for the transmission signal in a synchronized condition.

A third object of the present invention is to provide a spread spectrum communication apparatus, made of a coding apparatus using the Turbo code and a decoding apparatus, appropriate for an error control to perform a service of a high speed data transmission at a high quality as well as a service mainly performing a low speed data transmission such as an audio data transmission.

The first object is achieved by the provision of a spread spectrum communication apparatus comprising:

a spread spectrum signal transmitting apparatus for allocating a plurality of distinguishing codes to a plurality of code channels in one-to-one correspondence, producing a modulated symbol string from each of pieces of input data according to a data speed of the piece of input data, transforming each modulated symbol string with one distinguishing code allocated to one code channel to produce a piece of output data corresponding to the code channel for each code channel on condition that the piece of output data corresponding to each code channel is distinguishable from the pieces of output data of the other code channels according to the distinguishing codes, performing a spread spectrum for the pieces of output data of the code channels with a spread code sequence to produce spread output data, and transmitting the spread output data and channel information; and a spread spectrum signal receiving apparatus for receiving the channel information from the spread spectrum signal transmitting apparatus and receiving the spread output data of the code channels transmitted from the spread spectrum signal transmitting apparatus as a receiving signal composed of a plurality of incoming waves transmitted through a plurality of propagation paths, the spread spectrum signal receiving apparatus comprising:

searching means for searching the receiving signal for a plurality of specific incoming waves of a specific code channel according to the channel information, detecting a plurality of receiving electric powers of the specific incoming waves and a plurality of phase offsets of the specific incoming waves to search the receiving signal for conditions of the propagation paths, and outputting a searcher detecting signal indicating the receiving electric powers of the specific incoming waves and the phase offsets of the specific incoming waves;

signal holding means for holding the receiving signal during an interference removing operation;

one or more finger units respectively having
inverse code transforming means for detecting a receiving electric power of a particular incoming wave, which corresponds to the specific code channel and a particular phase offset allocated to the finger unit, from the receiving signal directly received from the spread spectrum signal transmitting apparatus according to the channel information and the searcher detecting signal output from the searching means in the interference removing operation, specifying the spread code sequence and one particular distinguishing code corresponding to one particular code channel allocated to the finger unit according to the channel information, performing an inverse code transformation for the receiving signal with the particular distinguishing code and the spread code sequence in an interference-removed demodulating operation to produce an inversely code transformed signal from the output data of the particular code channel distinguished by the particular distinguishing code, and demodulating means for demodulating the inversely code transformed signal produced by the inverse code transforming means to produce a finger demodulated symbol string of the particular code channel allocated to the finger unit;

interference electric power detecting means for selecting the specific code channel, of which the specific incoming waves have a high interference removing effect, from the code channels according to the channel information, receiving the particular incoming waves from the finger units, receiving the specific incoming waves from the searching means, determining a plurality of weighting factors corresponding to all specific incoming waves of the specific code channel according to the receiving electric powers of the particular incoming waves and a plurality of receiving electric powers of one or more specific incoming waves other than the particular incoming waves, weighting the particular incoming waves and the specific incoming waves other than the particular incoming waves with the corresponding weighting factors, and performing a despread spectrum for the particular incoming waves other than one particular incoming wave detected in one finger unit and the specific incoming waves other than the particular incoming waves detected by all finger units with the spread code sequence corresponding to the phase offset of each particular incoming wave or specific incoming wave to produce an interference replica signal corresponding to the finger unit for each of the finger units;

signal allocating means for allocating the receiving signal directly transmitted from the spread spectrum signal transmitting apparatus to the finger units in the interference removing operation and allocating an interference removed receiving signal, which is obtained by subtracting the interference replica signal corresponding to one finger unit from the receiving signal held by the signal holding means, to the finger unit as the receiving signal in the interference-removed demodulating operation for each of the finger units;

channel synthesizing means for synthesizing a demodulated symbol string from the finger demodulated symbol strings produced by the finger units;

decoding means for decoding the demodulated symbol string synthesized by the channel synthesizing means to reproduce the input data of the particular code channels allocated to the finger units; and control means for controlling the finger units, the interference electric power detecting means and the signal allocating means according to the channel information and the conditions of the propagation paths detected by the searching means to allocate the particular code channel to each finger unit according to the channel information, allocate the particular phase offset detected by the searching means to each finger unit, transmit the receiving signal directly transmitted from the spread spectrum signal transmitting apparatus to the finger units in the interference removing operation and transmit the interference removed receiving signal produced by the interference electric power detecting means to the corresponding finger unit in the interference-removed demodulating operation for each of the interference-removed demodulating operation, wherein, in cases where the allocation of one particular code channel to all finger units is indicated by the channel information, the same particular code string corresponding to the particular code channel is selected from the code strings in the finger units according to the channel information under the control of the control means to perform an inverse code transformation with the same particular distinguishing code in each of the finger units, the phase offsets corresponding to the specific incoming waves detected by the searching means are allocated to the finger units in the order of decreasing the receiving electric power of the specific incoming wave under the control of the control means, and the demodulation of a RAKE reception is performed in the finger units, and wherein, in cases where the allocation of a plurality of particular code channels to all finger units is indicated by the channel information, the particular distinguishing code corresponding to the particular code channel allocated to one finger unit is specified in the finger unit according to the channel information under the control of the control means for each of the finger units, a particular phase offset corresponding to the highest receiving electric power is selected from the phase offsets of the specific incoming waves detected by the searching means and is allocated to the finger units under the control of the control means, and the demodulations in the finger units are serially performed.

In the above configuration, spread output data of one or more code channels are transmitted from the spread spectrum signal transmitting apparatus to the spread spectrum signal receiving apparatus. Also, spread output data of a specific code channel (for example, a pilot channel) is output from the transmitting apparatus at a high electric power. Also, channel information indicating the specific code channel and one or more particular code channels to be allocated to the fingers of the receiving apparatus is transmitted from the transmitting apparatus to the receiving apparatus.

In the receiving apparatus, the spread output data is received as the receiving signal. In this case, because the spread output data pass through many propagation paths while being reflected by buildings, the receiving signal has a plurality of incoming waves corresponding to the propagation paths for each code channel. To search the receiving signal for conditions of the transmission paths, a plurality of receiving electric powers of specific incoming waves of the specific code channel and a plurality of phase offsets of the specific incoming waves are detected as a searcher detecting signal by the searching means.

Thereafter, an interference removing operation is performed under the control of the control means to perform an interference removing operation. In detail, the receiving signal transmitted from the spread spectrum signal transmitting apparatus is input to the finger units through the signal allocating means. Also, a particular code channel is allocated to each finger unit according to the channel information, and a particular phase offset detected by the searching means is allocated to each finger unit. In each finger unit, a receiving electric power of a particular incoming wave corresponding to the specific code channel and the particular phase offset is detected from the receiving signal. Thereafter, in the interference electric power detecting means, the specific code channel is selected from the code channels because the specific incoming waves of the specific code channel have a high interference removing effect, a plurality of weighting factors corresponding to all specific incoming waves of the specific code channel are determined according to the receiving electric powers of the specific incoming waves, the particular incoming waves and the specific incoming waves other than the particular incoming waves are weighted with the corresponding weighting factors, a despread spectrum is performed for the particular incoming waves other than one particular incoming wave detected in one finger unit and the specific incoming waves other than the particular incoming waves detected by all finger units with the spread code sequence, and an interference replica signal corresponding to the finger unit is produced for each of the finger units. The interference replica signal corresponding to one finger unit inversely influences on an inversely code transformed signal to be produced in the finger unit in an interference-removed demodulating operation as an interference signal.

In the interference-removed demodulating operation, the interference replica signal corresponding to each finger unit is subtracted from the receiving signal of the signal holding means by the signal allocating means to produce an interference removed receiving signal, and the interference removed receiving signal corresponding to one finger unit is transmitted to the finger unit for each of the finger units. In each finger unit, the particular distinguishing code corresponding to the particular code channel allocated to the finger unit is specified according to the channel information, an inverse code transformation is performed for the receiving signal with the particular distinguishing string and the spread code sequence to produce an inversely code transformed signal, and the inversely code transformed signal is demodulated to produce a finger demodulated symbol string. Thereafter, a demodulated symbol string is synthesized from the finger demodulated symbol strings corresponding to the finger units by the channel synthesizing means, and the demodulated symbol string is decoded by the decoding means to reproduce the input data.

Accordingly, because the phase offsets of the specific incoming waves of the specific code channel are detected by the searching means, the particular phase offset selected from the phase offsets can be accurately allocated to each finger unit. Also, because the receiving electric powers of the specific incoming waves of the specific code channel are detected by the searching means, the interference replica signal corresponding to each finger unit can be produced from the specific incoming waves of the specific code channel having the high interference removing effect, so that the specific incoming waves of the specific code channel most influencing on the demodulation of the receiving signal as an interference signal can be removed from the receiving signal by subtracting the interference replica signal from the receiving signal for each finger unit. Therefore, in cases where the demodulation of the RAKE reception is performed in the finger units because the same code channel is allocated to all finger units, the receiving signal can be demodulated at a high quality. Also, in cases where the demodulation of a plural code channel is performed in the finger units because a plurality of particular code channels allocated to all finger units are different from each other, the demodulations in the finger units for the particular code channels can be performed in parallel to each other at a high quality. That is, a service of a high speed data transmission is performed without increasing an occupied band as well as a service mainly performing a low speed data transmission such as an audio data transmission.

It is preferred that the channel information indicate an importance degree of each code channel, and the number of finger units, to which one particular code channel is allocated, depends on the importance degree of the particular code channel.

In this spread spectrum communication apparatus, the number of finger units corresponding to one code channel can be set according to the importance degree of the code channel.

It is also preferred that the channel information indicate an importance degree of each code channel, and it is judged by the control means whether or not the interference removing operation for one particular code channel allocated to each finger unit is performed according to the importance degree of the particular code channel.

In this spread spectrum communication apparatus, the interference removing operation can be performed for a particular code channel in cases where the control means judges the necessity of the interference removing operation according to the importance degree of the particular code channel.

It is also preferred that the interference removing operation for one finger unit be performed for each finger unit in cases where the control means judges, according to the channel information, the receiving electric powers of the particular incoming waves other than one particular incoming wave detected in the finger unit and the receiving electric powers of the specific incoming waves other than the particular incoming waves detected by all finger units, that the interference removing effect is high.

In this spread spectrum communication apparatus, the interference removing operation can be performed for each finger unit in cases where the interference removing effect is high.

It is also preferred that the control means obtain transmission electric powers of the piece of output data transmitted through the code channels and a multiplexing type performed for the pieces of output data in the spread spectrum signal transmitting apparatus from the channel information, the specific code channel having the highest interference removing effect is found out from the code channels according to the transmission electric powers of the piece of output data by the control means, and the interference replica signal is produced from the specific incoming waves of the specific code channel by the interference electric power detecting means.

In this spread spectrum communication apparatus, because the specific code channel having the highest interference removing effect is found out according to the transmission electric powers of the piece of output data, the interference removing operation can be performed according to the interference replica signal to perform the demodulation of the receiving signal at a high quality.

The first object is also achieved by the provision of a spread spectrum communication apparatus comprising:

a plurality of finger units respectively having
despread spectrum performing means for performing a despread spectrum for receiving data of one code channel allocated to the finger unit, and
inverse code transformation performing means for inversely performing a code transformation for the receiving data output from the despread spectrum performing means to produce a finger demodulated symbol string corresponding to the finger unit;

channel synthesizing means for synthesizing a demodulated symbol string from the finger demodulated symbol strings produced in the finger units;

interference replica signal prducing means for producing an interference replica signal functioning as an interference signal for the demodulation of the transmission data processed in one finger unit for each finger unit;

receiving signal storing means for storing a receiving signal in which pieces of receiving data of a plurality of code channels are included; and signal allocating means for selecting the receiving data to be allocated to each finger unit from the receiving signal directly received from a transmitting apparatus in an interference removing operation, selecting the receiving data to be allocated to each finger unit from the receiving signal stored in the receiving signal storing means in a demodulating operation and allocating the receiving data to each finger unit in the interference removing operation and the demodulating operation, wherein the interference removing operation and the demodulation of a RAKE reception performed in the finger units and the synthesizing of the demodulated symbol string performed by the channel synthesizing means are performed for each code channel, and the interference removing operation and the outputting of the receiving data read out from the receiving signal storing means to each finger unit through the signal allocating means are repeated until the pieces of receiving data of all code channels are demodulated.

In the above configuration, because the interference removing operation is performed, the demodulation of a RAKE reception can be performed at a high reliability for each code channel allocated to the finger units.

The second object is achieved by the provision of a spread spectrum communication apparatus comprising:

a spread spectrum signal transmitting apparatus for allocating a plurality of distinguishing codes to a plurality of code channels composed of one or more data channels and a pilot channel in one-to-one correspondence, producing a modulated symbol string from a piece of input data corresponding to a processing gain of a processing gain time-period according to a data speed of the piece of input data for each of pieces of input data, transforming each modulated symbol string with one distinguishing code allocated to one data channel to produce a piece of output data corresponding to the data channel for each data channel on condition that the piece of output data corresponding to each data channel is distinguishable from the pieces of output data of the other data channels according to the distinguishing codes, preparing a pilot signal composed of known data, transforming the pilot signal with the distinguishing code allocated to the pilot channel to produce a piece of output data corresponding to the pilot channel on condition that the piece of output data corresponding to the pilot channel is distinguishable from the pieces of output data of the data channels according to the distinguishing codes, and transmitting the pieces of output data of the code channels and channel information; and a spread spectrum signal receiving apparatus for receiving the channel information from the spread spectrum signal transmitting apparatus and receiving the pieces of output data of the code channels transmitted from the spread spectrum signal transmitting apparatus as a receiving signal, the spread spectrum signal receiving apparatus comprising:

one or more finger units for respectively receiving the receiving signal transmitted from the spread spectrum signal transmitting apparatus and respectively demodulating the output data of one particular data channel included in the receiving signal according to the channel information transmitted from the spread spectrum signal transmitting apparatus;

decoding means for decoding the pieces of output data demodulated in the finger units to reproduce the pieces of input data of one or more particular data channels allocated to the finger units; and control means for allocating the particular data channel to each finger unit according to the channel information transmitted from the spread spectrum signal transmitting apparatus, detecting the processing gain of the output data corresponding to the particular data channel allocated to each finger unit as a particular processing gain of each finger unit according to the channel information and controlling the finger units and the decoding means according to the channel information, each finger unit comprising:

first inverse code transforming means for distinguishing the output data of the pilot channel from the other pieces of output data of the code channels with the distinguishing code allocated to the pilot channel according to the channel information and inversely performing a code transformation for the output data of the pilot channel to produce an inverse transformed pilot signal;

frequency error assuming means for assuming an original frequency error from the inverse transformed pilot signal produced by the first inverse code transforming means in a particular processing gain time period corresponding to the particular processing gain of the finger unit detected by the control means, outputting the original frequency error as frequency error assumption information in cases where the particular processing gain corresponding to the finger unit accords with a referential processing gain, assuming a referential frequency error in a referential processing gain time period of a referential processing gain from the inverse transformed pilot signal in cases where the particular processing gain corresponding to the finger unit is lower than the referential processing gain, comparing the original frequency error and the referential frequency error, outputting the referential frequency error as frequency error assumption information in cases where the original frequency error is larger than the referential frequency error, and outputting the original frequency error as frequency error assumption information in cases where the original frequency error is equal to or smaller than the referential frequency error;

synchronization holding means for producing a synchronization timing signal, which is synchronized with the output data of the pilot channel distinguished by the first inverse code transforming means, according to the frequency error assumption information output from the frequency error assuming means;

second inverse code transforming means for distinguishing the output data of the particular data channel allocated to the finger unit from the other pieces of output data of the code channels with the distinguishing code allocated to the particular data channel according to the channel information and inversely performing a code transformation for the output data of the particular data channel to produce an inverse transformed data signal; and demodulating means for demodulating the inverse transformed data signal produced by the second inverse code transforming means, while holding a synchronization with the inverse transformed data signal according to the synchronization timing signal produced by the synchronization holding means, to produce a finger demodulation symbol corresponding to the finger unit, the finger demodulation symbol demodulated in the finger units being decoded by the decoding means.

In general, in cases where noises or fading in a propagation path between the transmitting apparatus and the receiving apparatus change with time, a frequency error changing with time occurs in the receiving signal. Therefore, it is difficult to hold a synchronization with the receiving signal in the receiving apparatus. In the present invention, the frequency error occurring in the pilot signal composed of known data is always detected in a processing gain time period of a processing gain of output data corresponding to a data channel allocated to each finger unit, and the output data is demodulated while holding the synchronization with the output data according to the detected frequency error.

However, in cases where the change of noises or fading in the propagation path is large, because the frequency error greatly irregularly changes with time, it is difficult to stably holding the synchronization with the output data. One reason that the frequency error occurs in the propagation path is a Doppler frequency (about 100 Hz) based on the Doppler effect in a mobile communication. Because a data rate in a high speed data transmission is more than 1 Mbps and because a data rate for each code channel is more than several tens Kbps, the data rate is greatly higher than the Doppler frequency. Also, noises in the propagation path are regarded as the white Gaussian noise. Therefore, it is better to detect the frequency error occurring in the pilot signal in a referential processing gain time period longer than the processing gain time period corresponding to the output data, so that the synchronization with the output data can be stably held. Here, a referential processing gain is largest among various processing gains, and the referential processing gain time period of the referential processing gain is longest among various processing gain time periods of the processing gain time periods.

In the above configuration of the spread spectrum communication apparatus, an inverse transformed pilot signal is produced from the output data of the pilot channel by the first inverse code transforming means, and an original frequency error of the output data of the pilot channel is assumed from the inverse transformed pilot signal, in the frequency error assuming means, in a particular processing gain time period corresponding to a particular processing gain of output data of a particular code channel allocated to a corresponding finger unit. Thereafter, in cases where the particular processing gain accords with a referential processing gain, the original frequency error is output as frequency error assumption information regardless of whether the change of noises or fading in a particular propagation path corresponding to both the output data of the pilot channel and the output data of the particular code channel is large.

In contrast, in cases where the particular processing gain corresponding to the finger unit is lower than the referential processing gain, a referential frequency error is assumed from the inverse transformed pilot signal, in the frequency error assuming means, in a referential processing gain time period of a referential processing gain, the original frequency error and the referential frequency error is compared each other. In cases where the original frequency error is larger than the referential frequency error, because the change of noises or fading in the particular propagation path is large, the referential frequency error is output as frequency error assumption information. In contrast, in cases where the original frequency error is equal to or smaller than the referential frequency error, because the change of noises or fading in the particular propagation path is small, the original frequency error is output as frequency error assumption information.

Thereafter, a synchronization timing signal synchronized with the output data of the pilot channel is produced according to the frequency error assumption information in the synchronization holding means, an inverse transformed data signal, which is produced from the output data of the particular data channel allocated to the corresponding finger unit in the second inverse code transforming means, is demodulated by the demodulating means while holding a synchronization with the inverse transformed data signal according to the synchronization timing signal, so that a finger demodulation symbol is produced. Thereafter, the finger demodulation symbols obtained in the finger units are decoded by the decoding means, so that the pieces of input data of one or more particular data channels allocated to the finger units are reproduced.

Accordingly, because the frequency error assumption information is produced from the pilot signal possible to be transmitted at a high electric power, the frequency error assumption information can be reliably obtained even though input data of the data channels are transmitted in the low signal electric power Eb/No environment. Also, because a synchronization timing signal is produced from the frequency error assumption information and because the output data of the data channels allocated to the finger units are reproduced according to the synchronization timing signal, a service of a high speed data transmission can be performed at a high quality in a low signal electric power (Eb/No) environment as well as a service mainly performing a low speed data transmission such as an audio data transmission while stably holding a synchronization with the output data of the code channels allocated to the finger units in the low signal electric power Eb/No environment and stably performing a phase detection for the output data in a synchronized condition.

Also, even though a particular processing gain of the output data of the code channel allocated to each finger unit is lower than a referential processing gain, because frequency error assumption information is produced according to a frequency error assumed in a referential processing gain time period of a referential processing gain of the referential processing gain in cases where the change of noises or fading in the particular propagation path is large, the output data of the particular processing gain lower than the referential processing gain can be demodulated while stably holding a synchronization with the output data of the code channels allocated to the finger units and stably performing a phase detection for the output data in a synchronized condition.

It is applicable that the finger units be classified into one first finger unit and one or more second finger units on condition that the particular processing gain of the output data allocated to the first finger unit is smaller than those of the pieces of output data allocated to the second finger units, the outputting of the frequency error assumption information be performed in the frequency error assuming means of the first finger unit, the outputting of the frequency error assumption information be not performed in the frequency error assuming means of each second finger unit under the control of the control means, a second original frequency error be assumed from the inverse transformed pilot signal produced by the first inverse code transforming means in a second particular processing gain time period corresponding to the particular processing gain of each second finger unit in the frequency error assuming means of the first finger unit, the second original frequency error be output as second frequency error assumption information in cases where the particular processing gain corresponding to the second finger unit accords with the referential processing gain, the second original frequency error and the referential frequency error be compared each other in cases where the particular processing gain corresponding to the second finger unit is equal to or lower than the referential processing gain, the referential frequency error be output as second frequency error assumption information in cases where the second original frequency error is larger than the referential frequency error, the second original frequency error be output as second frequency error assumption information in cases where the second original frequency error is equal to or smaller than the referential frequency error, a second synchronization timing signal be produced by the synchronization holding means of the first finger unit according to the second frequency error assumption information, and the inverse transformed data signal produced by the second inverse code transforming means of the second finger unit be demodulated by the demodulating means of the second finger unit while holding a synchronization with the inverse transformed data signal according to the second synchronization timing signal to produce a finger demodulation symbol corresponding to the second finger unit.

In this spread spectrum communication apparatus, in cases where the particular processing gain of the output data allocated to the first finger unit is smaller than those of the pieces of output data allocated to the second finger units, the second synchronization timing signal to be used for each second finger unit is produced by the synchronization holding means of the first finger unit. Therefore, the demodulating operation performed in the demodulating means of the second finger unit can be performed without producing the frequency error assumption information or the synchronization timing signal in both the frequency error assuming means and the synchronization holding of the second finger unit.

It is also applicable that the finger units be classified into one first finger unit and one or more second finger units on condition that the particular processing gains of the pieces of output data allocated to the first finger unit and the second finger units are the same as each other, the outputting of the frequency error assumption information be performed in the frequency error assuming means of the first finger unit, the outputting of the frequency error assumption information be not performed in the frequency error assuming means of each second finger unit under the control of the control means, and the inverse transformed data signal produced by the second inverse code transforming means of the second finger unit be demodulated by the demodulating means of the second finger unit while holding a synchronization with the inverse transformed data signal according to the synchronization timing signal produced by the synchronization holding means of the first finger unit to produce a finger demodulation symbol corresponding to the second finger unit.

In this spread spectrum communication apparatus, in cases where the particular processing gains of the pieces of output data allocated to the first finger unit and the second finger units are the same as each other, the synchronization timing signal produced by the synchronization holding means of the first finger unit is used in the demodulating means of each second finger unit. Therefore, the demodulating operation performed in the demodulating means of the second finger unit can be performed without producing the frequency error assumption information or the synchronization timing signal in both the frequency error assuming means and the synchronization holding of the second finger unit.

It is also preferred that each finger unit further comprises:
  integration dump means for performing an integration dump, in which the inverse transformed pilot signal produced by the first inverse code transforming means is integrated in the particular processing gain time period corresponding to the particular processing gain of the finger unit detected by the control means, to produce an original integration dump value for each particular processing gain;
  referential integration dump value producing means for producing a referential integration dump value, which is equal to an integration dump value obtained by integrating the inverse transformed pilot signal produced by the first inverse code transforming means in the referential processing gain time period corresponding to the referential processing gain, from the original integration dump value produced by the integration dump means for each referential processing gain time period; and
  reference signal setting means for setting a reference signal according to the original integration dump value produced by the integration dump means in cases where the particular processing gain corresponding to the finger unit accords with the referential processing gain, setting a reference signal according to the referential integration dump value produced by the referential integration dump value producing means in cases where the particular processing gain corresponding to the finger unit is lower than the referential processing gain and it is judged by the frequency error assuming means that the original frequency error is larger than the referential frequency error, and setting a reference signal according to the original integration dump value in cases where the particular processing gain corresponding to the finger unit is lower than the referential processing gain and it is judged by the frequency error assuming means that the original frequency error is equal to or smaller than the referential frequency error, wherein the inverse transformed data signal produced by the second inverse code transforming means is demodulated by the demodulating means while performing a synchronized phase detection for the inverse transformed data signal according to the reference signal set by the reference signal setting means to produce the finger demodulation symbol corresponding to the finger unit.

In this spread spectrum communication apparatus, a reference signal set by the reference signal setting means is used for each finger unit to perform a synchronized phase detection for the inverse transformed data signal when the inverse transformed data signal is demodulated by the demodulating means.

In cases where the particular processing gain of the output data allocated to the finger unit accords with the referential processing gain, the reference signal is set according to an original integration dump value which is obtained by integrating the inverse transformed pilot signal in the particular processing gain time period corresponding to the particular processing gain.

In contrast, in cases where the particular processing gain is lower than the referential processing gain, a referential integration dump value equal to an integration dump value obtained by integrating the inverse transformed pilot signal in the referential processing gain time period is produced from the original integration dump value by the referential integration dump value producing means. Thereafter, in cases where the original frequency error is larger than the referential frequency error, the reference signal is set according to the referential integration dump value. Also, the reference signal is set according to the original integration dump value in cases where the original frequency error is equal to or smaller than the referential frequency error.

Accordingly, the inverse transformed data signal can be demodulated while performing a synchronized phase detection for the inverse transformed data signal according to the reference signal regardless of whether the change of noises or fading in the propagation path is large.

It is also preferred that the channel information transmitted from the spread spectrum transmitting apparatus include data format information indicating a processing gain in- of the output data of each data channel and finger allocation information indicating the particular data channel allocated to each finger unit, and the particular processing gain time period of each finger unit be adjusted according to the channel information in cases where the processing gain of the output data of the particular data channel allocated to the finger unit is changed or the particular data channel allocated to the finger unit is changed.

In this spread spectrum communication apparatus, even though the processing gain corresponding to one finger unit or the particular data channel allocated to one finger unit is suddenly changed by the transmitting apparatus, because the changing information is indicated in data format information or the finger allocation information of the channel information, the original frequency error can be reliably assumed in a new processing gain time period by the frequency error assuming means, so that the synchronization with the output data allocated to the finger unit can be stably held.

It is also preferred that the synchronization holding means of each finger unit comprise:
  phase error calculating means for calculating a phase error between the output data of the particular data channel, which is allocated to the finger unit and is received in the spread spectrum receiving apparatus, and the output data of the particular data channel prepared by the spread spectrum transmitting apparatus in the particular processing gain time period of the finger unit;
  lock detecting range setting means for selecting a particular lock detecting range from a plurality of lock detecting ranges according to the frequency error assumption information output from the frequency error assuming means and the particular processing gain of the finger unit;
  lock detecting means for checking whether or not the phase error calculated by the phase error calculating means is within the particular lock detecting range set by the lock detecting range setting means, outputting a lock detecting signal, indicating that the synchronization with the output data of the finger unit is held, in cases where the phase error is within the particular lock detecting range, and outputting a lock detecting signal, indicating that the synchronization with the output data of the finger unit is not held, in cases where the phase error is out of the particular lock detecting range; and
  loop filtering means for producing the synchronization timing signal according to the phase error calculated by the phase error calculating means, wherein the piece of output data of each data channel received in the spread spectrum receiving apparatus is composed of a plurality of incoming data waves corresponding to a plurality of phase offsets, a specific phase offset corresponding to a specific incoming data wave having the highest electric power among electric powers of incoming data waves of a plurality of remaining phase offsets other than one or more particular phase offsets allocated to the finger units is selected from the remaining phase offsets under the control of the control means in cases where the lock detecting signal, indicating that the synchronization with the output data of the finger unit is not held, is detected by the control means, and the specific incoming data waves of the same particular code channel as that allocated to each finger unit is allocated to the finger unit in place of a particular incoming data wave of the particular phase offset.

In this spread spectrum communication apparatus, even though the receiving apparatus fails in the holding of the synchronization with a particular incoming data wave of a particular data channel allocated to one finger unit, a plurality of specific incoming waves of a specific phase offset other than the particular phase offsets allocated to the finger units are newly allocated to the finger units on condition that the specific incoming waves of the specific phase offset are highest among those of phase offsets other than the particular phase offsets. Accordingly, the holding of the synchronization with the specific incoming wave is immediately obtained in the finger units because the electric powers of the specific incoming waves of the specific phase offset are highest, so that the synchronization with the output data can be reliably held in the finger units.

The third object is achieved by the provision of a spread spectrum communication apparatus comprising:
  code generating means for generating a plurality of distinguishing codes respectively allocated to a code channel;
  redundant data adding means for adding redundant data determined to an input data string to produce a redundant data added input data string;
  symbol puncturing means for performing a symbol puncturing operation for the redundant data added input data string produced by the redundant data adding means, to produce a string of punctured symbols;
  interleaving means for rearranging either the string of punctured symbols produced by the symbol puncturing means or the redundant data added input data string produced by the redundant data adding means for each prescribed time period to produce a string of interleaved symbols;
  transmission data producing means for producing one or more strings of transmission symbols from the string of interleaved symbols produced by the interleaving means, the string of punctured symbols produced by the symbol puncturing means or the redundant data added input data string produced by the redundant data adding means on condition that the number of strings of transmission symbols is determined according to an importance degree of the input data string and the data speed of the input data string;

modulating means for modulating each of the strings of transmission symbols produced by the transmission data producing means at a modulation type determined according to the importance degree of the input data string and the data speed of the input data string to produce one or more strings of modulated symbols;

code channel producing means for performing a code transformation for each of the strings of modulated symbols produced by the modulating means with one distinguishing code generated by the code generating means to produce one or more strings of distinguishable modulated symbols respectively corresponding to one code channel on condition that each string of distinguishable modulated symbols corresponding to one code channel is distinguishable from the strings of distinguishable modulated symbols corresponding to the other code channels;

amplifying means for amplifying each string of distinguishable modulated symbols produced by the code channel producing means with a gain determined for the corresponding string of modulated symbols;

multiplexing means for multiplexing the strings of distinguishable modulated symbols amplified by the amplifying means to produce a string of multiplexed symbols; and code transforming means for performing a spread spectrum for the string of multiplexed symbols with a spread code sequence to produce a spread spectrum signal and outputting the spread spectrum signal.

In the above configuration, redundant data is added to an input data string if necessary, a symbol puncturing operation is performed for the input data string if necessary, the input data string is rearranged if necessary, and one or more strings of transmission symbols, of which the number is determined according to an importance degree of the input data string and the data speed of the input data string, are produced from the input data string. Thereafter, each of the strings of transmission symbols is modulated at a modulation type (for example, a binary phase shift keying BPSK or a quadrature phase shift keying QPSK) determined according to the importance degree of the input data string and the data speed of the input data string, a code transformation is performed for each of the strings of modulated symbols with one distinguishing code, each string of distinguishable modulated symbols obtained in the code transformation is amplified with a corresponding gain, the strings of distinguishable modulated symbols amplified are multiplexed to a string of multiplexed symbols, and a spread spectrum is performed for the string of multiplexed symbols.

Accordingly, the input data string can be transmitted at a variable data transfer rate and a high quality while using one or more code channels determined according to the importance degree of the input data string and the data transfer rate of the input data string, so that a service of a high speed data transmission at a high quality can be performed as well as a service mainly performing a low speed data transmission such as an audio data transmission.

The third object is also achieved by the provision of a spread spectrum communication apparatus comprising:

a spread spectrum signal transmitting apparatus for producing a plurality of strings of coded symbols from an input data string, producing a string of transmission symbols corresponding to a single code channel or a plurality of strings of transmission symbols corresponding to a plurality of code channels from the strings of coded symbols, modulating each string of transmission symbols to produce a string of modulated symbols corresponding to the single code channel or a plurality of strings of modulated symbols corresponding to the code channels, performing a code transformation for the string of modulated symbols or the strings of modulated symbols to produce output data, preparing channel information indicating information of the single code channel or information of the code channels and transmitting the output data and the channel information;

a spread spectrum signal receiving apparatus for receiving the channel information from the spread spectrum signal transmitting apparatus and receiving the output data transmitted from the spread spectrum signal transmitting apparatus as a receiving signal, the receiving signal being composed of a plurality of incoming waves transmitted through a plurality of propagation paths, the spread spectrum signal receiving apparatus comprising:

searching means for searching the receiving signal for conditions of the propagation paths and producing a searcher detecting signal indicating a plurality of electric powers of the incoming waves;

a plurality of finger units for respectively performing an inverse code transformation for the receiving signal and respectively demodulating the receiving signal to produce a finger demodulated symbol;

channel synthesizing means for synthesizing a RAKE demodulated symbol string from the finger demodulated symbols produced in the finger units;

RAKE demodulated symbol string dividing means for dividing the RAKE demodulated symbol string obtained by the channel synthesizing means into a plurality of strings of divided demodulation symbols respectively corresponding to one string of coded symbols produced in the spread spectrum signal transmitting apparatus;

symbol auto gain control means for calculating an average value of each string of divided demodulation symbols obtained by the RAKE demodulated symbol string dividing means for each of prescribed time periods, dividing each string of divided demodulation symbols by the corresponding average value to produce a plurality of strings of normalized demodulation symbols for each prescribed time period, and performing a gain adjustment for each string of normalized demodulation symbols according to the conditions of the propagation paths detected by the searching means and the channel information to produce a plurality of strings of demodulated symbols for each prescribed time period;

decoding means for performing a decoding operation for the strings of demodulated symbols produced in the symbol auto gain control means to reproduce the input data string; and control means for allocating the single code channel to the finger units, in cases where the output data produced from the string of modulated symbols corresponding to the single code channel is transmitted to the spread spectrum signal receiving apparatus, according to the channel information, allocating the code channels to the finger units in one-to-one correspondence, in cases where the output data produced from the strings of modulated symbols corresponding to the code channels is transmitted to the spread spectrum signal receiving apparatus, according to the channel information, controlling the finger units, the channel synthesizing means, the RAKE demodulated symbol string dividing means, the symbol auto gain control means and the decoding means according to the channel information and the searcher detecting signal transmitted from the searching means, wherein a plurality of particular incoming waves having a plurality of particular electric powers higher than the electric powers of the other incoming waves are detected from the receiving signal in the inverse code transformations in the finger units in cases where the output data produced from the string of modulated symbols corresponding to the single code channel is transmitted to the spread spectrum signal receiving apparatus, a particular incoming wave having a particular electric power highest among the electric powers of the incoming waves corresponding to the code channel allocated to one finger unit is detected from the receiving signal in the inverse code transformation of the finger unit for each finger unit in cases where the output data produced from the strings of modulated symbols corresponding to the code channels is transmitted to the spread spectrum signal receiving apparatus, and the particular incoming waves detected in the finger units are demodulated to produce the finger demodulated symbols.

In the above configuration, when the output data is received in the spread spectrum signal receiving apparatus as the receiving signal, conditions of the propagation paths is detected by the searching means.

In cases where the output data produced from the string of modulated symbols corresponding to the single code channel is transmitted to the spread spectrum signal receiving apparatus, the single code channel is allocated to the finger units, a plurality of particular incoming waves having a plurality of particular electric powers higher than the electric powers of the other incoming waves are detected from the receiving signal in the inverse code transformations in the finger units. In contrast, in cases where the output data produced from the strings of modulated symbols corresponding to the code channels is transmitted to the spread spectrum signal receiving apparatus, a particular incoming wave having a particular electric power highest among the electric powers of the incoming waves corresponding to the code channel allocated to one finger unit is detected from the receiving signal in the inverse code transformation of the finger unit for each finger unit.

Thereafter, the particular incoming waves are demodulated in the finger units to produce a plurality of finger demodulated symbols, a RAKE demodulated symbol string is synthesized from the finger demodulated symbols by the channel synthesizing means, a plurality of strings of divided demodulation symbols respectively corresponding to one string of coded symbols produced in the spread spectrum signal transmitting apparatus are produced from the RAKE demodulated symbol string in the RAKE demodulated symbol string dividing means, a plurality of strings of demodulated symbols are produced from the strings of divided demodulation symbols for each prescribed time period in the symbol auto gain control means, and the input data string is reproduced from the strings of demodulated symbols by the decoding means.

Accordingly, even though the output data is produced from the string of modulated symbols corresponding to the single code channel or the strings of modulated symbols corresponding to the code channels according to an importance degree of the input data string and a data transfer rate of the input data string, the particular incoming waves allocated to the finger units can be detected and demodulated, so that the input data string can be reproduced. Therefore, a service of a high speed data transmission at a high quality can be performed as well as a service mainly performing a low speed data transmission such as an audio data transmission.

Also, because a gain adjustment is performed for each of the strings of normalized demodulation symbols respectively corresponding to one string of coded symbols produced in the spread spectrum signal transmitting apparatus according to the conditions of the propagation paths, the reliability for the data demodulation can be improved.

The third object is also achieved by the provision of a spread spectrum communication apparatus comprising:

a spread spectrum signal transmitting apparatus for producing a plurality of strings of coded symbols from an input data string, producing one or more strings of transmission symbols corresponding to one or more code channels from the strings of coded symbols, modulating each string of transmission symbols to produce one or more strings of modulated symbols corresponding to the code channels, performing a code transformation for the strings of modulated symbols to produce output data, preparing channel information indicating information of the code channels and transmitting the output data and the channel information;

a spread spectrum signal receiving apparatus for receiving the channel information from the spread spectrum signal transmitting apparatus and receiving the output data transmitted from the spread spectrum signal transmitting apparatus as a receiving signal, the receiving signal being composed of a plurality of incoming waves transmitted through a plurality of propagation paths, the spread spectrum signal receiving apparatus comprising:

searching means for searching the receiving signal for conditions of the propagation paths and producing a searcher detecting signal indicating a plurality of electric powers of the incoming waves;

a plurality of finger units for respectively performing an inverse code transformation for the receiving signal or an interference removed signal to detect a particular incoming wave and respectively demodulating the particular incoming wave to produce a finger demodulated symbol;

interference replica signal prducing means for detecting an interference signal adversely influencing on the demodulation for the particular incoming waves performed by the finger units from the searcher detecting signal produced by the searching means and setting the interference signal as an interference replica signal;

signal allocating means for allocating the receiving signal directly received from the spread spectrum signal transmitting apparatus or the interference removed signal obtained by subtracting the interference replica signal from the receiving signal;

channel synthesizing means for synthesizing a RAKE demodulated symbol string from the finger demodulated symbols produced in the finger units;

RAKE demodulated symbol string dividing means for dividing the RAKE demodulated symbol string obtained by the channel synthesizing means into a plurality of strings of divided demodulation symbols respectively corresponding to one string of coded symbols produced in the spread spectrum signal transmitting apparatus;

symbol auto gain control means for calculating an average value of each string of divided demodulation symbols obtained by the RAKE demodulated symbol string dividing means for each of prescribed time periods, dividing each string of divided demodulation symbols by the corresponding average value to produce a plurality of strings of normalized demodulation symbols for each prescribed time period, and performing a gain adjustment for each string of normalized demodulation symbols according to the conditions of the propagation paths detected by the searching means and the channel information to produce a plurality of strings of demodulated symbols for each prescribed time period;

decoding means for performing a decoding operation for the strings of demodulated symbols produced in the symbol auto gain control means to reproduce the input data string; and control means for allocating the code channels to the finger units according to the channel information to detect the particular incoming waves corresponding to the code channels in the finger units, controlling the signal allocating means and the RAKE receiving unit to demodulate the particular incoming wave produced from the receiving signal in each finger unit in cases where the removing of an interference electric power of the interference signal from the receiving signal is not performed, control the interference replica signal prducing means, the signal allocating means and the RAKE receiving unit to produce the interference removed signal and to demodulate the particular incoming wave produced from the interference removed signal in each finger unit in cases where the removing of an interference electric power of the interference signal from the receiving signal is performed, and controlling the finger units, the channel synthesizing means, the RAKE demodulated symbol string dividing means, the symbol auto gain control means and the decoding means according to the channel information and the searcher detecting signal transmitted from the searching means.

In the above configuration, a receiving operation, in which the removing of an interference electric power of the interference signal from the receiving signal is not performed, or a receiving operation, in which the removing of an interference electric power of the interference signal from the receiving signal is performed, is selected. Therefore, the RAKE demodulated symbol string can be obtained after the interference signal removing operation is completed. Also, an interference signal removing operation can be repeatedly performed, and the RAKE demodulated symbol string can be obtained each time one interference signal removing operation is completed.

It is preferred that an interleaving operation be performed for each string of coded symbols in the spread spectrum signal transmitting apparatus to rearranged each string of coded symbols for each interleaving time period, the interleaving time period agree with the prescribed time period, a deinterleaving operation be performed in the symbol auto gain control means for each string of divided demodulation symbols obtained by the RAKE demodulated symbol string dividing means for each interleaving time period, the average value of each string of divided demodulation symbols be calculated in the symbol auto gain control means for each interleaving time period, and each string of divided demodulation symbols, for which the deinterleaving operation is performed, be divided by the corresponding average value to produce a plurality of strings of normalized demodulation symbols for each interleaving time period.

In this spread spectrum communication apparatus, when an interleaving operation is performed for each string of coded symbols in the spread spectrum signal transmitting apparatus for each interleaving time period, a deinterleaving operation is performed for each string of divided demodulation symbols corresponding to one string of coded symbols in the symbol auto gain control means, and a plurality of strings of normalized demodulation symbols are produced for each interleaving time period.

Accordingly, even though an interleaving operation is performed in the spread spectrum signal transmitting apparatus, because the strings of normalized demodulation symbols are produced for each interleaving time period after the deinterleaving operation is performed, when levels of the divided demodulation symbols are changed with time because of an amplitude change based on fading, the interference based on a multi-path communication and/or the interference from signals of other users, levels of the divided demodulation symbols can be made to a constant value.

It is also preferred that one particular string of coded symbols selected from the strings of coded symbols be punctured in the spread spectrum signal transmitting apparatus, and puncture symbols be inserted into puncture positions of one string of divided demodulation symbols corresponding to the particular string of coded symbols in the symbol auto gain control means after the gain adjustment for the string of divided demodulation symbols is performed.

In this spread spectrum communication apparatus, even though the particular string of coded symbols is punctured in the spread spectrum signal transmitting apparatus, puncture symbols are inserted into puncture positions of one string of divided demodulation symbols corresponding to the particular string of coded symbols. Therefore, each string of coded symbols can be punctured in the spread spectrum signal transmitting apparatus, so that a data transfer rate of the output data transmitted from the spread spectrum signal transmitting apparatus can be improved, and the output data can be transmitted at a high speed.

BRIEF DESCRIPTION OF THE DRAWINGS

The objects, features and advantages of the present invention will be apparent from the following description taken in conjunction with the accompanying drawings, in which:

FIGS. 10(a) to 10(f) show a timing chart of an example of a RAKE reception and an interference removing operation performed in the spread spectrum signal receiving apparatus according to the searcher detecting signal shown in FIG. 4;

FIG. 11A shows an example of a transmission data format in which three pieces of transmission data of the same low processing gain corresponding to three data channels and a pilot signal corresponding to the pilot channel are listed;

FIG. 11B shows an example of a transmission data format in which one piece of transmission data of a high processing gain corresponding to one data channel, two pieces of transmission data of the same low processing gain corresponding to two data channels and a pilot signal corresponding to the pilot channel are listed;

FIG. 11C shows an example of a transmission data format in which one piece of transmission data of a high processing gain corresponding to one data channel, one piece of transmission data of a middle processing gain corresponding to one data channel, one piece of transmission data of a low processing gain corresponding to one data channel and a pilot signal corresponding to the pilot channel are listed;

FIG. 24 shows a third example of the production of the string of modulated symbols at a modulation symbol producing timing in which a channel interleaving operation is performed and a channel interleaving operation is performed;

FIG. 25 shows a fourth example of the production of the string of first modulated symbols and the string of second modulated symbols at a modulation symbol producing timing in which a channel interleaving operation is performed and a channel interleaving operation is performed;

FIG. 30 shows a first example of the production of three strings of demodulated symbols from a string of RAKE demodulated symbols at a demodulated symbol producing timing on condition that any interference removing operation is not performed or any symbol puncture is not performed;

FIG. 31 shows a second example of the production of three strings of demodulated symbols from a string of RAKE demodulated symbols at a demodulated symbol producing timing on condition that any interference removing operation is not performed but the symbol puncturing operation is performed.

DETAILED DESCRIPTION OF THE EMBODIMENTS

Preferred embodiments of a spread spectrum communication apparatus according to the present invention are described with reference to the drawings.

A spread spectrum communication apparatus in the present invention is composed of a spread spectrum signal transmitting apparatus, in which a spread spectrum data signal obtained from transmission data is transmitted, and a spread spectrum signal receiving apparatus in which the spread spectrum data signal is received from the spread spectrum signal transmitting apparatus to obtain decoded data equivalent to the reproduced transmission data.

(First Embodiment)

Figure 1:
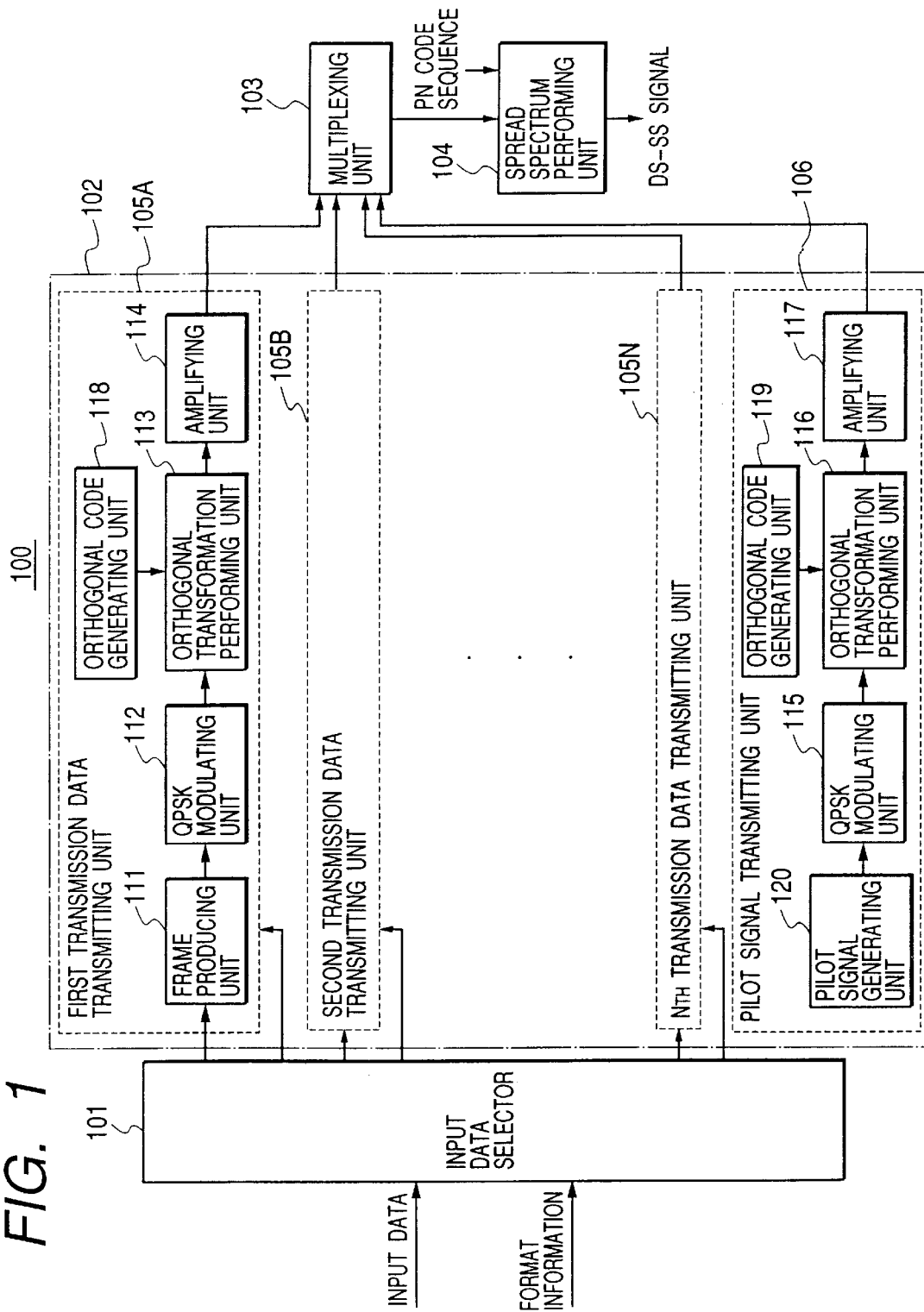
FIG. 1 is a block diagram of a spread spectrum signal transmitting apparatus of a spread spectrum communication apparatus according to first and second embodiments of the present invention.

FIG. 1 is a block diagram of a spread spectrum signal transmitting apparatus of a spread spectrum communication apparatus according to first and second embodiments of the present invention.

As shown in FIG. 1, a spread spectrum signal transmitting apparatus 100 comprises:

an input data selector 101 for receiving format information and a plurality of pieces of input data respectively corresponding to a data transfer rate (or a data speed), a communication quality and an importance degree and selecting each of the pieces of input data according to the format information;

a data transmitting unit 102, corresponding to a plurality of code channels, for transforming one piece of input data selected by the input data selector 101 for each code channel to produce pieces of transmission data, generating a pilot signal, transmitting pieces of transmission data through the code channels and transmitting the pilot signal through a pilot channel allocated as one code channel;

a multiplexing unit 103 for multiplexing the pieces of transmission data of the code channels and the pilot signal of the pilot channel produced in the data transmitting unit 102 to obtain multiplexed data; and a spread spectrum performing unit 104 for performing a spread spectrum for the multiplexed data obtained in the multiplexing unit 103 with a pseudo noise (PN) code sequence allocated to a direct sequence spread spectrum (DS-SS) to obtain a DD-SS signal and outputting the DD-SS signal as a spread spectrum data signal.

The data transmitting unit 102 comprises: N transmission data transmitting units 105 such as a first transmission data transmitting unit 105A, a second transmission data transmitting unit 105B and an N-th transmission data transmitting unit 105N respectively corresponding to one code channel; and a pilot signal transmitting unit 106, corresponding to the pilot channel, for transmitting the pilot signal.

Each transmission data transmitting unit 105 comprises:

an orthogonal code generating unit 118 for generating an orthogonal code C1, C2, C4, . . . or Cn allocated to the corresponding code channel by the input data selector 101;

a frame producing unit 111 for adaptively producing a coded symbol string from one piece of input data selected by the input data selector 101 at a time slot (or a data speed) and a processing gain of the input data;

a quadrature phase shift keying (QPSK) modulating unit 112 for performing a QPSK modulation for the coded symbol string produced in the frame producing unit 111 to produce a modulated symbol string;

an orthogonal transformation performing unit 113, functioning as a code channel producing means, for performing an orthogonal transformation for the modulated symbol string produced in the QPSK modulating unit 112 with the orthogonal code C1, C2 . . . or Cn generated by the orthogonal code generating unit 118 to produce an orthogonally coded modulated symbol string corresponding to the code channel allocated to the orthogonal code; and an amplifying unit 114 for amplifying the orthogonally coded modulated symbol string produced in the orthogonal transformation performing unit 113 with a gain allocated to the modulated symbol string by the input data selector 101 to produce one piece of transmission data and outputting the piece of transmission data to the multiplexing unit 103.

The pilot signal transmitting unit 106 comprises:

an orthogonal code generating unit 119 for generating an orthogonal code C0 allocated to the pilot channel by the input data selector 101;

a pilot signal generating unit 120 for generating a pilot signal composed of known pilot data (for example, "111 . . . 111" composed of "1");

a QPSK modulating unit 115 for modulating the pilot signal generated in the pilot signal generating unit 120 to produce a modulated known symbol string;

an orthogonal transformation performing unit 116, functioning as a code channel producing means, for performing an orthogonal transformation for the modulated known symbol string produced in the QPSK modulating unit 115 with the orthogonal code C0 generated by the orthogonal code generating unit 119 to produce an orthogonally coded modulated known symbol string corresponding to the pilot channel allocated to the orthogonal code C0; and a pilot amplifying unit 117 for amplifying the orthogonally coded modulated known symbol string produced in the orthogonal transformation performing unit 116 with a gain allocated to the modulated known symbol string by the input data selector 101 and outputting the orthogonally coded modulated known symbol string to the multiplexing unit 103 as a pilot signal transformed in the pilot signal transmitting unit 106.

The orthogonal codes C0, C1, . . . Cn used in the orthogonal transformation performing units 113 and 116 of the transmission data transmitting units 105 and the pilot signal transmitting unit 106 are different from each other, and the pieces of transmission data of the code channels output from the transmission data transmitting units 105 and the pilot signal of the pilot channel are coded orthogonally to each other. Also, the pilot signal corresponding to the pilot channel is distinguishable from the pieces of transmission data of the code channels output from the transmission data transmitting units 105 according to the orthogonal code C0, and the piece of transmission data of the code channel output from each transmission data transmitting unit 105 is distinguishable from the pieces of transmission data of the other code channels and the pilot signal of the pilot channel according to the corresponding orthogonal code $C_i$ (i=1,2, . . . or n).

The pilot signal of the pilot channel is output from the pilot signal transmitting unit 106 at an electric power higher than that of the piece of transmission data output from each transmission data transmitting unit 105. For example, an electric power for the pilot signal is ranged from 20 to 40% of those for the pieces of transmission data and the pilot signal.

In the above configuration, the pieces of transmission data of the N code channels and the pilot signal are multiplexed in the multiplexing unit 103, a spread spectrum is performed with the PN code sequence for the pieces of transmission data and the pilot signal in the spread spectrum performing unit 104, and a DD-SS signal spectrum-spread is output from the spread spectrum performing unit 104.

The DS-SS signal output from the spread spectrum signal transmitting apparatus 100 is received in a spread spectrum signal receiving apparatus as a receiving signal. The receiving signal is composed of a plurality of incoming data waves, which are originated in each piece of transmission data and pass through different propagation paths, and a plurality of incoming pilot waves which are originated in the pilot signal and pass through the different propagation paths.

Also, channel information, in which the number of code channels corresponding to pieces of transmission data transmitted from the spread spectrum signal transmitting apparatus 100, a transmission electric power of one piece of transmission data for each code channel, an importance degree for the piece of transmission data transmitted through each code channel, information of the pilot channel and a multiplexing type (such as a frequency division multiplex, a time division multiplex or a code division multiplex) used in the orthogonal transformation performing units 113 and 116 are included, is transmitted from the spread spectrum signal transmitting apparatus 100.

Accordingly, because the pilot signal originated in the known data is output at a high electric power from the spread spectrum signal transmitting apparatus 100, the incoming pilot waves can-be received in the receiving apparatus at a superior synchronization with the incoming pilot waves, and conditions of the different propagation paths and an interference of pilot signals based on other users can be easily detected from the incoming pilot waves.

Figure 2:
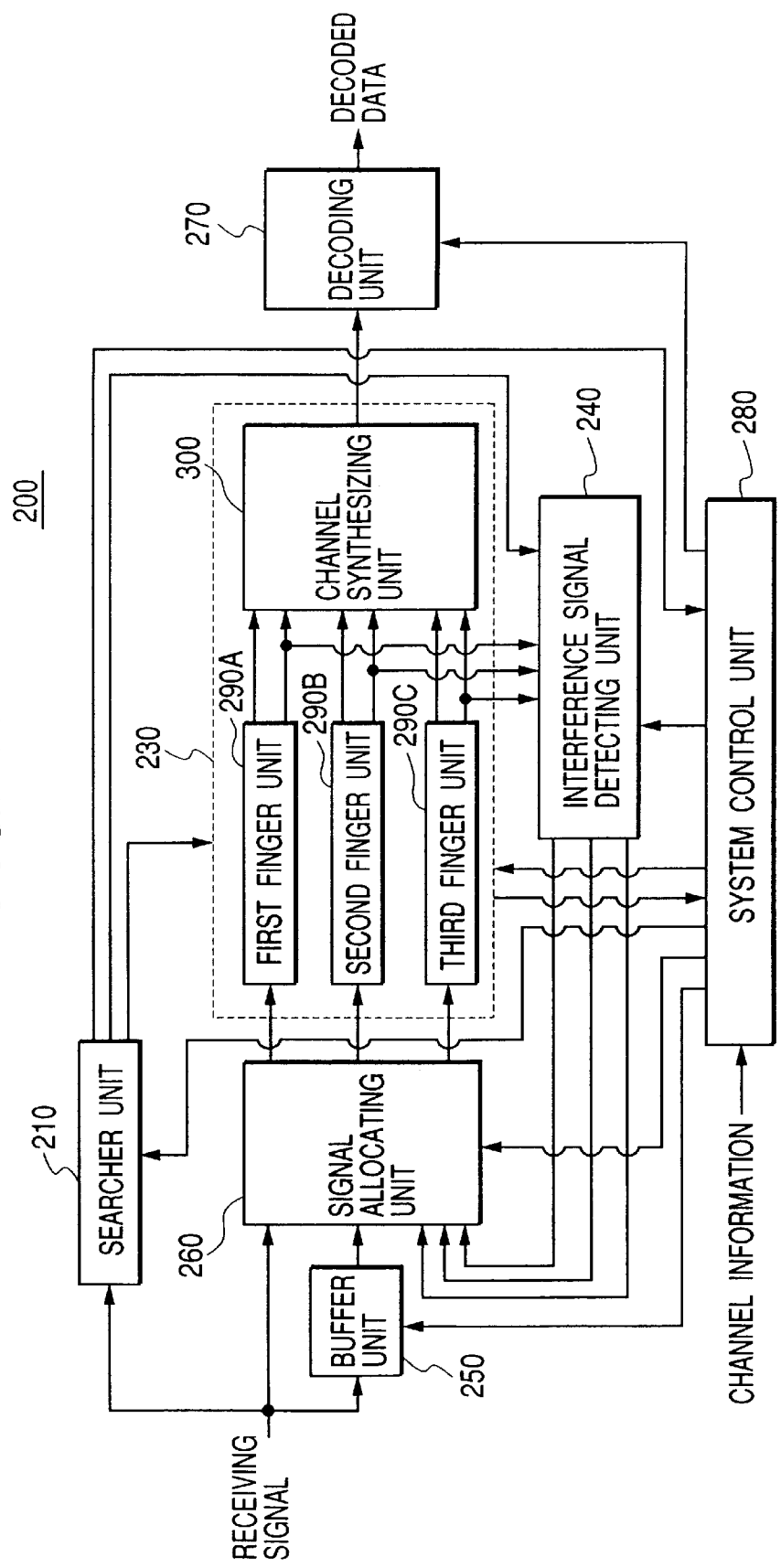
FIG. 2 is a block diagram of a spread spectrum signal receiving apparatus of the spread spectrum communication apparatus according to the first embodiment.

FIG. 2 is a block diagram of a spread spectrum signal receiving apparatus of the spread spectrum communication apparatus according to the first embodiment.

As shown in FIG. 2, a spread spectrum signal receiving apparatus 200 comprises:

a searcher unit 210 for searching the receiving signal for a plurality of specific incoming waves of a specific code channel (that is, preferably the incoming pilot waves of the pilot signal) used for a searching operation according to the channel information, detecting a plurality of relative delay times of the incoming pilot waves which come to the receiving apparatus 200 through different propagation paths at a plurality of propagation delay times, detecting a plurality of receiving electric powers of the incoming pilot waves, determining a plurality of phase offsets to be given to a spread code sequence (hereinafter, called a PN code sequence) according to the relative delay times of the incoming pilot waves, determining one or more particular code channels (or one or more code strings called orthogonal codes used in the transmitting apparatus 100 for the code multiplexing) to be processed in this receiving apparatus 200 according to the channel information transmitted from the spread spectrum signal transmitting apparatus 100, outputting a searcher detecting signal (refer to FIG. 4) in which the phase offsets and the receiving electric powers of the incoming pilot waves are indicated as conditions of the different propagation paths and outputting finger parameters indicating the phase offsets of the incoming pilot waves, the particular code channels and the receiving electric powers of the incoming pilot waves;

a RAKE receiving unit 230 for receiving the finger parameters from the searcher unit 210, processing three particular incoming data waves respectively corresponding to one particular phase offset and one particular code channel indicated by the finger parameters to produce a RAKE demodulated symbol string and producing three reference signals respectively corresponding to a particular incoming pilot wave of one particular phase offset indicated by the finger parameters;

an interference signal detecting unit (or an interference electric power detecting unit) 240 for detecting a channel (that is, the pilot channel), of which incoming waves most inversely influence on the demodulation performed in the receiving apparatus 200 as an interference signal and have a most interference removing effect, according to the channel information, detecting the incoming pilot waves, which most inversely influence on the demodulation as the interference signal and have the most interference removing effect, according to the searcher detecting signal, producing an interference signal, which interferes with the demodulation of the particular incoming data wave of one particular phase offset corresponding to one reference signal produced in the RAKE receiving unit 230, according to two receiving electric powers of two particular incoming pilot waves indicated by the other reference signals and the receiving electric powers of the incoming pilot waves, which are indicated by the searcher detecting signal produced in the searcher unit 210, other than the particular incoming pilot waves of the three reference signals for each reference signal, and outputting the interference signal as an interference replica signal for each reference signal;

a buffer unit 250 for holding the receiving signal to be processed in an interference removing operation (or called a first demodulating operation);

a signal allocating unit 260 for allocating the receiving signal currently received from the transmitting apparatus 100 to the RAKE receiving unit 230 to make the RAKE receiving unit 230 produce the three reference signals and make the interference signal detecting unit 240 produce the interference replica signal corresponding to each reference signal, in cases where the demodulation of the receiving signal is performed in the RAKE receiving unit 230 in the interference removing operation, and subtracting one interference replica signal produced in the interference signal detecting unit 240 from the receiving signal held in the buffer unit 250 in the interference removing operation to produce an interference removed receiving signal, in which interference waves most influencing on the demodulation of one particular incoming data wave is removed from the receiving signal, for each interference replica signal in cases where the demodulation of the interference removed receiving signal is performed in the RAKE receiving unit 230 in an interference-removed demodulating operation (or called a second demodulating operation);

a decoding unit 270 for decoding the RAKE demodulated symbol string produced in the RAKE receiving unit 230 to produce decoded data indicating the reproduction of input data; and a system control unit 280 for controlling signal receiving and processing operations of the searcher unit 210, the RAKE receiving unit 230, the interference signal detecting unit 240, the buffer unit 250, the signal allocating unit 260 and the decoding unit 270 according to the channel information (including the number of code channels corresponding to the transmission data transmitted from the spread spectrum signal transmitting apparatus 100, a transmission electric power of the transmission data for each code channel, an importance degree for the transmission data transmitted through each code channel, information of the pilot channel and a multiplexing type such as a frequency division multiplex, a time division multiplex or a code division multiplex used in the spread spectrum signal transmitting apparatus 100 and the number of code channels to be processed in the RAKE receiving unit 230), the conditions of the propagation paths indicated by the searcher detecting signal produced in the searcher unit 210 and the conditions of the propagation paths indicated by the reference signals produced in the RAKE receiving unit 230.

The RAKE receiving unit 230 comprises:

three finger units 290 (a first finger unit 290A, a second finger unit 290B and a third finger unit 290C) for respectively performing a despread spectrum, an inverse orthogonal transformation and a demodulation for one particular incoming data wave corresponding to one particular phase offset and one particular code channel allocated by the searcher unit 210 to produce a finger demodulation symbol, producing one reference signal (a first reference signal, a second reference signal or a third reference signal) from one particular incoming pilot wave corresponding to the particular phase offset and producing a synchronization timing signal used to hold the synchronization with the transmission data transmitted from the transmitting apparatus 100; and a channel synthesizing unit 300 for weighting each of the finger demodulation symbols produced in the finger units 290A to 290C according to the reference signals produced in the finger units 290A to 290C and the channel information, adding the weighted finger demodulation symbols to each other to synthesize the RAKE demodulated symbol string in cases where the same particular code channel is allocated to the finger units 290A to 290C to perform the modulation based on the RAKE reception, and serially connecting the weighted finger demodulation symbols with each other to synthesize the RAKE demodulated symbol string in cases where the particular code channels allocated to the finger units 290A to 290C are different from each other to perform the modulation based on a plural code channel.

Figure 3:
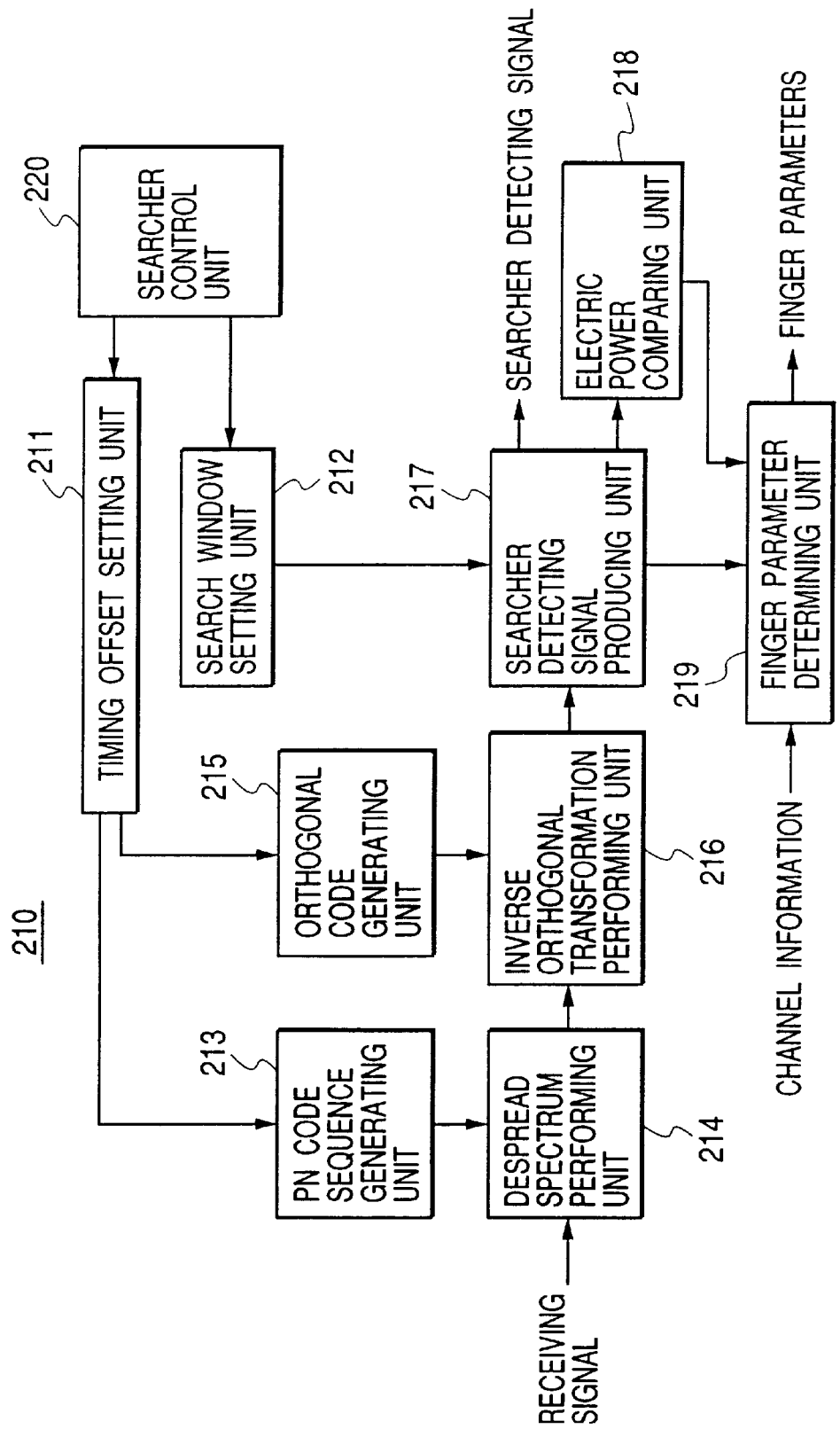
FIG. 3 is a block diagram of a searcher unit shown in FIG. 2.
Figure 4:
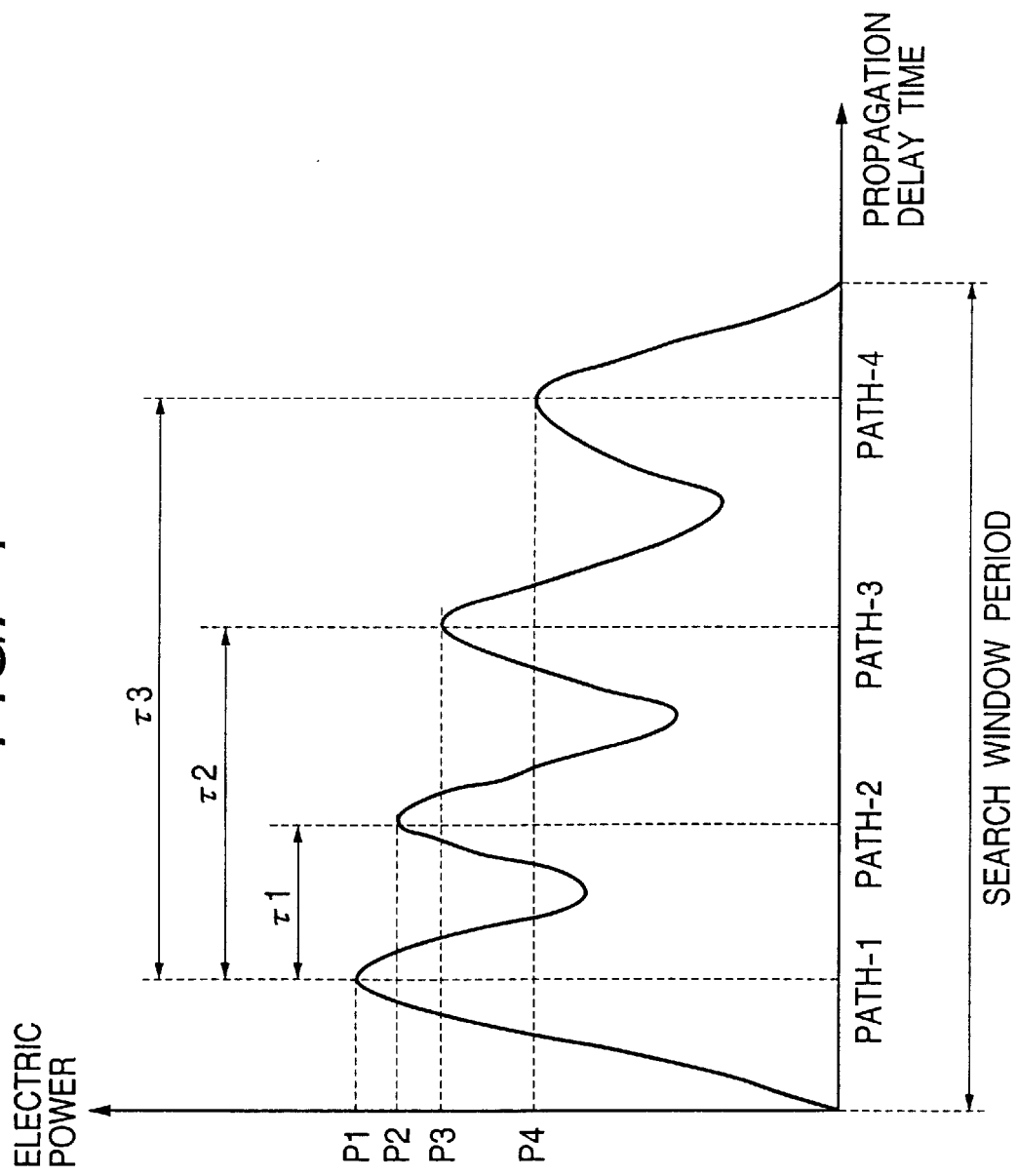
FIG. 4 shows a searcher detecting signal produced in the searcher unit.

FIG. 3 is a block diagram of the searcher unit 210, and FIG. 4 shows the searcher detecting signal produced in the searcher unit 210.

As shown in FIG. 3, the searcher unit 210 comprises:

a timing offset setting unit 211 for setting a relative value of a timing offset of the receiving apparatus 200 and gradually shifting the relative value with time to give a variable phase offset of the relative value to the PN code sequence for the purpose of detecting the conditions of the different propagation paths;

a search window setting unit 212 for setting a length of a search window period of the receiving apparatus 200 to detect the conditions of the different propagation paths;

a PN code sequence generating unit 213 for generating the PN code sequence, which is the same as that used in the transmitting apparatus 100, according to the variable phase offset of the relative value set in the timing offset setting unit 211;

a despread spectrum performing unit 214 for performing a despread spectrum for the receiving signal with the PN code sequence generated in the PN code sequence generating unit 213 to produce a despread spectrum signal;

an orthogonal code generating unit 215 for generating an orthogonal code C0, which is the same as that of the pilot channel allocated for the searching, according to the variable phase offset of the relative value set in the timing offset setting unit 211;

an inverse orthogonal transformation performing unit 216 for performing an inverse orthogonal transformation for the despread spectrum signal produced in the despread spectrum performing unit 214 with the orthogonal code generated in the orthogonal code generating unit 215 to produce an inverse orthogonal transformation signal;

a searcher detecting signal producing unit 217 for integrating the inverse orthogonal transformation signal produced in the inverse orthogonal transformation performing unit 216 in a range of the search window period set in the search window setting unit 212 to produce the searcher detecting signal shown in FIG. 4 in which a plurality of peak powers P1, P2, P3 and P4 indicates the receiving electric powers of the incoming pilot waves passing through the propagation paths;

an electric power comparing unit 218 for comparing the receiving electric powers P1, P2, P3 and P4 of the searcher detecting signal corresponding to the propagation paths with each other and obtaining power information of the receiving electric powers P1, P2, P3 and P4 and a plurality of phase offsets $\tau 1$, $\tau 2$ and $\tau 3$ corresponding to the propagation paths in the order of decreasing the receiving electric power;

a finger parameter determining unit 219 for producing the finger parameters, indicating the phase offsets of the incoming pilot waves, the particular code channels allocated to the finger units 290A to 290C and the receiving electric powers of the incoming pilot waves according to the searcher detecting signal produced in the searcher detecting signal producing unit 217, the power information and the phase offsets $\tau 1$, $\tau 2$ and $\tau 3$ obtained in the electric power comparing unit 218 and the channel information (including the number of code channels to be processed in the finger units 290A to 290C and an importance degree for each code channel) transmitted from the system control unit 280, and informing the system control unit 280 of the finger parameters; and a searcher control unit 220 for controlling the timing offset setting unit 211 and the search window setting unit 212 to appropriately detect the conditions of the different propagation paths.

In the above configuration, an operation of the searcher unit 210 is described.

The receiving signal transmitted from the transmitting apparatus 100 is input to the despread spectrum performing unit 214, a despread spectrum is performed for the receiving signal with the PN code sequence generated in the PN code sequence generating unit 213, so that a despread spectrum signal is produced. Thereafter, in the inverse orthogonal transformation performing unit 216, an inverse orthogonal transformation is performed for the despread spectrum signal with the orthogonal code C0 generated in the orthogonal code generating unit 215, so that an inverse orthogonal transformation signal is produced. In this case, a timing for generating the PN code sequence in the PN code sequence generating unit 213 and a timing for generating the orthogonal code C0 in the orthogonal code generating unit 215 are set by the timing offset setting unit 211.

Because the inverse orthogonal transformation is performed with the orthogonal code C0, when the inverse orthogonal transformation signal is integrated in the searcher detecting signal producing unit 217 in a range of the search window period set in the search window setting unit 212, a searcher detecting signal indicating a receiving electric power of the pilot signal (that is, the receiving electric powers of the incoming pilot waves) is produced.

Thereafter, the receiving electric powers and a plurality of phase offsets corresponding to the propagation paths are measured in the electric power comparing unit 218, and power information of the receiving electric powers and the phase offsets are output to the finger parameter determining unit 219 in the order of decreasing the receiving electric power.

In this case, the receiving electric power of the pilot signal is measured within the search window period for each time period of the spread code sequence (the PN code sequence) while shifting a timing offset of the spread code sequence (the PN code sequence) generated in the PN code sequence generating unit 213. An example of the searcher detecting signal is shown in FIG. 4.

As shown in FIG. 4, four incoming pilot waves passing through four propagation paths path-1, path-2, path-3 and path-4 are detected, and the incoming pilot waves have peaks P1, P2, P3 and P4 of the receiving electric power. Also, a phase offset $\tau 1$ of the incoming pilot wave corresponding to the path-2, a phase offset $\tau 2$ of the incoming pilot wave corresponding to the path-3 and a phase offset $\tau 3$ of the incoming pilot wave corresponding to the path-4 are measured on the basis of the incoming pilot wave corresponding to the path-1. Therefore, power information indicating P1>P2>P3>P4 and the phase offsets $\tau 1, \tau 2$ and $\tau 3$ are output to the finger parameter determining unit 219.

In the finger parameter determining unit 219, weighting parameters are determined according to the receiving electric powers, timing parameters indicating the phase offsets are determined, and a control parameter for controlling the RAKE receiving unit 230 to perform the demodulation based on the RAKE reception or the demodulation based on the plural code channel is determined according to the channel information and a user's instruction. The finger parameters composed of the weighting parameters, the timing parameters and the control parameter are transmitted to the RAKE receiving unit 230.

The reason that the receiving electric power of the pilot signal is measured in the searcher unit 210 is described. The pilot signal is obtained from the known data such as "111 . . . 111", and the electric power of the pilot signal is higher than that of each transmission data. Therefore, the receiving electric power of the pilot channel can be precisely measured.

Accordingly, the particular phase offsets of the particular incoming data waves allocated to the figure units 290A to 290C are set according to the searcher detecting signal. Also, the other phase offsets other than the particular phase offsets of the particular incoming data waves allocated to the figure units 290A to 290C are always measured in the searcher unit 210, and the searcher detecting signal is output to the interference signal detecting unit 240. Therefore, even though the conditions of the propagation paths changes with time in the mobile communication, the RAKE reception and the interference removal can be effectively performed.

In this embodiment, the search window period is set to a long length in an initial time of the searching operation in the search window setting unit 212 to measure conditions of propagation paths in a wide range. Thereafter, when one incoming pilot wave is detected, the length of the search window period is adjusted to match with a delay spread.

Figure 5:
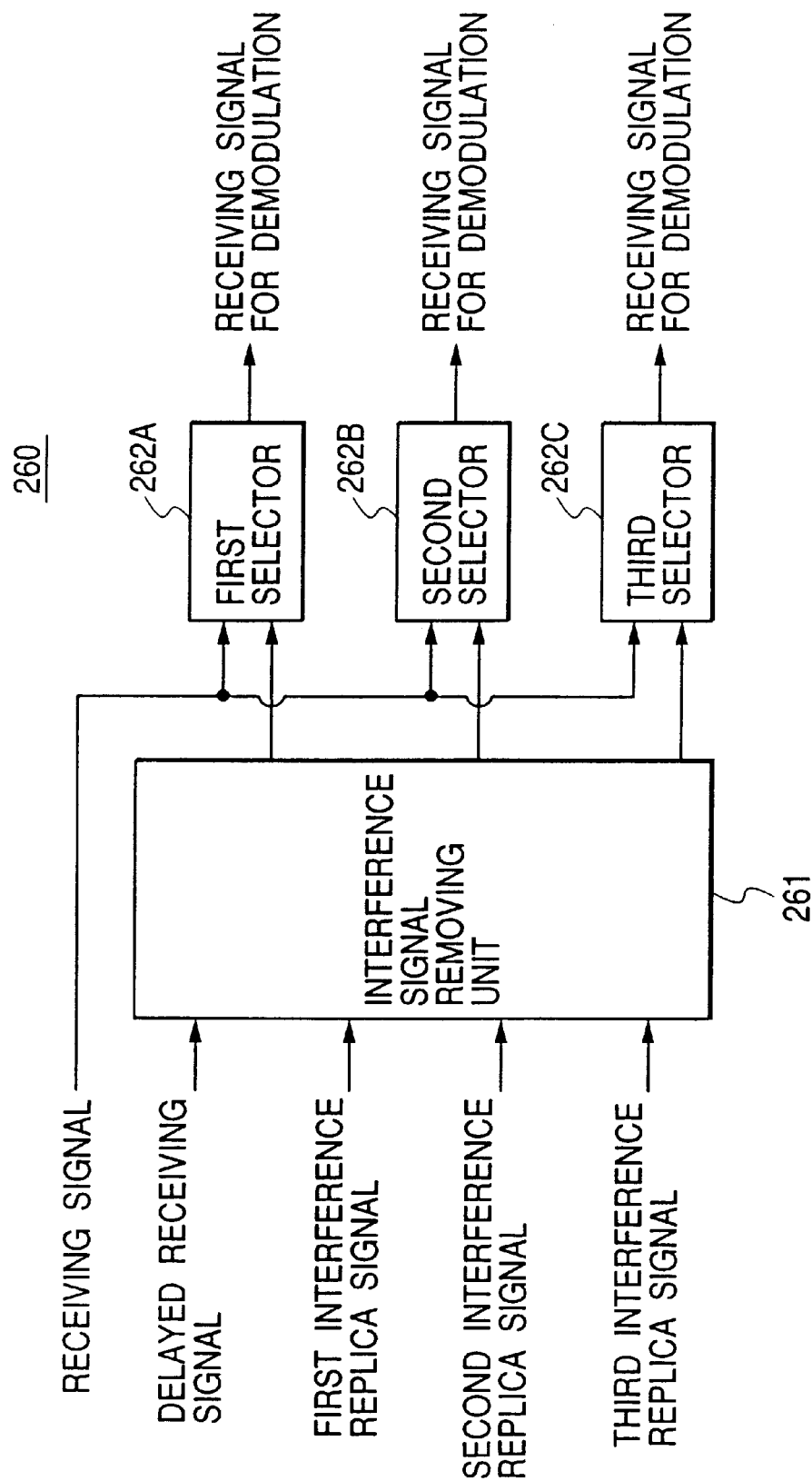
FIG. 5 is a block diagram of a signal allocating unit shown in FIG. 2.

FIG. 5 is a block diagram of the signal allocating unit 260.

As shown in FIG. 5, the signal allocating unit 260 comprises:

an interference signal removing unit 261 for receiving each of the three interference replica signals produced in the interference signal detecting unit 240 and a delayed receiving 9n signal held in the buffer unit 250, in cases where the demodulation of the interference removed receiving signal in the interference-removed demodulating operation is informed from the system control unit 280, and subtracting the interference replica signal from the delayed receiving signal in the interference removing operation to produce an interference removed receiving signal, in which the interference signal is removed from the delayed receiving signal, for each interference replica signal;

a first selector 262A for receiving the receiving signal currently received from the transmitting apparatus 100 in cases where the demodulation of the receiving signal in the interference removing operation is informed from the system control unit 280, outputting the receiving signal to the first finger unit 290A as a receiving signal for demodulation, receiving the interference removed receiving signal produced from the interference replica signal corresponding to the first interference signal, in cases where the demodulation of the interference removed receiving signal in the interference-removed demodulating operation is informed from the system control unit 280, and outputting the interference removed receiving signal corresponding to the first interference signal to the first finger unit 290A as a receiving signal for demodulation;

a second selector 262B for receiving the receiving signal currently received from the transmitting apparatus 100 in cases where the demodulation of the receiving signal in the interference removing operation is informed from the system control unit 280, outputting the receiving signal to the second finger unit 290B as a receiving signal for demodulation, receiving the interference removed receiving signal produced from the interference replica signal corresponding to the second interference signal, in cases where the demodulation of the interference removed receiving signal in the interference-removed demodulating operation is informed from the system control unit 280, and outputting the interference removed receiving signal corresponding to the second interference signal to the second finger unit 290B as a receiving signal for demodulation; and a third selector 262C for receiving the receiving signal currently received from the transmitting apparatus 100, in cases where the demodulation of the receiving signal in the interference removing operation is informed from the system control unit 280, outputting the receiving signal to the third finger unit 290C as a receiving signal for demodulation, receiving the interference removed receiving signal produced from the interference replica signal corresponding to the third interference signal, in cases where the demodulation of the interference removed receiving signal in the interference-removed demodulating operation is informed from the system control unit 280, and outputting the interference removed receiving signal corresponding to the third interference signal to the third finger unit 290C as a receiving signal for demodulation.

In the above configuration, an operation of the signal allocating unit 260 is described.

In cases where the system control unit 280 judges according to the channel information to perform the removal of an interference signal from the receiving signal in the RAKE receiving unit 230, the interference removing operation is performed. That is, the receiving signal currently input from the transmitting apparatus 100 to the first selector 262A is transmitted to the first finger unit 290A as a receiving signal for demodulation to produce a first interference signal, the receiving signal currently input from the transmitting apparatus 100 to the second selector 262B is transmitted to the second finger unit 290B as a receiving signal for demodulation to produce a second interference signal, and the receiving signal currently input from the transmitting apparatus 100 to the third selector 262C is transmitted to the third finger unit 290C as a receiving signal for demodulation to produce a third interference signal. Therefore, the receiving signal is demodulated in the RAKE receiving unit 230, and an interference replica signal corresponding to each interference signal is produced in the interference signal detecting unit 240. Also, the receiving signal currently input from the transmitting apparatus 100 is held in the buffer unit 250 during the interference removing operation.

In contrast, in cases where the demodulation of an interference removed receiving signal is performed in the RAKE receiving unit 230 in the interference-removed demodulating operation, each interference replica signal transmitted from the interference signal detecting unit 240 is subtracted from the receiving signal held in the buffer unit 250 in the interference signal removing unit 261. Therefore, an interference removed receiving signal corresponding to the first interference signal, an interference removed receiving signal corresponding to the second interference signal and an interference removed receiving signal corresponding to the third interference signal are produced. Thereafter, the interference removed receiving signal corresponding to the first interference signal is output to the first finger unit 290A through the first selector 262A as a receiving signal for demodulation, the interference removed receiving signal corresponding to the second interference signal is output to the second finger unit 290B through the second selector 262B as a receiving signal for demodulation, and the interference removed receiving signal corresponding to the third interference signal is output to the third finger unit 290C through the third selector 262C as a receiving signal for demodulation.

Figure 6:
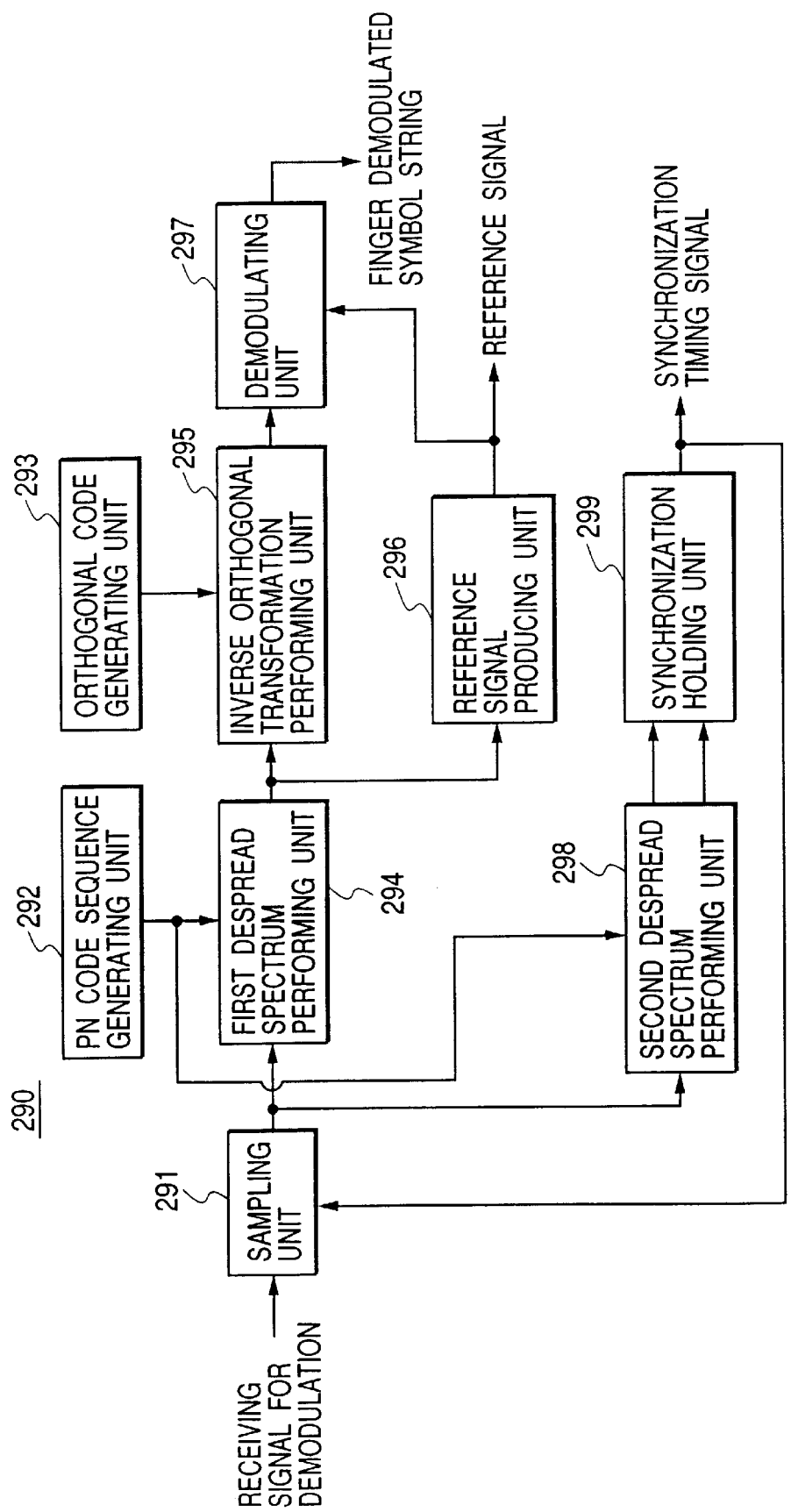
FIG. 6 is a block diagram of each finger unit shown in FIG. 2.

FIG. 6 is a block diagram of each finger unit 290.

As shown in FIG. 6, each finger unit 290 comprises:

a sampling unit 291 for over-sampling the receiving signal for demodulation at a chip rate two or more times that of the receiving signal for demodulation, sampling the over-sampled receiving signal for demodulation at a chip rate clock coincident with a synchronization timing indicated by a synchronization timing signal to obtain a first sampled receiving signal and sampling the over-sampled receiving signal for demodulation at a second chip rate clock phase-shifting from the synchronization timing by 1/2 chip to obtain a second sampled receiving signal;

a PN code sequence generating unit 292 for generating the PN code sequence, which is the same as that used in the transmitting apparatus 100, according to the particular phase offset allocated to the finger unit 290 under the control of the system control unit 280;

an orthogonal code generating unit 293 for generating an orthogonal code, which is the same as that used in the transmitting apparatus 100 for the particular code channel allocated to the finger unit 290, according to the particular in phase offset and the particular code channel allocated to the finger unit 290 under the control of the system control unit 280;

a first despread spectrum performing unit 294 for performing a despread spectrum for the first sampled receiving signal with the PN code sequence generated in the PN code sequence generating unit 292 to produce a first despread spectrum signal;

an inverse orthogonal transformation performing unit 295 for performing an inverse orthogonal transformation for the first despread spectrum signal produced in the first despread spectrum performing unit 294 with the orthogonal code generated in the orthogonal code generating unit 293 to produce an inverse orthogonal transformation signal corresponding to the particular code channel allocated to the finger unit 290;

a reference signal producing unit 296 for obtaining an amplitude error and a phase error from the difference between the pilot signal obtained from the known data in the transmitting apparatus 100 and the incoming pilot waves of the pilot channel obtained in the receiving apparatus 200, and performing a carrier reproduction for the pilot signal included in the first despread spectrum signal according to the amplitude error and the phase error to produce the reference signal in the interference removing operation and the interference-removed demodulating operation;

a demodulating unit 297 for performing a quadrature phase shift keying (QPSK) demodulation for the inverse orthogonal transformation signal produced in the inverse orthogonal transformation performing unit 295 while performing a synchronized phase detection for the inverse orthogonal transformation signal according to the reference signal produced in the reference signal producing unit 296 to produce a finger demodulated symbol string;

a second despread spectrum performing unit 298 for performing a despread spectrum for the second sampled receiving signal with the PN code sequence generated in the PN code sequence generating unit 292 to produce an E(early)-ch despread signal, of which a phase is advanced by 1/2 chip, and an L(late)-ch despread signal of which a phase is delayed by 1/2 chip; and a synchronization holding unit 299 for producing the synchronization timing signal from the E-ch despread signal and the L-ch despread signal produced in the second despread spectrum performing unit 298.

In the above configuration, an operation of the finger units 290A to 290C is described. The timing parameters and the control parameter determined in the finger parameter determining unit 219 of the searcher unit 210 are transmitted to each finger unit 290, so that the particular phase offset and the particular code channel are allocated to each finger unit 290.

In the synchronization holding unit 299, one of the E-ch despread signal and the L-ch despread signal produced in the second despread spectrum performing unit 298 is phase-inverted, a synthesized signal is produced from the inverted signal and the other signal, a phase synchronization error between the transmitting apparatus 100 and the receiving apparatus 200 is detected from a signal of which a phase changes in an S shape for a phase of the synthesized signal, so that a synchronization timing signal is produced.

Thereafter, a first sampled receiving signal is produced according to the synchronization timing signal in the sampling unit 291, and a despread spectrum is performed for the first sampled receiving signal with the PN code sequence used in the transmitting apparatus 100 to produce a first despread spectrum signal. Because the PN code sequence is generated in the PN code sequence generating unit 292 according to the particular phase offset allocated to the finger unit 290, the first despread spectrum signal corresponds to the incoming data waves and the particular incoming pilot wave relating to the particular phase offset allocated to the finger unit 290 in the interference removing operation, and the first despread spectrum signal corresponds to the incoming data waves relating to the particular phase offset allocated to the finger unit 290 in the interference-removed demodulating operation.

Thereafter, a carrier reproduction for a component of the first despread spectrum signal corresponding to the pilot channel is performed in the reference signal producing unit 296 in the interference removing operation and the interference-removed demodulating operation, so that a reference signal corresponding to the particular incoming pilot wave of the particular phase offset allocated to the finger unit 290 is produced from the first despread spectrum signal. In the interference removing operation, a first reference signal produced in the reference signal producing unit 296 of the first finger unit 290A, a second reference signal produced in the reference signal producing unit 296 of the second finger unit 290B and a third reference signal produced in the reference signal producing unit 296 of the third finger unit 290C are output to the interference signal detecting unit 240 and the demodulating unit 297. Also, in the interference-removed demodulating operation, the first, second and third reference signals are output to the channel synthesizing unit 300 and the demodulating unit 297.

Therefore, the interference replica signal corresponding to each finger unit 290 is produced in the interference signal detecting unit 240 from the reference signal and the searcher detecting signal in the interference removing operation, and the interference removed receiving signal produced from the interference replica signal and the receiving signal in the signal allocating unit 260 is input to each corresponding finger unit 290 as the receiving signal for demodulation in the interference-removed demodulating operation.

Also, in the inverse orthogonal transformation performing unit 295, an inverse orthogonal transformation is performed for the first despread spectrum signal produced in the first despread spectrum performing unit 294 with the orthogonal code, so that an inverse orthogonal transformation signal is produced. In this case, because the orthogonal code used in the transmitting unit 100 for the particular code channel allocated to the finger unit 290 is generated according to the particular phase offset allocated to the finger unit 290, the inverse orthogonal transformation signal extracted from the first despread spectrum signal corresponds to the particular incoming data wave of the particular code channel relating to the particular phase offset.

Thereafter, a QPSK demodulation is performed for the inverse orthogonal transformation signal in the demodulating unit 297 while performing a synchronized phase detection for the inverse orthogonal transformation signal according to the reference signal, so that a finger demodulated symbol string is produced from the inverse orthogonal transformation signal. Therefore, a first finger demodulated symbol string is output from the first finger unit 290A to the channel synthesizing unit 300, a second finger demodulated symbol string is output from the second finger unit 290B to the channel synthesizing unit 300, and a third finger demodulated symbol string is output from the third finger unit 290C to the channel synthesizing unit 300.

Figure 7A:
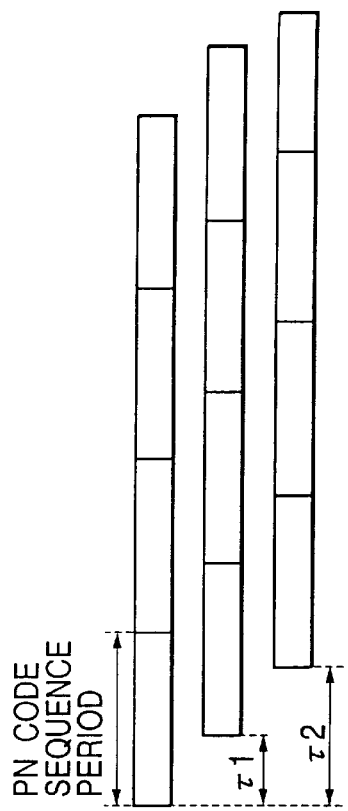
FIG. 7A shows a first allocation example in which only one code channel is used to transmit the transmission data from the transmitting apparatus to the receiving apparatus.
Figure 7B:
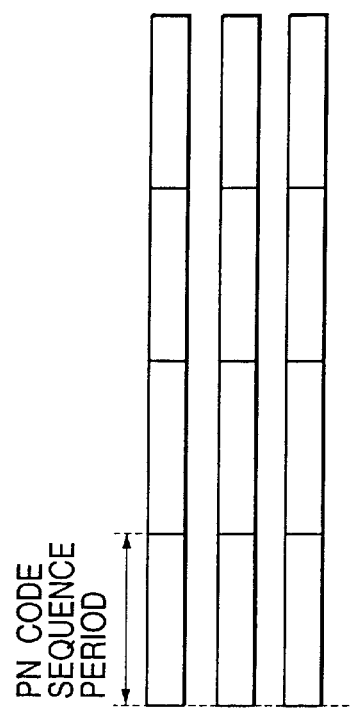
FIG. 7B shows a second allocation example in which three code channels are used to transmit the transmission data from the transmitting apparatus to the receiving apparatus.
Figure 7C:
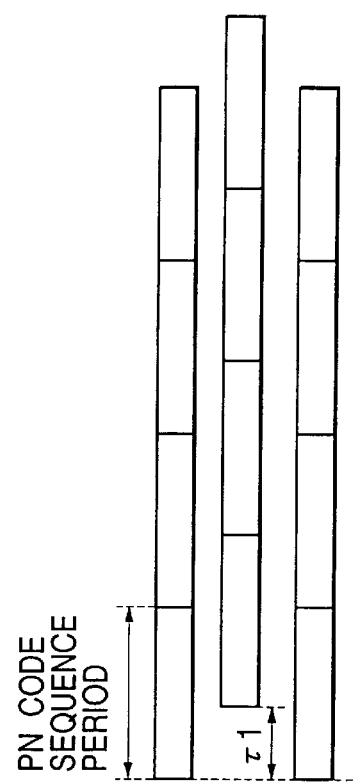
FIG. 7C shows a third allocation example in which two code channels are used to transmit the transmission data from the transmitting apparatus to the receiving apparatus.

The allocation of the particular code channels and the particular phase offsets to the finger units 290A to 290C is shown in FIG. 7A, FIG. 7B and FIG. 7C as an example.

FIG. 7A shows a first allocation example in which only one code channel is used to transmit the transmission data from the transmitting apparatus 100 to the receiving apparatus 200.

As shown in FIG. 7A, the code channel W3 is allocated to all finger units 290A to 290C, and three phase offsets are allocated to the finger units 290A to 290C in the order of decreasing the receiving electric power. That is, the phase offset corresponding to the path-1 is allocated to the first finger 290A, the phase offset τ1 corresponding to the path-2 is allocated to the second finger 290B, and the phase offset τ2 corresponding to the path-3 is allocated to the third finger 290C. In this case, the demodulation based on the RAKE reception of the code channel W3 is performed in the finger units 290A to 290C.

FIG. 7B shows a second allocation example in which three code channels are used to transmit the transmission data from the transmitting apparatus 100 to the receiving apparatus 200.

As shown in FIG. 7B, the phase offset of the path-1 corresponding to the highest electric power is allocated to all finger units 290A to 290C, and three code channels are allocated to the finger units 290A to 290C. That is, the code channel W1 is allocated to the first finger unit 290A, the code channel W2 is allocated to the second finger unit 290B, and the code channel W3 is allocated to the second finger unit 290C. In this case, the demodulation based on the plural code channel for the code channels W1, W2 and W3 is performed in the finger units 290A, 290B and 290C. Therefore, the incoming wave of the path-1 corresponding to the code channel W1, the incoming wave of the path-1 corresponding to the code channel W2 and the incoming wave of the path-1 corresponding to the code channel W3 are demodulated in parallel to each other.

FIG. 7C shows a third allocation example in which two code channels are used to transmit the transmission data from the transmitting apparatus 100 to the receiving apparatus 200.

As shown in FIG. 7C, it is set that an importance degree of the code channel W1 is higher than that of the code channel W2, the code channel W1 and the phase offset of the path-1 corresponding to the highest electric power are allocated to the first finger unit 290A, and the code channel W1 and the phase offset of the path-2 corresponding to the second highest electric power are allocated to the second finger unit 290B. Also, the code channel W2 and the phase offset of the path-1 corresponding to the highest electric power are allocated to the third finger unit 290C. In this case, the demodulation based on the RAKE reception of the code channel W1 is performed in the first and second finger units 290A and 290B, the demodulation based on the reception of the code channel W2 is performed in the third finger unit 290C, the demodulation based on the plural code channel for the code channels W1 and W2 is performed in the finger units 290A, 290B and 290C. That is, the demodulation based on the RAKE reception and the demodulation based on the plural code channel are mixed in this example.

Figure 8:
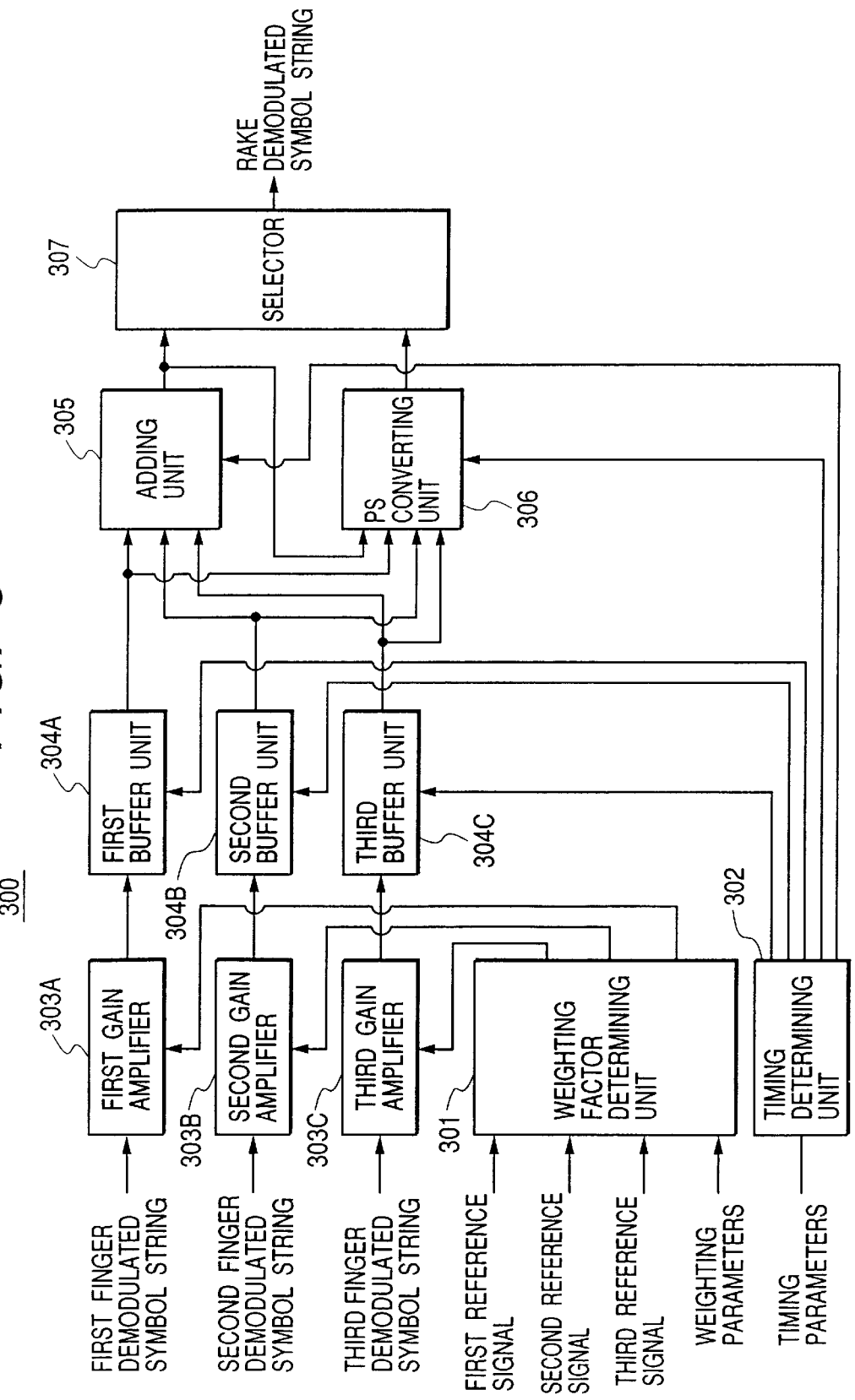
FIG. 8 is a block diagram of a channel synthesizing unit shown in FIG. 2.

FIG. 8 is a block diagram of the channel synthesizing unit 300.

As shown in FIG. 8, the channel synthesizing unit 300 comprises:

a weighting factor determining unit 301 for determining a first weighting factor K1 for the first finger demodulated symbol string, a second weighting factor K2 for the second finger demodulated symbol string and a third weighting factor K3 for the third finger demodulated symbol string according to the first reference signal, the second reference signal and the third reference signal produced in the finger units 290A to 290C in the interference-removed demodulating operation and the weighting parameters determined in the finger parameter determining unit 219 of the searcher unit 210;

a timing determining unit 302 for determining a synthesizing timing for synthesizing a RAKE demodulated symbol string from the finger demodulated symbol strings produced in the finger units 290A to 290C according to the timing parameters determined in the finger parameter determining unit 219 of the searcher unit 210 and outputting a timing signal indicating the timing;

a first gain amplifier 303A for amplifying the first finger demodulated symbol string produced in the first finger unit 290A with the first weighting factor K1 determined in the weighting factor determining unit 301 to produce a first weighted finger demodulated symbol string;

a second gain amplifier 303B for amplifying the second finger demodulated symbol string produced in the second finger unit 290B with the second weighting factor K2 determined in the weighting factor determining unit 301 to produce a second weighted finger demodulated symbol string;

a third gain amplifier 303C for amplifying the third finger demodulated symbol string produced in the third finger unit 290C with the third weighting factor K3 determined in the weighting factor determining unit 301 to produce a third weighted finger demodulated symbol string;

a first buffer unit 304A for holding the first weighted finger demodulated symbol string produced in the first gain amplifier 303A;

a second buffer unit 304B for holding the second weighted finger demodulated symbol string produced in the second gain amplifier 303B;

a third buffer unit 304C for holding the third weighted finger demodulated symbol string produced in the third gain amplifier 303C;

an adding unit 305 for selecting two or three buffer units 304 corresponding to two or three finger units 290A to 290C, in which the demodulation based on the RAKE reception (refer to FIG. 7A) is performed, according to the control parameter determined in the finger parameter determining unit 219 of the searcher unit 210, reading out two or three weighted finger demodulated symbol strings held in the selected buffer units 304 according to the timing signal output from the timing determining unit 302 and adding the weighted finger demodulated symbol strings to each other to produce a summed finger demodulated symbol string;

a parallel-serial (P/S) converting unit 306 for selecting one or three buffer units 304 corresponding to one or three finger units 290A to 290C, in which the demodulation based on the plural code channel (refer to FIG. 7B) is performed, according to the control parameter determined in the finger parameter determining unit 219 of the searcher unit 210, reading out the weighted finger demodulated symbol strings held in the buffer units 304 corresponding to the selected finger units according to the timing signal output from the timing determining unit 302, serially combining the weighted finger demodulated symbol strings in a prescribed order to produce a combined finger demodulated symbol string in cases where the three buffer units 304 are selected, reading out the summed finger demodulated symbol string from the adding unit 305 in cases where the demodulation based on the RAKE reception and the demodulation based on the plural code channel (refer to FIG. 7C) are performed in the finger units 290A to 290C, and serially combining the weighted finger demodulated symbol string read out from the selected buffer unit 304 and the summed finger demodulated symbol string to produce a combined finger demodulated symbol string; and a selector 307 for selecting the summed finger demodulated symbol string produced in the adding unit 305 as a RAKE demodulated symbol string, in cases where the demodulation based on the RAKE reception is performed in all finger units 290A to 290C, and selecting the combined finger demodulated symbol string produced in the P/S converting unit 306 as a RAKE demodulated symbol string in cases where the demodulation based on the plural code channel are performed in all finger units 290A to 290C or the demodulation based on the RAKE reception and the demodulation based on the plural code channel are performed in the finger units 290A to 290C.

In the above configuration, an operation of the channel synthesizing unit 300 is described.

The first finger demodulated symbol string output from the first finger unit 290A is amplified with a first weighting factor K1 in the first gain amplifier 303A, the second finger demodulated symbol string output from the second finger unit 290B is amplified with a second weighting factor K2 in the second gain amplifier 303B, and the third finger demodulated symbol string output from the third finger unit 290C is amplified with a third weighting factor K3 in the third gain amplifier 303C. In this case, in cases where it is judged by the system control unit 280 that any interference removing operation is not performed in the spread spectrum signal receiving apparatus 200, the weighting factors K1, K2 and K3 are produced in the weighting factor determining unit 301 from the first, second and third reference signals output from the finger units 290A to 290C from which the finger demodulated symbol strings produced in the first demodulation operation are output. Also, in cases where it is judged by the system control unit 280 that the interference removing operation is performed in the RAKE receiving unit 230, the weighting factors K1, K2 and K3 are produced in the weighting factor determining unit 301 from the first, second and third reference signals output from the finger units 290A to 290C from which the finger demodulated symbol strings produced in the second demodulation operation after the interference removing operation are output. That is, the first, second and third reference signals produced in the second demodulation operation are used for the calculation of the weighting factors K1, K2 and K3. Therefore, the weighting factors K1, K2 and K3 are produced on condition that a path diversity effect is maximized.

Thereafter, the first weighted finger demodulated symbol string is held in the first buffer unit 304A, the second weighted finger demodulated symbol string is held in the second buffer unit 304B, and the third weighted finger demodulated symbol string is held in the third buffer unit 304C. Here, in cases where it is judged by the system control unit 280 that the interference removing operation is performed, the calculation of the weighting factors K1 to K3 and the multiplication in the gain amplifiers 303A to 303C are performed only for the finger demodulated symbol strings obtained in the interference-removed demodulating operation after the interference removing operation, and outputs of the gain amplifiers 303A to 303C are held in the buffer units 304A to 304C.

Also, the phase offsets allocated to the finger units 290A to 290C are included in the timing parameters determined in the finger parameter determining unit 219 of the searcher unit 210, and a synthesizing timing is determined from the difference among the relative delay times of the phase offsets in the timing determining unit 302, and a timing signal indicating the synthesizing timing is output. The finger demodulated symbol strings of the buffer units 304A to 304C are supplied to the adding unit 305 and the P/S converting unit 306 according to the timing signal.

In this case, as shown in FIG. 7A, in cases where the demodulation based on the RAKE reception is performed in the finger units 290A to 290C, the weighted finger demodulated symbol strings held in the buffer units 304A to 304C are read out to the adding unit 305 according to the control parameter and are added to each other to produce a summed finger demodulated symbol string, and an output of the adding unit 305 is selected by the selector 307, so that the summed finger demodulated symbol string is output as a RAKE demodulated symbol string.

Also, as shown in FIG. 7B, in cases where the demodulation based on the plural code channel is performed in the finger units 290A to 290C, the weighted finger demodulated symbol strings held in the buffer units 304A to 304C are read out to the P/S converting unit 306 according to the control parameter, the weighted finger demodulated symbol strings are rearranged in a prescribed order and are serially combined to each other to produce a combined finger demodulated symbol string. Thereafter, an output of the P/S converting unit 306 is selected by the selector 307, so that the combined finger demodulated symbol string is output as a RAKE demodulated symbol string.

Also, as shown in FIG. 7C, in cases where the demodulation based on the RAKE reception and the demodulation based on the plural code channel are performed in the finger units 290A to 290C, two buffer units 304 corresponding to two finger units 290, in which the demodulation based on the RAKE reception is performed, are selected, two weighted finger demodulated symbol strings held in the selected buffer unit 304 are read out to the adding unit 305 and are added to each other to produce a summed finger demodulated symbol string. The other weighted finger demodulated symbol string of the other buffer unit 304 is read out to the P/S converting unit 306 and is serially combined with the summed finger demodulated symbol string read out from the adding unit 305 to produce a combined finger demodulated symbol string. Thereafter, an output of the P/S converting unit 306 is selected by the selector 307, so that the combined finger demodulated symbol string is output as a RAKE demodulated symbol string.

Figure 9:
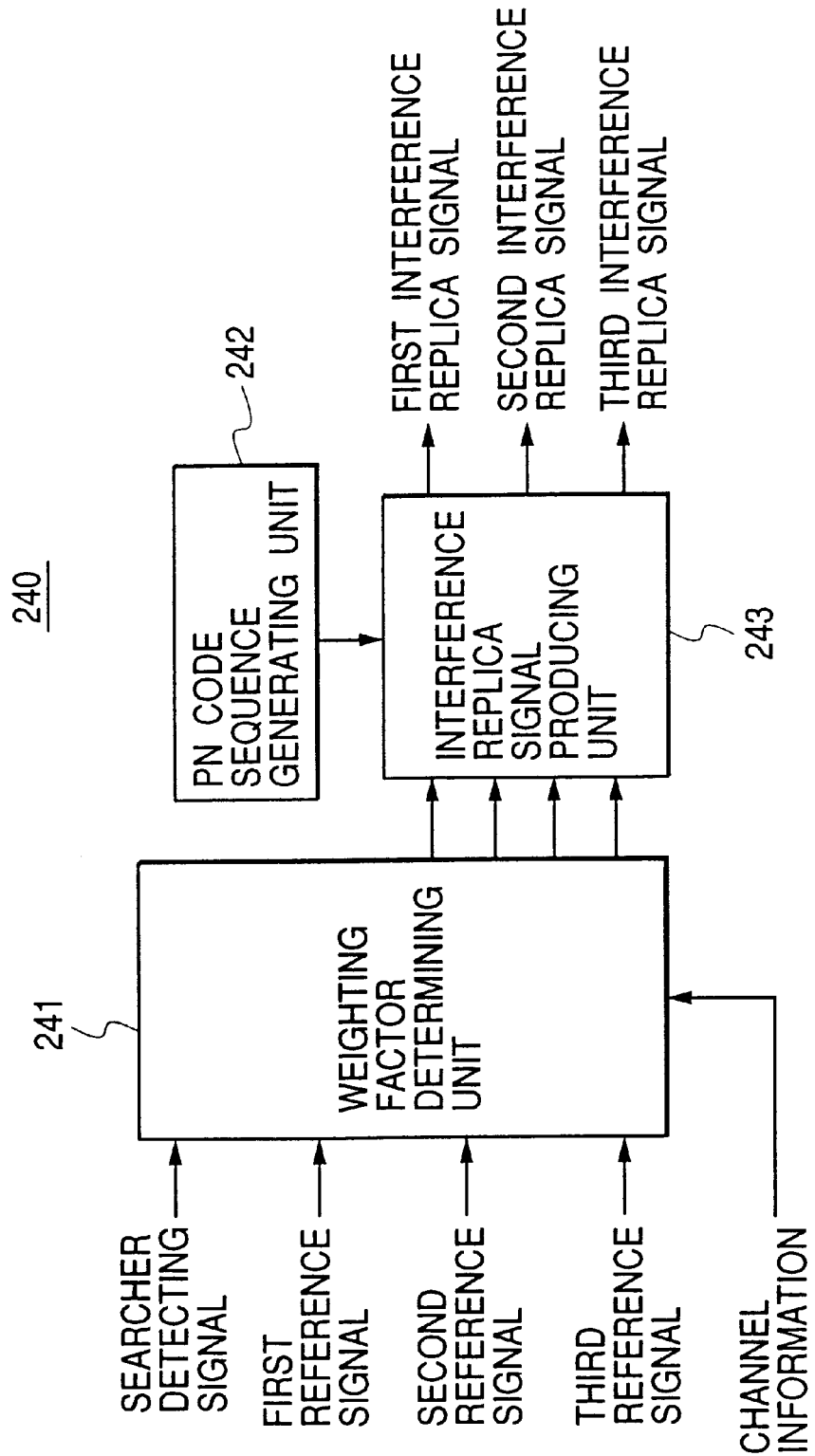
FIG. 9 is a block diagram of the interference signal detecting unit shown in FIG. 2.

FIG. 9 is a block diagram of the interference signal detecting unit 240.

As shown in FIG. 9, the interference signal detecting unit 240 comprises:

a weighting factor determining unit 241 for receiving the first reference signal, which corresponds to the particular incoming pilot wave of the particular phase offset allocated to the first finger unit 290A, from the first finger unit 290A, receiving the second reference signal, which corresponds to the particular incoming pilot wave of the particular phase offset allocated to the second finger unit 290B, from the second finger unit 290B, receiving the third reference signal, which corresponds to the particular incoming pilot wave of the particular phase offset allocated to the third finger unit 290C, from the third finger unit 290C, receiving the searcher detecting signal from the searcher unit 210, receiving the channel information from the system control unit 280, determining a weighting factor, with which each of the reference signals corresponding to one or more particular incoming pilot waves or each of remaining incoming pilot waves other than the particular incoming pilot waves is weighted, according to the receiving electric powers of the reference signals and the receiving electric powers of the other incoming pilot waves indicated by the searcher detecting signal, and weighting two remarked reference signals other than one reference signal and the remaining incoming pilot waves indicated by the searcher detecting signal with the corresponding weighting factor for each of the three reference signals to produce a first weighted reference signal, a second weighted reference signal, a third weighted reference signal and a weighted searcher detecting signal indicating the remaining incoming pilot waves;

a PN code sequence generating unit 242 for generating a PN code sequence, which is the same as that used in the transmitting apparatus 100, according to each of the phase offsets; and an interference replica signal producing unit 243 for performing a spread spectrum for the first weighted interference signal produced in the weighting factor determining unit 241 with the PN code sequence corresponding to the particular phase offset of the first reference signal to produce a first spread spectrum reference signal, performing a spread spectrum for the second weighted interference signal produced in the weighting factor determining unit 241 with the PN code sequence corresponding to the particular phase offset of the second reference signal to produce a second spread spectrum reference signal, performing a spread spectrum for the third weighted interference signal produced in the weighting factor determining unit 241 with the PN code sequence corresponding to the particular phase offset of the third reference signal to produce a third spread spectrum reference signal, performing a spread spectrum for each of the remaining incoming pilot waves of the weighted searcher detecting signal produced in the weighting factor determining unit 241 with the PN code sequence corresponding to the phase offset of the remaining incoming pilot wave to produce a spread spectrum searcher detecting signal, adding the second spread spectrum reference signal, the third spread spectrum reference signal and the spread spectrum searcher detecting signal to produce a first interference replica signal corresponding to the first reference signal, adding the first spread spectrum reference signal, the third spread spectrum reference signal and the spread spectrum searcher detecting signal to produce a second interference replica signal corresponding to the second reference signal, and adding the first spread spectrum reference signal, the second spread spectrum reference signal and the spread spectrum searcher detecting signal to produce a third interference replica signal corresponding to the third reference signal.

In the above configuration, an operation of the interference signal detecting unit 240 is described.

In cases where the system control unit 280 judges the performance of the interference removing operation, the RAKE reception is performed in the finger units 290A to 290C. In cases where the particular phase offsets allocated to the finger units 290A to 290C are different from each other (the demodulation of the RAKE reception), the first reference signal, the second reference signal and the third reference signal produced in the finger units 290A to 290C are input to the weighting factor determining unit 241. In contrast, in cases where the demodulation of the plural code channel is performed in the finger units 290A to 290C and the same particular phase offset is allocated to the finger units 290A to 290C, one of the reference signals is input to the weighting factor determining unit 241. Also, the searcher detecting signal having the remaining incoming pilot waves of the phase offsets other than the particular phase offsets (or the particular phase offset) allocated to the finger units 290A to 290C is input to the weighting factor determining unit 241.

In the weighting factor determining unit 241, in cases where the number of integrations (or an integration time) for the searcher detecting signal differs from that for each reference signal, the searcher detecting signal is normalized to make the number of integrations for the searcher detecting signal equal to that for each reference signal. Thereafter, a plurality of incoming pilot waves (called interference waves), which interfere with the particular incoming pilot wave of the particular phase offset allocated each of the finger units 290A to 290C, are selected from the reference signals and the normalized searcher detecting signal according to the number of incoming waves possible to be removed and an electric power limit value of interference waves transmitted as the channel information from the system control unit 280. Thereafter, the PN code sequence having an amplitude and phase offset of each interference wave is generated in the PN code sequence generating unit 242 to perform a spread spectrum for each interference wave, and the interference waves are added to each other every chip to produce an interference replica signal for each finger unit 290.

For example, conditions of the propagation paths measured in the searcher unit 210 are indicated by the searcher detecting signal shown in FIG. 4. The production of the interference replica signals in the RAKE reception is described with reference to FIG. 4 as an example.

In this example, as shown in FIG. 7A, the phase offset (=0) of the path-1 is allocated to the first finger unit 290A, the phase offset $\tau 1$ of the path-2 is allocated to the second finger unit 290B, and the phase offset $\tau 2$ of the path-3 is allocated to the third finger unit 290C. In the weighting factor determining unit 241, a weighting factor for the incoming pilot wave of the path-1, a weighting factor for the incoming pilot wave of the path-2, a weighting factor for the incoming pilot wave of the path-3 and a weighting factor for the incoming pilot wave of the path-4 are determined according to the receiving electric power P1 of the path-1 indicated by the first reference signal, the receiving electric power P2 of the path-2 indicated by the second reference signal, the receiving electric power P3 of the path-3 indicated by the third reference signal and the receiving electric power P4 of the path-4 indicated by the searcher detecting signal. For example, a weighting factor for the incoming pilot wave of the path-1 is set to 0.4, a weighting factor for the incoming pilot wave of the path-2 is set to 0.3, a weighting factor for the incoming pilot wave of the path-3 is set to 0.2, a weighting factor for the incoming pilot wave of the path-4 is set to 0.05, and a weighting factor for other incoming pilot waves is set to 0.05.

Thereafter, a spread signal obtained by spreading the second reference signal weighted with 0.3 with the PN code sequence of the phase offset $\tau 1$, a spread signal obtained by spreading the third reference signal weighted with 0.2 with the PN code sequence of the phase offset $\tau 2$ and a spread signal obtained by spreading the searcher detecting signal weighted with 0.05 with the PN code sequence of the phase offset $\tau 3$ are added to each other to produce a first interference replica signal functioning as an reference signal in the first finger unit 290A. Also, a spread signal obtained by spreading the first reference signal weighted with 0.4 with the PN code sequence of the phase offset $\tau=0$, a spread signal obtained by spreading the third reference signal weighted with 0.2 with the PN code sequence of the phase offset $\tau 2$ and a spread signal obtained by spreading the searcher detecting signal weighted with 0.05 with the PN code sequence of the phase offset $\tau 3$ are added to each other to produce a second interference replica signal functioning as an reference signal in the second finger unit 290B. Also, a spread signal obtained by spreading the first reference signal weighted with 0.4 with the PN code sequence of the phase offset $\tau=0$, a spread signal obtained by spreading the second reference signal weighted with 0.3 with the PN code sequence of the phase offset $\tau 1$ and a spread signal obtained by spreading the searcher detecting signal weighted with 0.05 with the PN code sequence of the phase offset $\tau 3$ are added to each other to produce a third interference replica signal functioning as an reference signal in the third finger unit 290C.

These interference replica signals are supplied to the signal allocating unit 260, each interference replica signal is removed from the receiving signal read out from the buffer unit 250 to produce the interference removed receiving signal, and each interference removed receiving signal is supplied to the finger units 290A to 290C. Therefore, the particular incoming data wave of the particular phase offset and the particular code channel allocated to each finger unit 290 is demodulated in the finger unit 290 without the interference of the pilot signal, and the finger demodulated symbol string, in which the interference signal is removed, is produced in each finger unit 290.

In the example shown in FIG. 7(b), the same phase offset (=0) of the path-1 is allocated to the finger units 290A to 290C. Therefore, the first interference replica signal corresponding to the phase offset $\tau=0$ of the path-1 is produced in the interference signal detecting unit 240, the first interference replica signal is removed from the receiving signal read out from the buffer unit 250 in the signal allocating unit 260 to produce the interference removed receiving signal, and the interference removed receiving signal is supplied to the finger units 290A to 290C. Therefore, the demodulation of the plural code channel is performed in the RAKE receiving unit 230.

In the example shown in FIG. 7(c), after the first reference signal and the second reference signal are obtained in the first finger unit 290A and the second finger unit 290B in the interference removing operation, the first interference replica signal corresponding to the phase offset τ=0 of the path-1 and the second interference replica signal corresponding to the phase offset τ=1 of the path-2 are produced in the interference signal detecting unit 240. Thereafter, the first interference replica signal is removed from the receiving signal read out from the buffer unit 250 in the signal allocating unit 260 to produce the interference removed receiving signal, and the interference removed receiving signal is supplied to the first finger unit 290A and the third finger unit 290C. Also, the second interference replica signal is removed from the receiving signal read out from the buffer unit 250 in the signal allocating unit 260 to produce the interference removed receiving signal, and the interference removed receiving signal is supplied to the second finger unit 290B. Therefore, the demodulation of the plural code channel for the code channels W1 and W2 is performed in the RAKE receiving unit 230.

In the spread spectrum communication apparatus of the present invention, the pilot channel is allocated for the pilot signal to perform the demodulation of the receiving signal while holding the synchronization with the receiving signal and performing the phase detection in the synchronized condition according to the pilot signal. Because the pilot channel is allocated for the pilot signal, a transmission electric power for the pilot channel can be set to be higher than that for each code channel. Because the transmission data is multiplied by the orthogonal code, the transmission electric power for the pilot channel can be set to a high value ranging from 20% to 40% of a total transmission electric power for all channels. Therefore, the synchronization can be held even at a low signal electric power Eb/No, so that the transmission data of each code channel can be demodulated by performing the phase detection in the synchronized condition. However, because the pilot channel is allocated for the pilot signal transmitted at a high electric power, even though the transmission data is transmitted by using a plurality of code channels, the pilot signal of the pilot channel functions as an interference signal for the transmission data, the pilot signal most inversely influencing on the demodulation of the transmission data is removed from the receiving signal. Also, even though an interference signal of the other users is received in the receiving apparatus 200, because the interference signal is originated in the pilot signals of the other users, the interference signal of the other users is removed from the receiving signal in the present invention.

In this embodiment, the pilot signal of the pilot channel is always transmitted from the transmitting apparatus 100. However, it is applicable that the pilot signal be periodically inserted and transmitted during a pilot signal inserting time period. Even though the pilot signal is periodically inserted and transmitted, because a transmission electric power for the pilot channel is higher than that for any code channel, it is effective to remove waves originated in the pilot signal from the receiving signal. In this case, the outputting of the interference replica signals from the interference signal detecting unit 240 is not always performed, but the outputting of the interference replica signals is performed only within the pilot signal inserting time period to remove waves originated in the pilot signal from the receiving signal.

Also, in this embodiment, the number of finger units is 3. However, the present invention is not limited to 3, and the number of finger units can be arbitrarily set. Also, one interference removing operation is performed. However, the present invention is not limited to one interference removing operation.

It is applicable that the code channels be ranked according to importance degrees allocated to the code channels. In this case, the number of finger units 290, to which one particular code channel is allocated, is increased as the importance degree of the particular code channel becomes higher. Also, the number of finger units 290, to which one particular code channel is allocated, depends on the number of code channels used in the transmitting apparatus 100. Also, it is applicable that it be judged by the system control unit 280 whether or not the interference removing operation be performed in one finger unit 290 corresponding to one particular code channel according to the importance degree of the particular code channel. For example, in cases where the importance degree of one particular code channel is low, the interference removing operation is not performed in one finger unit 290 corresponding to the particular code channel.

Also, it is applicable that the system control unit 280 judge whether or not an effect of the interference removal performed for one finger unit 290, in which one reference signal is produced, is high according to the channel information, two receiving electric powers of two particular incoming pilot waves indicated by the other reference signals and the receiving electric powers of the incoming pilot waves, which are indicated by the searcher detecting signal, other than the particular incoming pilot waves for each finger unit.

Also, the number of code channels in the transmitting apparatus 100 can be arbitrarily set. For example, in cases where the system control unit 280 judges that the interference removing effect for one finger unit 290 is high, the interference removing effect for the finger unit 290 is performed under the control of the system control unit 280.

FIGS. 10(a) to 10(f) show a timing chart of an example of the RAKE reception and the interference removing operation performed in the spread spectrum signal receiving apparatus 200 according to the searcher detecting signal shown in FIG. 4.

In this example, one frame period is set to one period of the PN code sequence, and the number of code channels allocated to the finger units 290A to 290C is 3 (code channel W1, code channel W2 and code channel W3).

FIG. 10(a) shows a timing for holding the receiving signal in the buffer unit 250. One frame of receiving signal is held in the buffer unit 250. That is, the receiving signal of the frame F1, the receiving signal of the frame F2, the receiving signal of the frame F3, ... are held in the buffer unit 250 in that order.

FIG. 10(b) shows a timing for reading out the receiving signal held in the buffer unit 250 in synchronization with a clock timing, which is six times faster than a chip rate, to repeat the reading-out six times for each frame unit.

FIG. 10(c) shows the phase offset of the path-1 and a group of code channels allocated to the first finger unit 290A, FIG. 10(d) shows the phase offset of the path-2 and a group of code channels allocated to the second finger unit 290B, and FIG. 10(e) shows the phase offset of the path-3 and a group of code channels allocated to the third finger unit 290C. As shown in FIGS. 10(c) to 10(e), the phase offsets are allocated to the first finger unit 290A, the second finger unit 290B and the third finger unit 290C in the order of decreasing the receiving electric power, each of the code channels W1, W2 and W3 is cyclically allocated to each finger unit 290 every two frames in that order, and a demodulated symbol string is output at a timing six times faster than that of a symbol rate.

As shown in FIGS. 10(c) to 10(e), each of the code channels W1, W2 and W3 is allocated every two frames, and two demodulations are performed for each of the code channels W1, W2 and W3. After the reference signal is obtained in each of the finger units 290A to 290C in the first demodulation, the second demodulation is performed in each of the finger units 290A to 290C, so that the interference removing operation and the RAKE reception are performed. Therefore, the code channels corresponding to the receiving signals read out from the buffer unit 250 are arranged in the order of W1, W1, W2, W2, W3 and W3. Also, FIG. 10(f) shows a timing for serially synthesizing each of a plurality of demodulated symbol strings, for which the interference removing operations and the RAKE receptions are performed in the order of the code channels W1, W2 and W3, in the channel synthesizing unit 300 and outputting the demodulated symbol strings at a clock timing which is three times faster than the symbol rate.

As is described above, the three code channels W1, W2 and W3 are respectively allocated to each of the finger units 290A to 290C every frame period, the interference removing operation and the RAKE reception are performed every frame period, and the demodulation is performed in each of the finger units 290A to 290C every frame period.

(Second Embodiment)

In this embodiment, pieces of transmission data transmitted at various processing gains (corresponding to various symbol time periods) from the spread spectrum signal transmitting apparatus 100 are received in a spread spectrum signal receiving apparatus, and each piece of transmission data transmitted at one processing gain is demodulated in a corresponding finger unit of the receiving apparatus while holding a synchronization with the transmission data in a low signal electric power Eb/No environment and performing a phase detection for the transmission data in a synchronized condition. Three examples of a transmission data format of the pieces of transmission data planned to be demodulated in the finger units are shown in FIG. 11A, FIG. 11B and FIG. 11C.

FIG. 11A shows an example of a transmission data format in which three pieces of transmission data of the same low processing gain (or the same data rate) corresponding to three data channels (that is, three code channels used for the transmission data) and a pilot signal corresponding to the pilot channel are listed, FIG. 11B shows an example of a transmission data format in which one piece of transmission data of a high processing gain corresponding to one data channel, two pieces of transmission data of the same low processing gain corresponding to two data channels and a pilot signal corresponding to the pilot channel are listed, and FIG. 11C shows an example of a transmission data format in which one piece of transmission data of a high processing gain corresponding to one data channel, one piece of transmission data of a middle processing gain corresponding to one data channel, one piece of transmission data of a low processing gain corresponding to one data channel and a pilot signal corresponding to the pilot channel are listed.

A pilot channel and a plurality of data channels (that is, code channels used for the transmission data) are allocated in each transmission data format, and each channel is distinguishable from the other channels according to the orthogonal codes used for the channels. Also, one of three processing gains corresponding to three symbol time periods is allocated to each data channel. Symbols corresponding to the processing gains are expressed by $a[x]$, $b[x]$ and $c[x]$ (here, a data number $x=0,1,2,\ldots$). The processing gain of the symbol $b[x]$ is two times that of the symbol $a[x]$, and the processing gain of the symbol $c[x]$ is four times that of the symbol $a[x]$.

$b[x]=2*a[x]$ $c[x]=4*a[x]$

Also, finger demodulation symbol time periods $Ta[x]$, $Tb[x]$ and $Tc[x]$ corresponding to the processing gains are expressed by using the symbols $a[x]$, $b[x]$ and $c[x]$.

$Ta[x]$=time period of $a[x]$ $Tb[x]$=time period of $b[x]$=time period of $2*a[x]$ $Tc[x]$=time period of $c[x]$=time period of $4*a[x]$ Therefore, $Tb[x]=2*Ta[x]$ $Tc[x]=4*Ta[x]$ are satisfied. In this case, because an electric power for each chip is fixed, an electric power $Pa[x]$ of the finger demodulation symbol time period $Ta[x]$, an electric power $Pb[x]$ of the finger demodulation symbol time period $Tb[x]$ and an electric power $Pc[x]$ of the finger demodulation symbol time period $Tc[x]$ are expressed as follows.

$Pa[x]$=electric power of $a[x]$ $Pb[x]$=electric power of $b[x]$=*electric power of* $2*a[x]$ $Pc[x]$=electric power of $c[x]$=*electric power of* $4*a[x]$ In this embodiment, the symbol $c[x]$ of the longest time period is set as a referential processing gain, the symbol $Tc[x]$ is set as a referential processing gain time period. In this case, an electric power $Pp$ for the pilot channel is set to be two times the electric power $Pc[x]$ for the referential processing gain time period $Tc[x]$.

$Pp$=electric power of $2*c[x]$

That is, to perform the demodulation of the transmission data received as the receiving signal while holding the synchronization with the transmission data and performing a phase detection in the synchronization condition, the pilot channel is used as one of the code channels, and the electric power for the pilot channel is set to be larger than that for the other code channels (that is, the data channels). Therefore, even though a low signal electric power Eb/No is set for the transmission data, the synchronization can be held, and the demodulation of the transmission data of each code channel can be performed at the phase detection in the synchronization condition.

Figure 12:
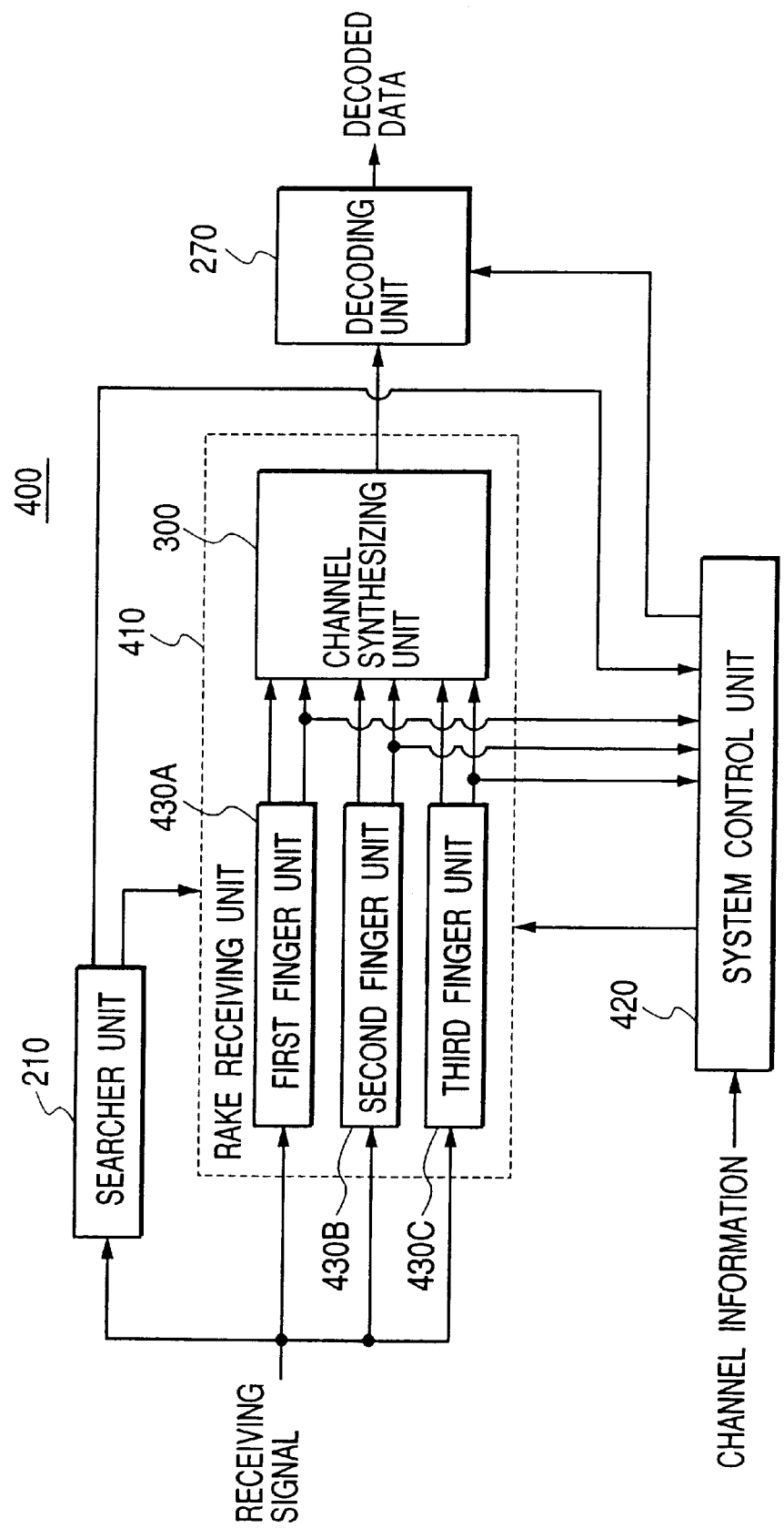
FIG. 12 is a block diagram of a spread spectrum signal receiving apparatus of a spread spectrum communication apparatus according to a second embodiment of the present invention.

FIG. 12 is a block diagram of a spread spectrum signal receiving apparatus of the spread spectrum communication apparatus according to a second embodiment.

As shown in FIG. 12, a spread spectrum signal receiving apparatus 400 comprises:

the searcher unit 210;

a RAKE receiving unit 410 having three finger units for receiving the finger parameters from the searcher unit 210, producing three reference signals respectively corresponding to a particular incoming pilot wave of one particular phase offset allocated one finger unit according to the finger parameters, holding the synchronization with the transmission data in each finger unit and demodulating three particular incoming data waves respectively corresponding to one particular phase offset and one particular code channel indicated by the finger parameters to produce a RAKE demodulated symbol string;

the decoding unit 270; and a system control unit 420 for controlling signal receiving and processing operations of the searcher unit 210, the RAKE receiving unit 410 and the decoding unit 270 according to the channel information (including the number of code channels to be processed in the RAKE receiving unit 410, the importance degree for transmission data of each code channel and transmission data format information), the conditions of the propagation paths indicated by the searcher detecting signal produced in the searcher unit 210 and the conditions of the propagation paths indicated by the reference signals produced in the RAKE receiving unit 410.

The RAKE receiving unit 410 comprises:

three finger units 430 (a first finger unit 430A, a second finger unit 430B and a third finger unit 430C) for respectively performing a despread spectrum, an inverse orthogonal transformation and a demodulation for one particular incoming data wave corresponding to one particular phase offset and one particular code channel allocated by the searcher unit 210 to produce a finger demodulation symbol, producing one reference signal (a first reference signal, a second reference signal or a third reference signal) from one particular incoming pilot wave corresponding to the particular phase offset and producing a synchronization timing signal used to hold the synchronization with the transmission data transmitted from the transmitting apparatus 100; and the channel synthesizing unit 300.

Figure 13:
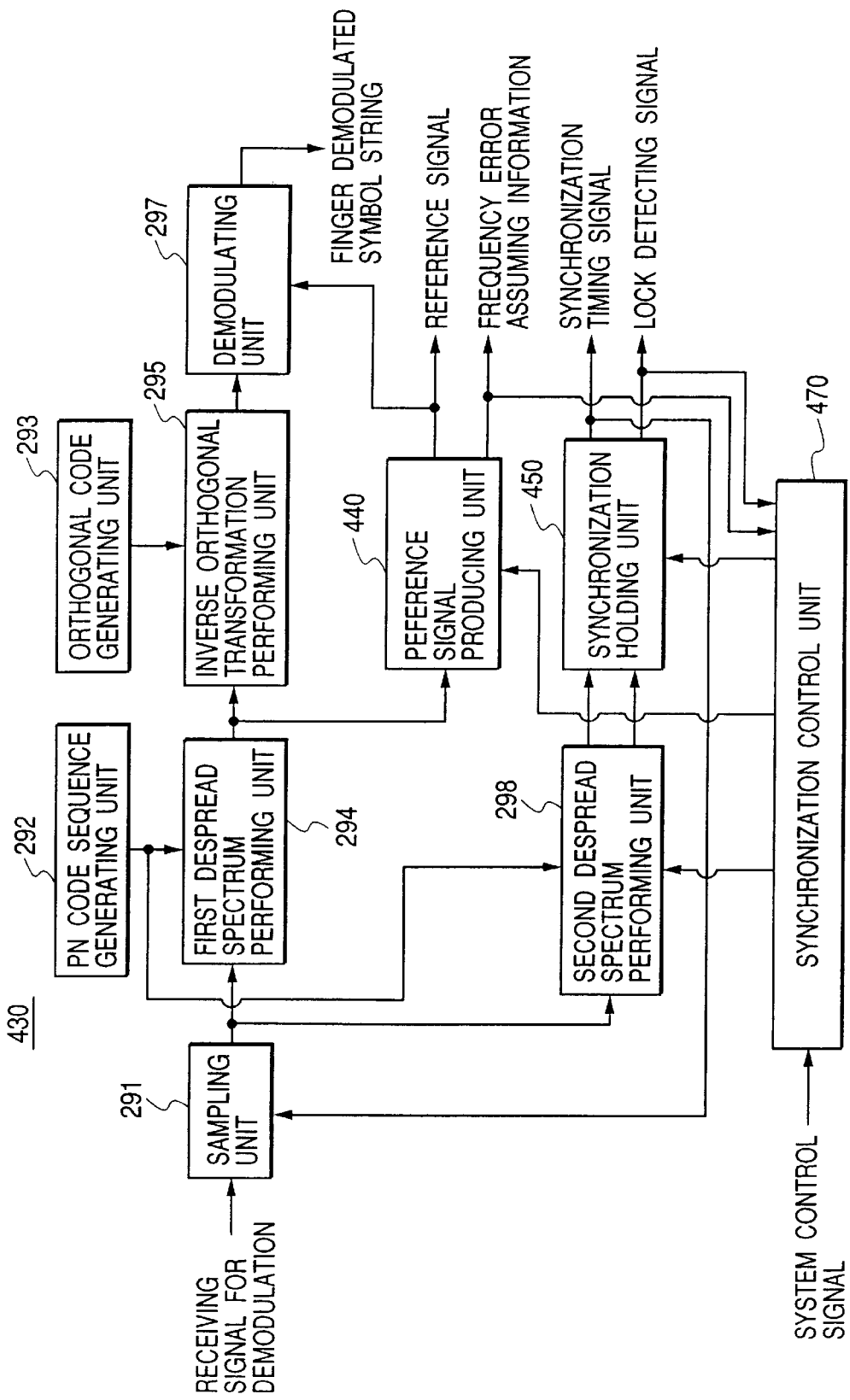
FIG. 13 is a block diagram of each finger unit of the spread spectrum signal receiving apparatus shown in FIG. 12.

FIG. 13 is a block diagram of each finger unit 430.

As shown in FIG. 13, each finger unit 430 comprises:

the sampling unit 291; the PN code sequence generating unit 292; the orthogonal code generating unit 293; the first despread spectrum performing unit 294; the inverse orthogonal transformation performing unit 295;

a reference signal producing unit 440 for obtaining an amplitude error and a phase error from the difference between the pilot signal obtained from the known data in the transmitting apparatus 100 and the incoming pilot waves of the pilot channel obtained in the receiving apparatus 200, performing a carrier reproduction for the pilot signal included in the first despread spectrum signal according to the amplitude error and the phase error to produce the reference signal and outputting integration information while holding the synchronization with the transmission data transmitted from the transmitting apparatus 100 according to a synchronization control signal;

the demodulating unit 297; the second despread spectrum performing unit 298;

a synchronization holding unit 450 for integrating the E-ch despread signal and the L-ch despread signal produced in the second despread spectrum performing unit 298 in an integration time period, which is determined according to the processing gain of the transmission data allocated to the finger unit 430, according to a synchronization control signal, while holding the synchronization with the transmission data transmitted from the transmitting apparatus 100 according to the synchronization control signal, to obtain a phase degree, detecting a phase error between the transmitting apparatus 100 and the receiving apparatus 400 according to the phase degree, filtering a signal indicating the phase error to produce a synchronization timing signal and producing a lock detecting signal, indicating whether or not the synchronization with the transmission data transmitted from the transmitting apparatus 100 is held, according to the phase error; and a synchronization control unit 470 for receiving a system control signal indicating the transmission data format information of the transmission data and finger allocating information from the system control unit 420, producing the synchronization control signal required for the synchronization holding according to the system control signal and the lock detecting signal produced in the synchronization holding unit 450 and outputting the synchronization control signal to the reference signal producing unit 440 and the synchronization holding unit 450.

Figure 14:
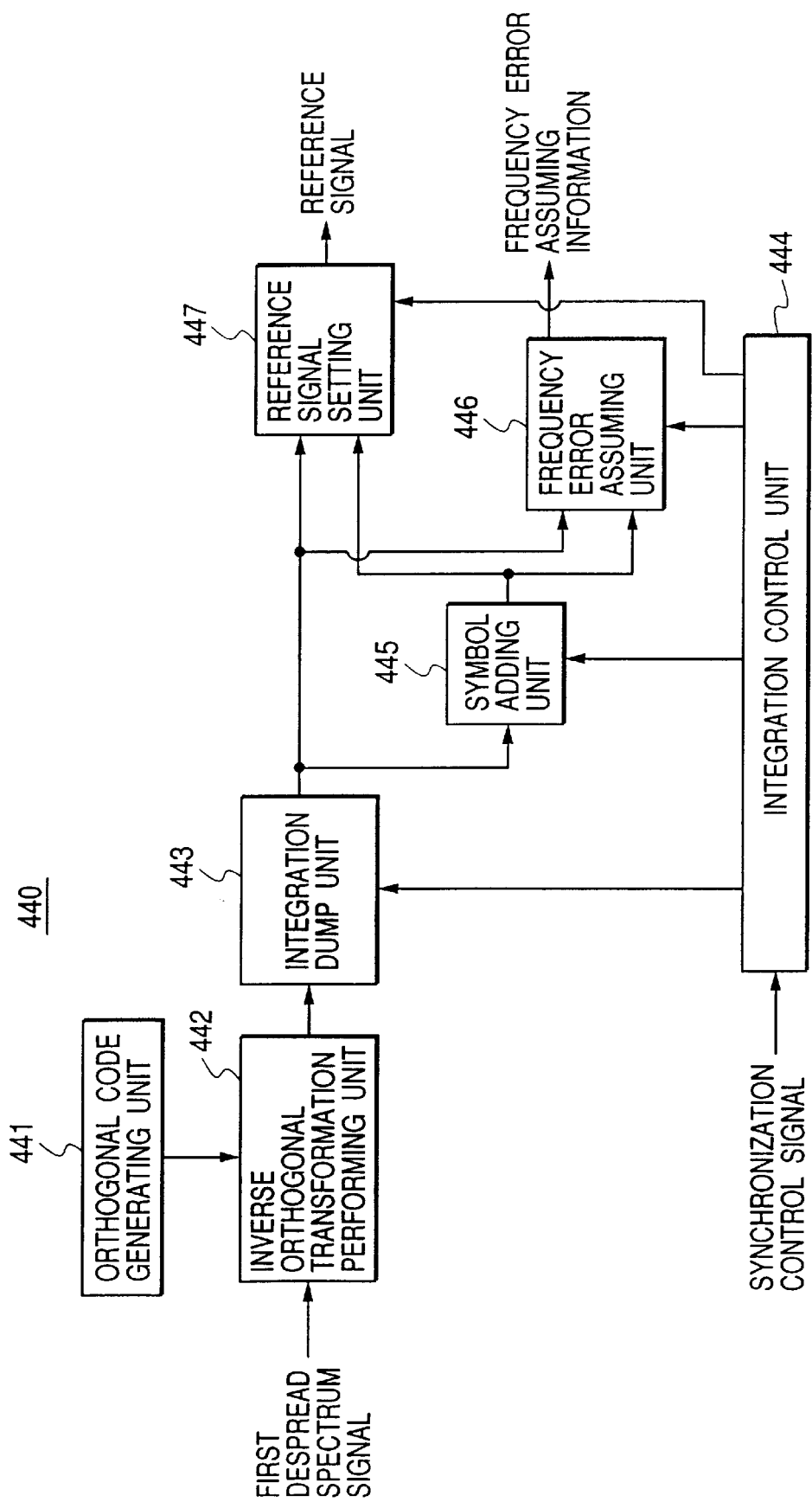
FIG. 14 is a block diagram of a reference signal producing unit of the finger unit shown in FIG. 13.

FIG. 14 is a block diagram of the reference signal producing unit 440.

As shown in FIG. 14, the reference signal producing unit 440 comprises an integration control unit 444 for setting a first integration time period to a first processing gain time period $Ta[x]$, $Tb[x]$ or $Tc[x]$ corresponding to a first processing gain $a[x]$, $b[x]$ or $c[x]$ of the transmission data allocated to the finger unit 430 according to the synchronization control signal transmitted from the synchronization control unit 210, setting a referential integration time period to the referential processing gain time period $Tc[x]$ corresponding to the referential processing gain $c[x]$ according to the synchronization control signal in cases where the first processing gain of the transmission data allocated to this finger unit 430 is not the referential processing gain $c[x]$, setting a second integration time period to a second processing gain time period corresponding to a second processing gain according to the synchronization control signal in cases where the first processing gain of the transmission data having one particular phase offset allocated to this finger unit 430 is lower than the second processing gain of the transmission data corresponding to another or other finger units 430 to which the same particular phase offset as that of the transmission data allocated to this finger unit 430 is allocated, setting a first symbol addition number to a ratio of the referential processing gain to the first processing gain of the transmission data corresponding to this finger unit 430 according to the synchronization control signal, setting a second symbol addition number to a ratio of the second processing gain to the first processing gain of the transmission data corresponding to this finger unit 430 according to the synchronization control signal in cases where the first processing gain of this finger unit 430 is lower than the second processing gain of the other finger units 430, setting a third symbol addition number to a ratio of the referential processing gain to the second processing gain according to the synchronization control signal, producing first frequency change information from first frequency error assumption information obtained in this reference signal producing unit 440, producing second frequency change information from second frequency error assumption information obtained in this reference signal producing unit 440 in cases where the first processing gain of this finger unit 430 is lower than the second processing gains of the other finger units 430, and controlling the reference signal producing unit 440 according to the synchronization control signal, the first integration time period, the referential integration time period, the first frequency change information, the second frequency change information and the symbol addition number;

an orthogonal code generating unit 441 for generating an orthogonal code, which is the same as that used for the pilot channel in the transmitting apparatus 100, according to the particular phase offset allocated to the finger unit 430;

an inverse orthogonal transformation performing unit 442 for performing an inverse orthogonal transformation for the first despread spectrum signal produced in the first despread spectrum performing unit 294 with the orthogonal code generated in the orthogonal code generating unit 441 to produce an inverse orthogonal transformation pilot signal;

an integration dump unit 443 for performing an integration dump, in which the inverse orthogonal transformation pilot signal produced in the inverse orthogonal transformation performing unit 442 is integrated for each first integration time period determined in the integration control unit 444, to produce an original integration dump value for each first integration time period;

a symbol adding unit 445 for performing a symbol addition, in which the original integration dump value produced in the integration dump unit 443 for each first integration time period is repeatedly added by the first symbol addition number transmitted from the integration control unit 444, to produce a first symbol added value for each referential integration time period corresponding to the referential processing gain, dividing the first symbol added value by the first symbol addition number to produce an average integration dump value for each first integration time period, performing another symbol addition, in which the original integration dump value is repeatedly added by the second symbol addition number transmitted from the integration control unit 444, to produce a second original integration dump value for each second integration time period corresponding to the second processing gain, in cases where the first processing gain of this finger unit 430 is lower than the second processing gain of the other finger units 430 to which the same particular phase offset as that allocated to this finger unit 430 is allocated, performing another symbol addition, in which the second original integration dump value is repeatedly added by the third symbol addition number transmitted from the integration control unit 444, to produce a second symbol added value for each referential integration time period corresponding to the referential processing gain, and dividing the second symbol added value by the third symbol addition number to produce a second average integration dump value for each second integration time period, a frequency error assuming unit 446 for detecting an original phase change degree indicated by the original integration dump value produced in the integration dump unit 443 for each first integration time period, detecting an average phase change degree indicated by the average integration dump value produced in the symbol adding unit 445 for each first integration time period, assuming an original frequency error by differentiating the original phase change degree, assuming an average frequency error by differentiating the average phase change degree, outputting the original frequency error as first frequency error assumption information corresponding to this finger unit 430 to the synchronization control unit 470 of this finger unit 430 in cases where the first processing gain of the transmission data allocated to this finger unit 430 is the referential processing gain, comparing the original frequency error and the average frequency error in cases where the first processing gain of the transmission data allocated to this finger unit 430 is lower than the referential processing gain, outputting the average frequency error as first frequency error assumption information corresponding to this finger unit 430 to the synchronization control unit 470 of this finger unit 430 in cases where the original frequency error is larger than the average frequency error, outputting the original frequency error as first frequency error assumption information corresponding to this finger unit 430 to the synchronization control unit 470 of this finger unit 430 in cases where the original frequency error is equal to or smaller than the average frequency error, detecting a second original phase change degree indicated by the second original integration dump value produced in the symbol adding unit 445 for each second integration time period, detecting a second average phase change degree indicated by the second average integration dump value produced in the symbol adding unit 445 for each second integration time period, assuming a second original frequency error by differentiating the second original phase change degree, assuming a second average frequency error by differentiating the second average phase change degree, comparing the second original frequency error and the second average frequency error, outputting the second average frequency error as second frequency error assumption information corresponding to the other finger units 430, to which the same particular phase offset as that allocated to this finger unit 430 is allocated, to the synchronization control unit 470 of this finger unit 430 in cases where the second original frequency error is larger than the second average frequency error, and outputting the second original frequency error as second frequency error assumption information corresponding to the other finger units 430 to the synchronization control unit 470 of this finger unit 430 in cases where the second original frequency error is equal to or smaller than the second average frequency error; and a reference signal setting unit 447 for producing a reference signal corresponding to this finger unit 430 from the original integration dump values produced in the integration dump unit 443 according to the first frequency change information transmitted from the integration control unit 444 in cases where the first processing gain of the transmission data allocated to this finger unit 430 is the referential processing gain, producing a reference signal corresponding to this finger unit 430 from the original integration dump values produced in the integration dump unit 443 according to the first frequency change information transmitted from the integration control unit 444 in cases where the transmission data of the first processing gain lower than the referential processing gain is allocated to this finger unit 430 and the original frequency error is equal to or smaller than the average frequency error, producing a reference signal corresponding to this finger unit 430 from the average integration dump values produced in the symbol adding unit 445 according to the first frequency change information transmitted from the integration control unit 444 in cases where the transmission data of the first processing gain lower than the referential processing gain is allocated to this finger unit 430 and the original frequency error is larger than the average frequency error, producing a reference signal corresponding to the other finger units 430, to which the same particular phase offset as that allocated to this finger unit 430 is allocated, from the second average integration dump values produced in the symbol adding unit 445 according to the second frequency change information transmitted from the integration control unit 444 in cases where the first processing gain of the transmission data having one particular phase offset allocated to this finger unit 430 is lower than the second processing gains corresponding to the other finger units 430 and the second original frequency error is larger than the second average frequency error, and producing a reference signal corresponding to the other finger units 430 from the second original integration dump values produced in the symbol adding unit 445 according to the second frequency change information transmitted from the integration control unit 444 in cases where the first processing gain of this finger unit 430 is lower than the second processing gains of the other finger units 430 and the second original frequency error is equal to or smaller than the second average frequency error.

In cases where the orthogonal code of a Walsh number=0 is used for the pilot channel, the orthogonal code generating unit 441 and the inverse orthogonal transformation performing unit 442 can be omitted.

Figure 15:
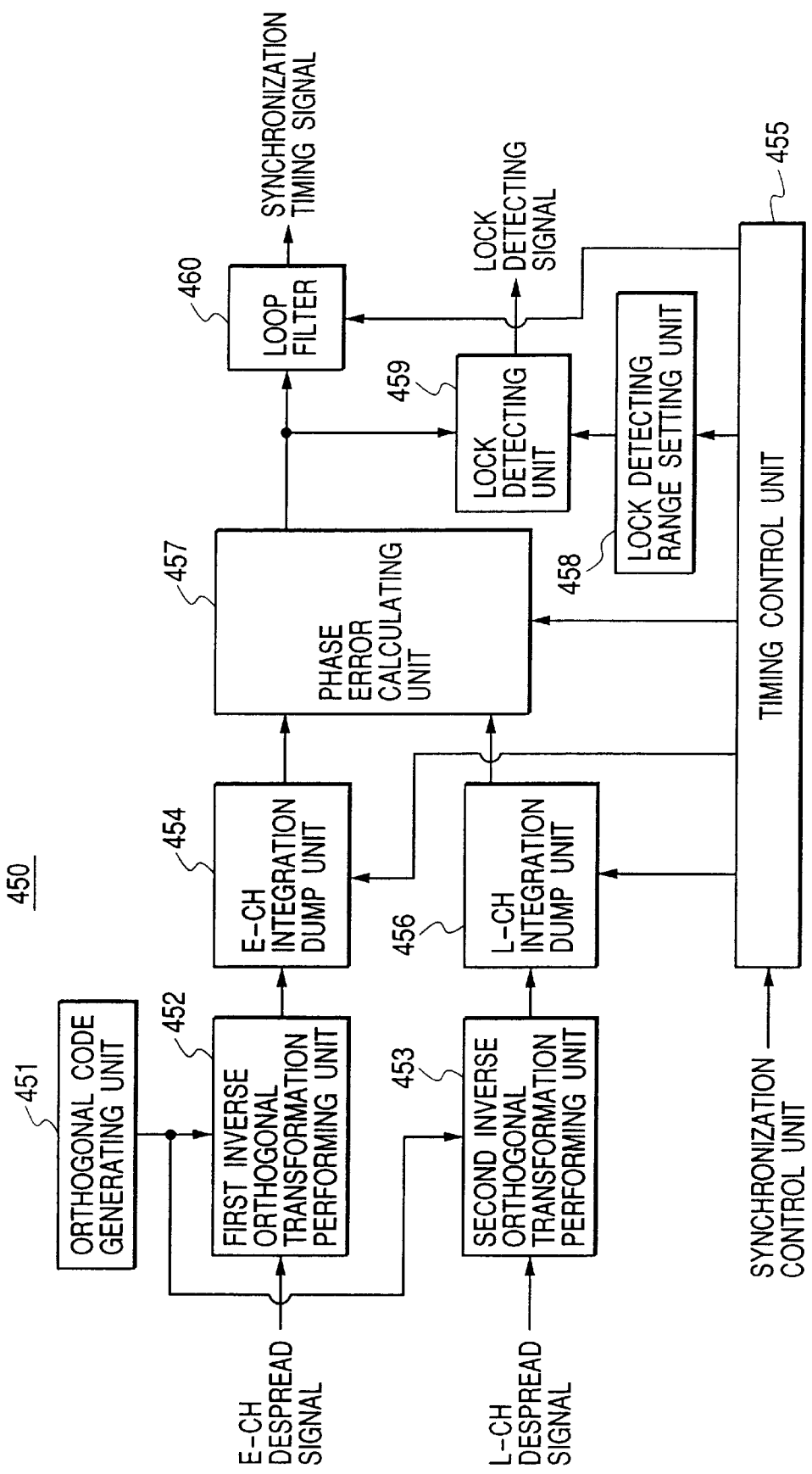
FIG. 15 is a block diagram of a synchronization holding unit of the finger unit shown in FIG. 13.

FIG. 15 is a block diagram of the synchronization holding unit 450.

As shown in FIG. 15, the synchronization holding unit 450 comprises an orthogonal code generating unit 451 for generating an orthogonal code, which is the same as that used for the pilot channel in the transmitting apparatus 100, according to the particular phase offset allocated to the finger unit 430;

a first inverse orthogonal transformation performing unit 452 for performing an inverse orthogonal transformation for the E-ch despread signal, of which a phase is advanced by 1/2 chip, produced in the second despread spectrum performing unit 298 with the orthogonal code generated in the orthogonal code generating unit 451 to produce an E-ch inverse orthogonal transformation pilot signal;

a second inverse orthogonal transformation performing unit 453 for performing an inverse orthogonal transformation for the L-ch despread signal, of which a phase is delayed by 1/2 chip, produced in the second despread spectrum performing unit 298 with the orthogonal code generated in the orthogonal code generating unit 451 to produce a L-ch inverse orthogonal transformation pilot signal;

an E-ch integration dump unit 454 for performing an integration dump, in which the E-ch inverse orthogonal transformation pilot signal produced in the first inverse orthogonal transformation performing unit 452 is integrated in an integration time period transmitted from a timing control unit 455 to produce an E-ch integration dump value indicating an E-ch phase degree;

an L-ch integration dump unit 456 for performing an integration dump, in which the L-ch inverse orthogonal transformation pilot signal produced in the second inverse orthogonal transformation performing unit 453 is integrated in the integration time period transmitted from the timing control unit 455 to produce an L-ch integration dump value indicating an L-ch phase degree;

a phase error calculating unit 457 for calculating a transmission electric power from the E-ch integration dump value produced in the E-ch integration dump unit 454 and the L-ch integration dump value produced in the L-ch integration dump unit 456 in the integration time period transmitted from the timing control unit 455 and calculating a phase error between the transmission data of the particular data channel received in the spread spectrum receiving apparatus 400 and the transmission data of the particular data channel prepared in the spread spectrum transmitting apparatus 100 in the integration time period according to a difference in phase degree between the E-ch integration dump value and the L-ch integration dump value;

a lock detecting range setting unit 458 for setting a lock detecting range, which is used to judge a lock condition or an unlock condition indicating that the synchronization set according to the data format information and the finger allocation information transmitted from the timing control unit 455 is held or is not held, according to the frequency error assumption information output from the frequency error assuming unit 446 and the first processing gain a[x], b[x] or c[x] of the transmission data allocated to the finger unit 430;

a lock detecting unit 459 for comparing the phase error calculated in the phase error calculating unit 457 and the threshold value set in the lock detecting range setting unit 458, outputting a lock detecting signal indicating that the synchronization with the transmission data transmitted from the transmitting apparatus 100 is held in cases where the phase error is within the lock detecting range, and outputting a lock detecting signal indicating that the synchronization with the transmission data transmitted from the transmitting apparatus 100 is not held in cases where the phase error is out of the lock detecting range;

a loop filter 460 for setting a group of filter gain values indicating a time constant and a loop gain according to gain information transmitted from the timing control unit 455 and performing the filtering for a signal of the phase error produced in the phase error calculating unit 457 according to the group of filter gain values to produce a synchronization timing signal; and the timing control unit 455 for setting the integration time period provided for the E-ch integration dump unit 454 and the L-ch integration dump unit 456 to the finger demodulation symbol time period Ta[x], Tb[x] or Tc[x] of the processing gain a[x], b[x] or c[x] of the transmission data allocated to the finger unit 430 in cases where the change of noises or fading in the propagation paths is small, setting the integration time period provided for the E-ch integration dump unit 454 and the L-ch integration dump unit 456 to the referential processing gain time period Tc[x] of the referential processing gain c[x], informing the lock detecting range setting unit 458 of the frequency changing width determined according to the frequency error assumption information, informing the loop filter 460 of the gain information determined according to the data format information, the finger allocation information and the frequency error assumption information, and controlling the E-ch integration dump unit 454, the L-ch integration dump unit 456, the phase error calculating unit 457, the lock detecting range setting unit 458 and the loop filter 460 according to the synchronization control signal transmitted from the synchronization control unit 470.

The loop filter 460 is made of a low pass filter. When the synchronization timing signal output from the loop filter 460 is fed to a voltage control oscillator, a clock signal synchronized with a clock of the transmitting apparatus 100.

Figure 16:
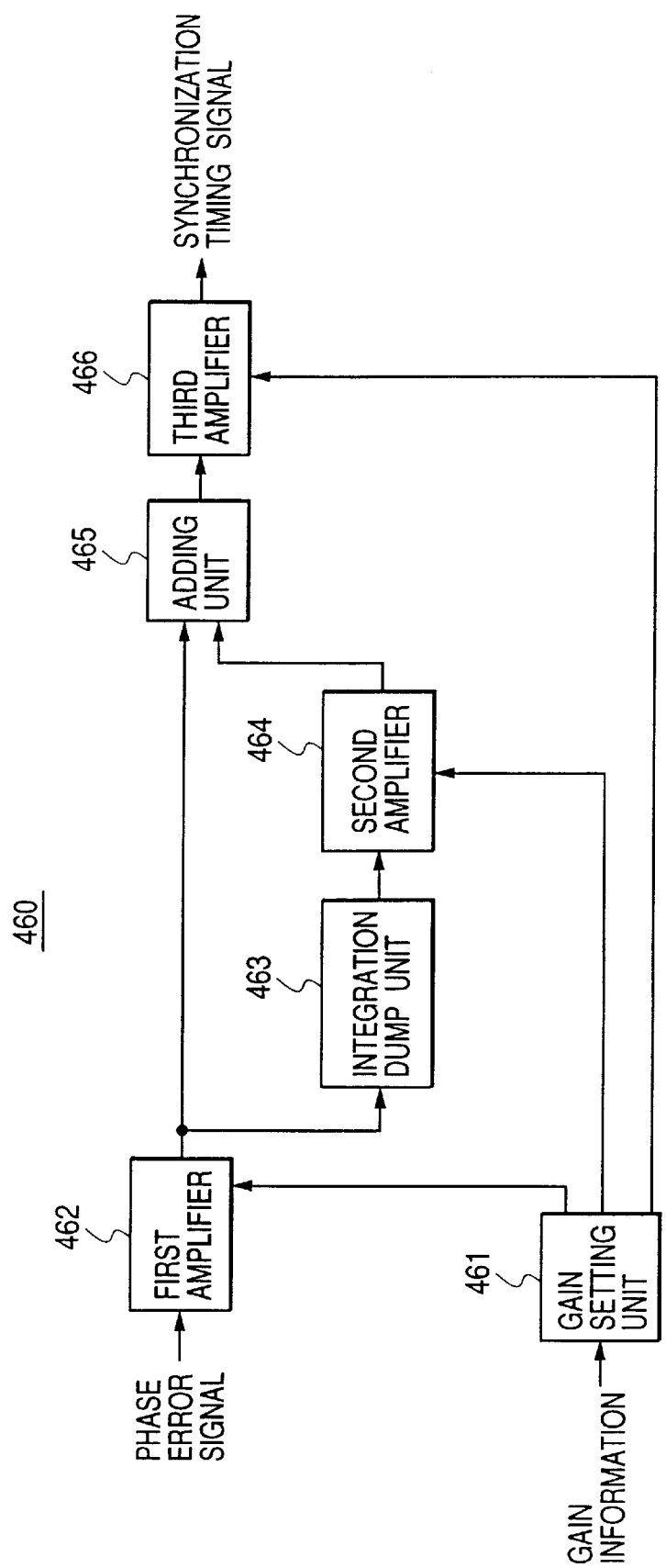
FIG. 16 is a block diagram of a loop filter of the synchronization holding unit shown in FIG. 15.

FIG. 16 is a block diagram of the loop filter 460.

As shown in FIG. 16, the loop filter 460 comprises a gain setting unit 461 for setting a first filter gain value G1, a second filter gain value G2 and a third filter gain value G3 according to the gain information transmitted from the timing control unit 455;

a first amplifier 462 for amplifying the signal of the phase error produced in the phase error calculating unit 457 with the first filter gain value G1 set in the gain setting unit 461 to produce an amplified phase error signal;

an integration dump unit 463 for integrating the amplified phase error signal produced in the first amplifier 462 to produce an integration dump value;

a second amplifier 464 for amplifying the integration dump value produced in the integration dump unit 463 with the second filter gain value G2 set in the gain setting unit 461 to produce an amplified integration dump value;

an adding unit 465 for adding the amplified phase error signal produced in the first amplifier 462 and the amplified integration dump value produced in the second amplifier 464 together to produce an added value; and a third amplifier 466 for amplifying the added value produced in the adding unit 465 with the third filter gain value G3 set in the gain setting unit 461 to produce the synchronization timing signal.

The filter gain values G1, G2 and G3 are changed according to a symbol rate of the transmission data.

In the above configuration of the spread spectrum signal receiving apparatus 400, an operation of a synchronization holding is described with reference to FIG. 11A, FIG. 11B and FIG. 11C.

In the example of the transmission data format shown in FIG. 11A, first transmission data of a first data channel Ch1 transmitted to the first finger unit 430A, second transmission data of a second data channel Ch2 transmitted to the second finger unit 430B and third transmission data of a third data channel Ch3 transmitted to the third finger unit 430C have the same processing gain expressed by the symbol a[x], and the first transmission data, the second transmission data and the third transmission data are demodulated in the finger units 430A to 430C in parallel to each other. In this case, because the electric power for the pilot channel is set to 0 dB for each symbol, the electric power for the first data channel Ch1, the electric power for the second data channel Ch2 and the electric power for the third data channel Ch3 are set to −9 dB (=10* log Pa/Pp) for each symbol a[x].

In the example of the transmission data format shown in FIG. 11B, first transmission data of a first data channel Ch1 transmitted to the first finger unit 430A has the processing gain expressed by the symbol c[x], and second transmission data of a second data channel Ch2 transmitted to the second finger unit 430B and third transmission data of the second data channel Ch2 transmitted to the third finger unit 430C have the same processing gain expressed by the symbol a[x]. Therefore, the RAKE reception is performed in the finger units 430B and 430C. The first transmission data, the second transmission data and the third transmission data are demodulated in the finger units 430A to 430C in parallel to each other. In this case, because the electric power for the pilot channel is set to 0 dB for each symbol, the electric power for the first data channel Ch1 is set to −3 dB (=10*log Pc/Pp) for each symbol c[x], and the electric power for the second data channel Ch2 and the electric power for the third data channel Ch3 are set to −9 dB (=10*log Pa/Pp) for each symbol a[x].

In the example of the transmission data format shown in FIG. 11C, first transmission data of a first data channel Ch1 transmitted to the first finger unit 430A has the processing gain expressed by the symbol c[x], second transmission data of a second data channel Ch2 transmitted to the second finger unit 430B has the processing gain expressed by the symbol b[x], and third transmission data of the second data channel Ch2 transmitted to the third finger unit 430C has the processing gain expressed by the symbol a[x]. The first transmission data, the second transmission data and the third transmission data are demodulated in the finger units 430A to 430C in parallel to each other. In this case, because the electric power for the pilot channel is set to 0 dB for each symbol, the electric power for the first data channel Ch1 is set to −3 dB (=10*log Pc/Pp) for each symbol c[x], the electric power for the second data channel Ch2 is set to −6 dB (=10*log Pb/Pp) for each symbol b[x], and the electric power for the third data channel Ch3 are set to −9 dB (=10*log Pa/Pp) for each symbol a[x].

Next, the production of the reference signal and the synchronization holding in the example of the transmission data format shown in FIG. 11A are described. In this example, a parallel demodulation for three data channels is performed. Therefore, as is described with reference to FIG. 7B in the first embodiment, a particular phase offset (that is, path-1) of a particular incoming data wave having the highest electric power among those of the incoming data waves is allocated to each finger unit 430 by the searcher unit 210. In this case, even though the synchronization with the particular incoming data wave of the first data channel Ch1, the synchronization with the particular incoming data wave of the second data channel Ch2 and the synchronization with the particular incoming data wave of the third data channel Ch3 are separately held in the finger units 430A to 430C, because each synchronization is performed while following the same specific incoming pilot wave of the path-1 in the pilot channel, the same reference signal and the same synchronization timing signal are produced in the finger units 430A to 430C. Therefore, it is not required to perform the production of the reference signal and the synchronization holding in each finger unit, but it is sufficient to perform the production of the reference signal and the synchronization holding in one finger unit. The reference signal and the synchronization timing signal produced in this finger unit are used in the other finger units.

For example, the reference signal and the synchronization timing signal are produced in the reference signal producing unit 440 and the synchronization holding unit 450 of the first finger unit 430A, the demodulation of the transmission data (that is, the particular incoming data wave) of the first data channel Ch1 is performed in the first finger unit 430A at a phase detection in a synchronization condition according to the reference signal and the synchronization timing signal, and the demodulation of the transmission data of the second data channel Ch2 and the demodulation of the transmission data of the third data channel Ch3 are performed in the finger units 430B and 430C at a phase detection in a synchronization condition according to the reference signal and the synchronization timing signal produced in the first finger unit 430A. This control is performed in the system control unit 420.

The production of the reference signal and the synchronization holding in the example of the transmission data format shown in FIG. 11B are described. In this example, the demodulation of the RAKE reception for the second data channel Ch2 is performed in the second finger unit 430B and the third finger unit 430C, and the demodulation for the first data channel Ch1 is performed in the first finger unit 430A. Therefore, a particular phase offset (that is, path-1) of a particular incoming data wave having the highest electric power among those of the incoming data waves is allocated to the first finger unit 430A and the second finger unit 430B by the searcher unit 210, and a particular phase offset (that is, path-2) of a particular incoming data wave having the second highest electric power among those of the incoming data waves is allocated to the third finger unit 430C by the searcher unit 210. In this case, though the processing gain c[x] in the first finger unit 430A differs from the processing gain a[x] in the second finger unit 430B, because the synchronization in the first finger unit 430A and the synchronization in the second finger unit 430B are performed while following the same specific incoming pilot wave of the path-1 in the pilot channel, the production of the reference signal and the synchronization holding are performed in the second finger unit 430B in which the transmission data having the low processing gain is demodulated, the demodulation of the transmission data of the first data channel Ch1 is performed in the first finger unit 430A at a phase detection in a synchronization condition according to the reference signal and the synchronization timing signal produced in the second finger unit 430B. Also, because the particular phase offset allocated to the third finger unit 430C differs from that allocated to the first and second finger units 430A and 430B, the production of the reference signal and the synchronization holding are performed in the third finger unit 430 independently of those in the second finger unit 430B. This control is performed in the system control unit 420.

The production of the reference signal and the synchronization holding in the example of the transmission data format shown in FIG. 11C are described. In this example, a parallel demodulation for three data channels is performed. Therefore, a particular phase offset (that is, path-1) of a particular incoming data wave having the highest electric power among those of the incoming data waves is allocated to each finger unit 430 by the searcher unit 210. In this case, even though the synchronization with the particular incoming data wave of the first data channel Ch1, the synchronization with the particular incoming data wave of the second data channel Ch2 and the synchronization with the particular incoming data wave of the third data channel Ch3 are separately held in the finger units 430A to 430C, because each synchronization is performed while following the same specific incoming pilot wave of the path-1 in the pilot channel, it is sufficient to perform the production of the reference signal and the synchronization holding in one finger unit, and the reference signal and the synchronization timing signal produced in this finger unit are used in the other finger units.

For example, the reference signal and the synchronization timing signal are produced in the reference signal producing unit 440 and the synchronization holding unit 450 of the third finger unit 430C in which the transmission data having the low processing gain a[x] is demodulated, the demodulation of the transmission data of the third data channel Ch3 is performed in the third finger unit 430C at a phase detection in a synchronization condition according to the reference signal and the synchronization timing signal, and the demodulation of the transmission data of the first data channel Ch1 and the demodulation of the transmission data of the second data channel Ch2 are performed in the finger units 430A and 430B at a phase detection in a synchronization condition according to the reference signal and the synchronization timing signal produced in the third finger unit 430C. This control is performed in the system control unit 420.

Next, the assumption of a frequency error performed in the frequency error assuming unit 446 is described with reference to FIG. 17.

Figure 17:
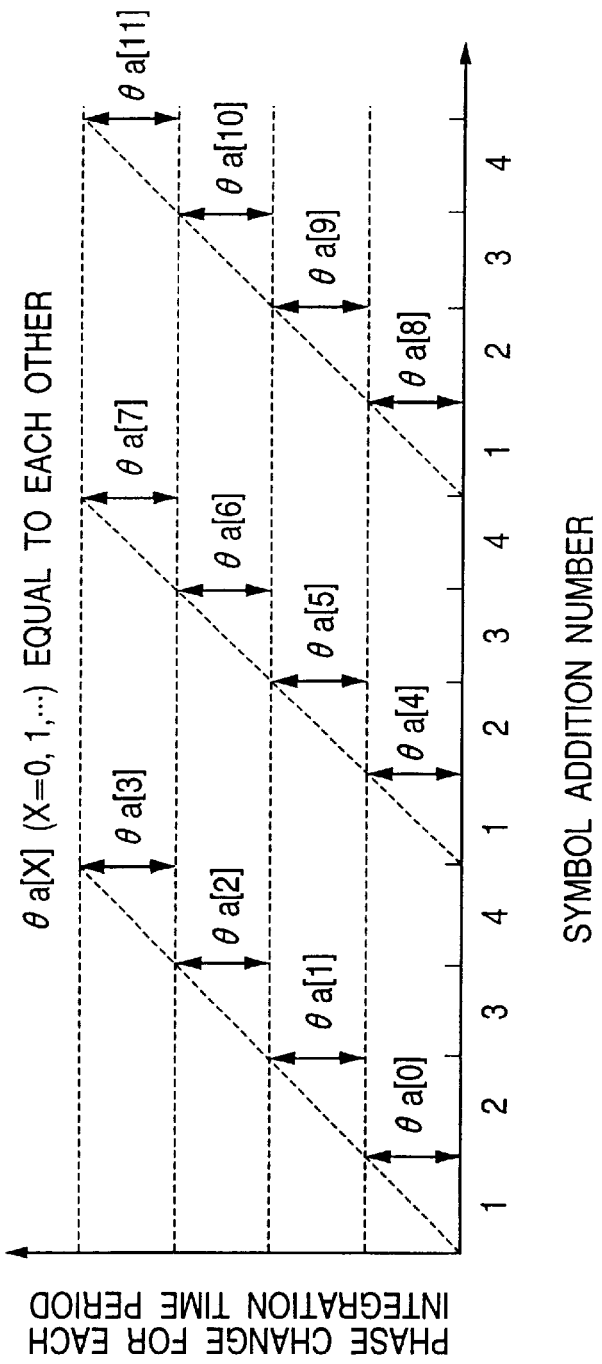
FIG. 17 shows an example of a frequency error assumed from a phase change degree of each integration time period in cases where a timing difference between the transmitting apparatus and the receiving apparatus is based on only precision degrees of clock signals used in the apparatuses.

FIG. 17 shows an example of a frequency error assumed from a phase change degree of each integration time period.

In the example of FIG. 17, any condition change based on noises or fading does not occur in the propagation path corresponding to one finger unit 430, so that the occurrence of a timing difference between the transmitting apparatus 100 and the receiving apparatus 400 is based on only the precision degrees of clock signals used in both the transmitting apparatus 100 and the receiving apparatus 400. In this case, a phase change indicated by the original integration dump value, which is obtained by integrating a particular incoming pilot wave of the pilot channel in the first integration time period in the integration dump unit 443, steadily changes because of an error between the clock signals, as is indicated by a dotted line in FIG. 17. That is, a plurality of phase changes of the original integration dump values obtained in the integration dump unit 443 of the finger unit 430 equal to each other. Here, in cases where the transmission data of the processing gain of the symbol a[x] is allocated to the finger unit 430, the integration frequency is set to the finger demodulation symbol frequency Ta[x] of the symbol a[x] by the integration control unit 444, a phase change θb[x] (x is an arbitrary data number) of an integration dump value Sb[x] corresponding to the symbol b[x] equals to a phase change θa[x]+θa[x+1] obtained by adding two integration dump values Sa[x] and Sa[x+1] to each other in the symbol adding unit 445 of the finger unit 430. Also, a phase change θc[x] of an integration dump value Sc[x] corresponding to the symbol c[x] equals to a phase change θa[x]+θa[x+1]+θa[x+2]+θa[x+3] obtained by adding four integration dump values Sa[x], Sa [x+1], Sa[x+2], Sa[x+3] to each other in the symbol adding unit 445 of the finger unit 430. The number of integration dump values added to each other at the integration frequency of the symbol a[x] is called the symbol addition number. For example, in cases where the symbol addition number is set to 2 (or 4), one integration dump value corresponding to the symbol b[x] (or symbol c[x]) of the second processing gain corresponding to another or other finger units 430, to which the same particular phase offset as that allocated to this finger unit 430 is allocated, is obtained from the integration dump value corresponding to the symbol a[x].

Therefore, in case of the transmission data format shown in FIG. 11B, though the processing gain a[x] of the transmission data processed in the second finger unit 430B is lower than the processing gain c[x] of the transmission data processed in the first finger unit 430A, because the particular phase offset (path-1) allocated to the first finger unit 430A is the same as that allocated to the second finger unit 430B, the original integration dump values Sa[x] corresponding to the lowest processing gain a[x] are calculated in the integration dump unit 443 of the second finger unit 430B, and the original integration dump values Sa[x] are added to each other according to the symbol addition number set to 4 in the symbol adding unit 445 of the second finger unit 430B to obtain the integration dump value Sc[x] corresponding to the processing gain c[x] as a second original integration dump value. Thereafter, in the frequency error assuming unit 446 of the second finger unit 430B, a second original phase change degree indicated by the second original integration dump value is detected, and a second original frequency error is assumed by differentiating the second original phase change degree. Therefore, the frequency error for the transmission data of the processing gain c[x] corresponding to the first data channel Ch1 is obtained in the second data channel Ch2.

Also, in case of the transmission data format shown in FIG. 11C, though the processing gain a[x] of the transmission data processed in the third finger unit 430C is lower than the processing gains c[x] and b[x] of the transmission data processed in the first and second finger units 430A and 430B, because the particular phase offset (path-1) allocated to the first and second finger units 430A and 430B is the same as that allocated to the third finger unit 430C, the original integration dump values Sa[x] corresponding to the lowest processing gain a[x] are calculated in the integration dump unit 443 of the third finger unit 430C. Thereafter, the original integration dump values Sa[x] are added to each other according to the symbol addition number set to 4 in the symbol adding unit 445 of the third finger unit 430C to obtain the integration dump value Sc[x] corresponding to the processing gain c[x] as a second original integration dump value. Thereafter, in the frequency error assuming unit 446 of the third finger unit 430C, a second original phase change degree indicated by the second original integration dump value is detected, and a second original frequency error is assumed by differentiating the second original phase change degree. Also, the original integration dump values Sa[x] are added to each other according to the symbol addition number set to 2 in the symbol adding unit 445 of the third finger unit 430C to obtain the integration dump value Sb[x] corresponding to the processing gain b[x] as a second original integration dump value. Thereafter, in the frequency error assuming unit 446 of the third finger unit 430C, a second original phase change degree indicated by the second original integration dump value is detected, and a second original frequency error is assumed by differentiating the second original phase change degree. Therefore, the frequency error for the transmission data of the processing gain c[x] corresponding to the first data channel Ch1 and the frequency error for the transmission data of the processing gain b[x] corresponding to the second data channel Ch2 are obtained in the third data channel Ch3.

Figure 18A:
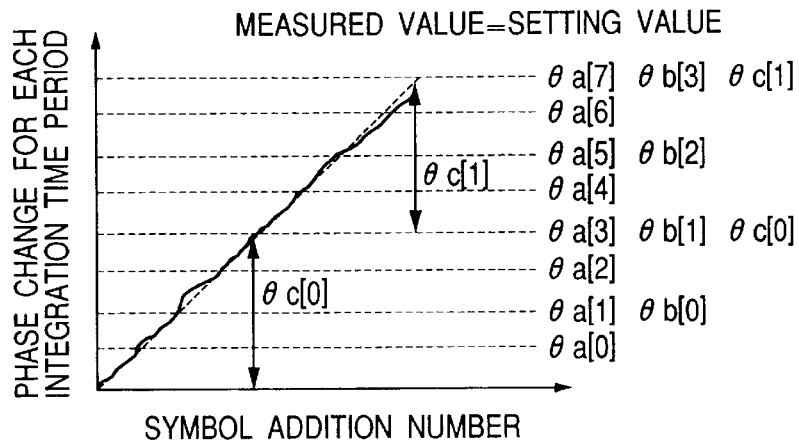
FIG. 18A shows an example of a phase change degree of a pilot signal received in the receiving apparatus shown in FIG. 12 in cases where a frequency change of the pilot signal is small.

FIG. 18A shows an example of a phase change degree of the pilot signal received in the receiving apparatus 400 in cases where a frequency change of the pilot signal is small.

As shown in FIG. 18A, in cases where the change of noises or fading in the propagation pathe is small, a phase change degree of the pilot signal approximately accords with that based on an error between the precision degrees of clock signals used in both the transmitting apparatus 100 and the receiving apparatus 400. Therefore, a solid line indicating the phase change degree of the pilot signal approximately accords with the dotted line.

In this case, the original frequency error based on the original integration dump values Sa[x], Sb[x] or Sc[x], which are produced in the integration dump unit 443 in the first integration time period Ta[x], Tb[x] or Tc[x] corresponding to the processing gain a[x], b[x] or c[x] of the transmission data allocated to each finger unit 430, is equal to or smaller than the average frequency error corresponding to the average symbol added value produced in the symbol adding unit 445. Therefore, the frequency error is assumed in the frequency error assuming unit 446 in the same manner as in the case shown in FIG. 17.

Figure 18B:
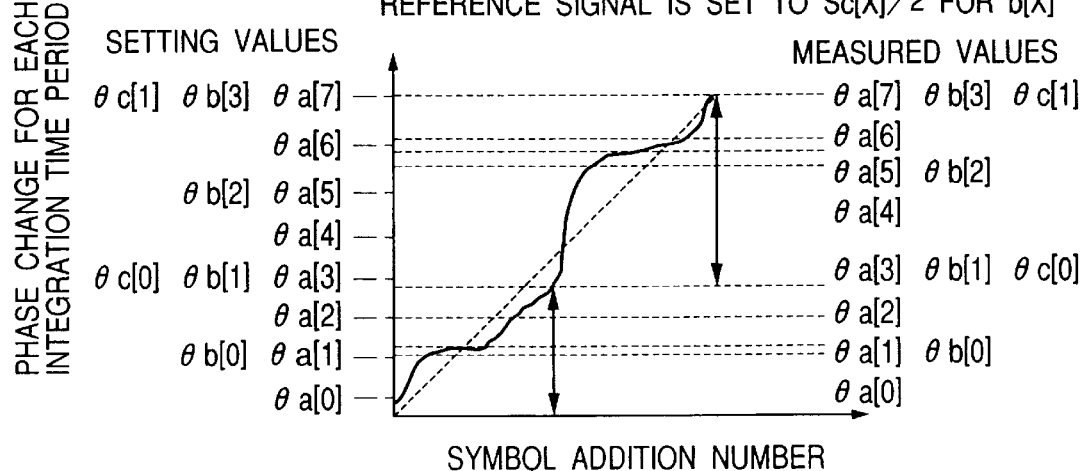
FIG. 18B shows an example of a phase change degree of a pilot signal received in the receiving apparatus shown in FIG. 12 in cases where a frequency change of the pilot signal is large.

FIG. 18B shows an example of a phase change degree of the pilot signal received in the receiving apparatus 400 in cases where a frequency change of the pilot signal is large.

As shown in FIG. 18B, in cases where the change of noises or fading in the propagation path is large, a phase change degree of the pilot signal greatly irregularly changes with time as compared with that based on an error between the precision degrees of clock signals used in both the transmitting apparatus 100 and the receiving apparatus 400. Therefore, a solid line indicating the phase change degree of the pilot signal greatly shifts from the dotted line. One reason that the phase change (or the frequency change) occurs in the propagation paths is the Doppler effect in the mobile communication. A Doppler frequency denoting a frequency shift in the Doppler effect is about 100 Hz.

However, because a data rate in the high speed data transmission is more than 1 Mbps and because a data rate for each channel is more than several tens Kbps, the data rate is greatly higher than the Doppler frequency. Therefore, the frequency change based on the Doppler frequency does not inversely influence so much on the mobile communication in one symbol time period longer than the first integration time period. Also, because noises in the propagation paths are regarded as the white Gaussian noise, in cases where a signal including the noises is integrated in the symbol time period, an average value of noise components becomes almost zero. That is, the inverse influence of error components such as the Doppler frequency and the noise components become decrease as an integration time period for the particular incoming pilot wave of the pilot signal integrated in the integration dump unit 443 is lengthened.

Therefore, because the integration time period for each integration dump value Sa[x] or Sb[x] corresponding to the symbol a[x] or b[x] of the low processing gain is shorter than that for each integration dump value Sc[x] corresponding to the symbol c[x] of the high processing gain, the rate of the error components included in each integration dump value Sa[x] or Sb[x] is higher than that included in each integration dump value Sc[x]. To reduce the inverse influence of the error components, the integration dump value Sc[x] of the highest processing gain is used as a referential integration dump value. That is, in this embodiment, in cases where the transmission data of the processing gain a[x] or b[x] lower than the referential processing gain c[x] is allocated to one finger unit 430, the original integration dump values Sa[x] or Sb[x] is produced from the inverse orthogonal transformation pilot signal for each first integration time period Ta[x] or Tb[x] corresponding to the processing gain a[x] or b[x] of the transmission data allocated to one finger unit 430 in the integration dump unit 443. Thereafter, in the symbol adding unit 445, the integration dump value Sc[x]=Sa[x]+Sa[x+1]+Sa[x+2]+Sa[x+3] or Sc[x]=Sb[x]+Sb[x+1] is calculated by adding the original integration dump values Sa[x] or Sb[x] to each other by a first symbol addition number set to 4 or 2 as a first symbol added value, and the integration dump value Sc[x] is divided by the first symbol addition number to produce an average integration dump value S'a[x] or S'b[x].

$$S'a[x]=Sc[x]/4 \text{ or } S'b[x]=Sc[x]/2$$

Thereafter, in the frequency error assuming unit 446, because the original integration dump values Sa[x] or Sb[x] is higher than the average integration dump value S'a[x] or S'b[x] in cases where the change of noises or fading in the propagation path corresponding to the finger unit 430 is large, the average integration dump value S'a[x] or S'b[x] is used for the frequency error assumption in place of the original integration dump values Sa[x] or Sb[x], and an average frequency error is assumed from the average integration dump value S'a[x] or S'b[x].

Next, the production of the reference signal performed in the reference signal setting unit 447 is described with reference to FIG. 18A and FIG. 18B.

As shown in FIG. 18A, in cases where the change of noises or fading in the propagation paths is small, the original integration dump values Sa[x], Sb[x] or Sc[x], which are produced in the first integration time period Ta[x], Tb[x] or Tc[x] corresponding to the processing gain a[x], b[x] or c[x] of the transmission data allocated to each finger unit 430 in the integration dump unit 443, are set as a reference signal in the reference signal setting unit 447.

Also, in cases where the first processing gain a[x] of the transmission data having one particular phase offset allocated to a corresponding finger unit 430 is lower than the second processing gain b[x] or c[x] of the transmission data corresponding to another or other finger units 430 to which the same particular phase offset as that allocated to this finger unit 430 is allocated, any reference signal used in the other finger units 430 corresponding to the transmission data of the second processing gain b[x] or c[x] is not produced in the other finger units 430, but the reference signals used in the other finger units 430 corresponding to the transmission data of the second processing gain b[x] or c[x] is produced in this finger unit 430 corresponding to the transmission data of the first processing gain a[x]. That is, a second original integration dump value Sa[x]+Sa[x+1] or Sa[x]+Sa[x+1]+Sa[x+2]+Sa[x+3] produced in the symbol adding unit 445 for each second integration time period corresponding to the second processing gain b[x] or c[x] are set as reference signals corresponding to the other finger units 430 in the reference signal setting unit 447, and the reference signal is transmitted to the other finger units 430. In this case, a phase change θb[x] of the integration dump value Sb[x] of an integration frequency Tb[x] corresponding to the symbol b[x] equals to a phase change θa[x]+θa[x+1] obtained by adding two integration dump values Sa[x] and Sa[x+1] to each other in the symbol adding unit 445. Also, a phase change θc[x] of an integration dump value Sc[x] of an integration frequency Tc[x] corresponding to the symbol c[x] equals to a phase change θa[x]+θa[x+1]+θa[x+2]+θa[x+3] obtained by adding four integration dump values Sa[x], Sa[x+1], Sa[x+2], sa[x+3] to each other in the symbol adding unit 445. Here, the phase changes θa[x], θa[x+1], θa[x+2] and θa[x+3] denote the phase changes of the integration dump value Sa[x], Sa[x+1], Sa[x+2] and Sa[x+3] of an integration frequency Ta[x] corresponding to the symbol a[x].

For example, in case of the transmission data format shown in FIG. 11A, because the same particular offset (path-1) is allocated to all finger units 430 and because the pieces of transmission data of the same processing gain a[x] are processed in all finger units 430, one of the finger units 430 (for example, the first finger unit 430A) is selected, a first reference signal is set in the reference signal setting unit 447 of the first finger unit 430A according to the original integration dump values Sa[x] produced in the integration dump unit 443 of the first finger unit 430A, and the first reference signal is transmitted to the demodulating unit 297 of the first finger unit 430A. Also, a symbol added value equal to each original integration dump value is produced according to the symbol addition number set to 1 in the symbol adding unit 445 of the first finger unit 430A, the same first reference signal is set according to the symbol added values in the reference signal setting unit 447 of the first finger unit 430A, the same first reference signal is transmitted to the demodulating unit 297 of the second finger unit 430B as a second reference signal, and the same first reference signal is transmitted to the demodulating unit 297 of the third finger unit 430C as a third reference signal. That is, the reference signal is not produced in the other finger units (the second finger unit 430B and the third finger unit 430C). Thereafter, the particular incoming data wave extracted from the transmission data is demodulated according to the same reference signal in each finger unit 430.

In case of the transmission data format shown in FIG. 11B, a second reference signal is set in the reference signal setting unit 447 of the second finger unit 430B according to the original integration dump values Sa[x] produced in the integration dump unit 443 of the second finger unit 430B, and the second reference signal is transmitted to the demodulating unit 297 of the second finger unit 430B. Also, each symbol added value Sc[x]=Sa[x]+Sa[x+1]+Sa[x+2]+Sa{x+3] is produced according to the symbol addition number set to 4 in the symbol adding unit 445 of the second finger unit 430B, and a first reference signal is set according to the symbol added values Sc[x] in the reference signal setting unit 447 of the second finger unit 430B and is transmitted to the demodulating unit 297 of the first finger unit 430A. Also, a third reference signal is set in the reference signal setting unit 447 of the third finger unit 430C according to the original integration dump values Sa[x] produced in the integration dump unit 443 of the third finger unit 430C and is transmitted to the demodulating unit 297 of the third finger unit 430C. That is, the reference signal is not produced in the first finger unit 430A. Thereafter, the particular incoming data wave extracted from the transmission data is demodulated according to the reference signal in each finger unit 430.

In case of the transmission data format shown in FIG. 11C, a third reference signal is set in the reference signal setting unit 447 of the third finger unit 430C according to the original integration dump values Sa[x] produced in the integration dump unit 443 of the third finger unit 430C and is transmitted to the demodulating unit 297 of the third finger unit 430C. Also, each symbol added value Sc[x]=Sa[x]+Sa[x+1]+Sa[x+2]+Sa{x+3] is produced according to the symbol addition number set to 4 in the symbol adding unit 445 of the third finger unit 430C, and a first reference signal is set according to the symbol added values Sc[x] in the reference signal setting unit 447 of the third finger unit 430C and is transmitted to the demodulating unit 297 of the first finger unit 430A. Also, each symbol added value Sb[x]=Sa[x]+Sa[x+1] is produced according to the symbol addition number set to 2 in the symbol adding unit 445 of the third finger unit 430C, and a second reference signal is set according to the symbol added values Sb[x] in the reference signal setting unit 447 of the third finger unit 430C and is transmitted to the demodulating unit 297 of the second finger unit 430B. Thereafter, the particular incoming data wave extracted from the transmission data is demodulated according to the reference signal in each finger unit 430.

In contrast, as shown in FIG. 18B, in cases where the change of noises or fading in the propagation path is large, the average integration dump value S'a[x] or S'b[x] produced in the symbol adding unit 445 is selected, and the average integration dump value S'a[x] or S'b[x] is set as a reference signal in the reference signal setting unit 447. This reference signal S'a[x] or S'b[x] is output from the reference signal setting unit 447 to the demodulating unit 297 to demodulate the particular incoming data wave extracted from the transmission data of the processing gain of the symbol a[x] or b[x]. Therefore, because the average integration dump value S'a[x] or S'b[x] is used for the reference signal in place of the original integration dump value Sa[x] or Sb[x], the error components included in the reference signal can be reduced.

Also, in cases where the first processing gain a[x] of the transmission data having one particular phase offset allocated to a corresponding finger unit 430 is lower than the second processing gain b[x] or c[x] of the transmission data corresponding to another or other finger units 430 to which the same particular phase offset as that allocated to the corresponding finger unit 430 is allocated, a second original integration dump value Sb[x]=Sa[x]+Sa[x+1] or Sc[x]=Sa[x]+Sa[x+1]+Sa[x+2]+Sa[x+3] is calculated by adding the original integration dump value to each other by the second symbol addition number, a second symbol added value Sc[x] is calculated by adding the second original integration dump value Sb[x] or Sc[x] to each other by the third symbol addition number set to 2 or 1, and a second original integration dump value S'b[x] or S'c[x] is calculated by dividing the second symbol added value Sc[x] by the third symbol addition number. Thereafter, in the frequency error assuming unit 446, a second original phase change degree is calculated from the second original integration dump value Sb[x] or Sc[x], a second average phase change degree is calculated from the second original integration dump value S'b[x] or S'c[x], a second original frequency error is assumed by differentiating the second original phase change degree, a second average frequency error is assumed by differentiating the second average phase change degree, and second original frequency error and the second average frequency error are compared each other. Because the second original frequency error is larger than the second average frequency error in cases where the change of noises or fading in the propagation path is large, the second average integration dump value S'b[x] or S'c[x] is set as a reference signal in the reference signal setting unit 447. This reference signal S'b[x] or S'c[x] is output from the reference signal setting unit 447 to the demodulating units 297 of the other finger units 430, to which the same particular phase offset as that allocated to this finger unit 430 is allocated, to demodulate the particular incoming data waves extracted from the transmission data in the other finger units 430. Therefore, because the second average integration dump value S'b[x] or S'c[x] is used for the reference signal in place of the second original integration dump value Sb[x] or Sc[x], the error components included in the reference signal can be reduced.

Next, an operation of the synchronization holding performed in the synchronization holding unit 450 is described with reference to FIG. 19A and 19B.

Figure 19A:
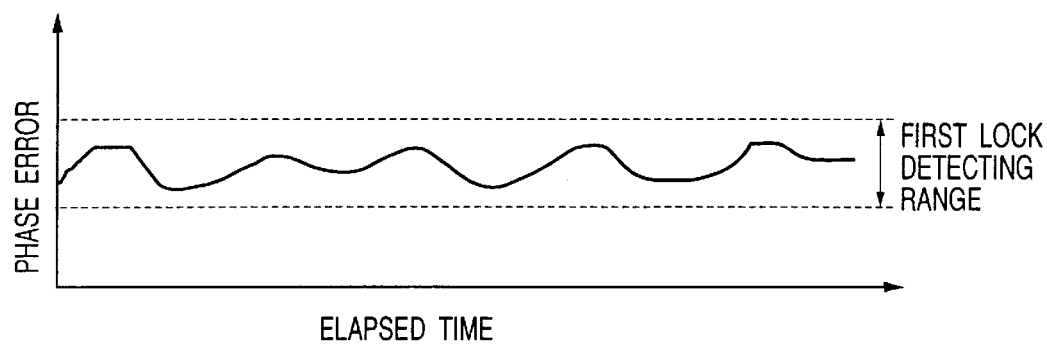
FIG. 19A shows an example of a first lock detecting range set in a lock detecting unit shown in FIG. 15 in cases where a frequency change of transmission data allocated to the finger unit is small.
Figure 19B:
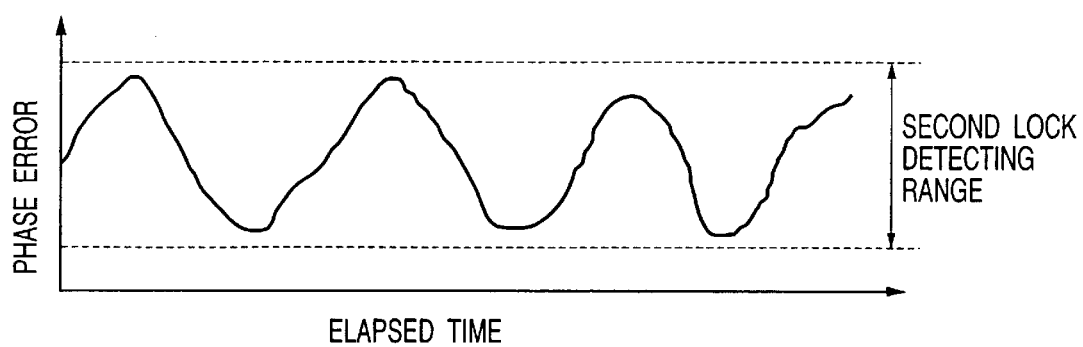
FIG. 19B shows an example of a first lock detecting range set in a lock detecting unit shown in FIG. 15 in cases where a frequency change of transmission data allocated to the finger unit is large.

FIG. 19A shows an example of a first lock detecting range set in the lock detecting unit 459 in cases where a frequency change of the transmission data allocated to the finger unit 430 is small, and FIG. 19B shows an example of a second lock detecting range set in the lock detecting unit 459 in cases where a frequency change of the transmission data allocated to the finger unit 430 is large.

In cases where the synchronization with the pilot signal is successfully obtained and is held, a phase error output from the phase error calculating unit 457 is set within a first lock detecting range shown in FIG. 19A or a second lock detecting range shown in FIG. 19B. That is, the first lock detecting range or the second lock detecting range is set by the lock detecting range setting unit 458, a lock condition is detected by the lock detecting unit 459, and a lock detecting signal indicating the synchronization holding is output from the lock detecting unit 459 to the system control unit 420.

A frequency change of the transmission data allocated to the finger unit 430 is changed according to the processing gain of the transmission data allocated to the finger unit 430 and the frequency error of the transmission data. The processing gain of the transmission data allocated to the finger unit 430 is known according to the data format information and the finger allocation information (refer to FIG. 11A, FIG. 11B and FIG. 11C). The frequency error of the transmission data allocated to the finger unit 430 is known according to the frequency error assumption information obtained in the reference signal producing unit 440. Therefore, in cases where the frequency change of the transmission data is large, it is difficult to set the phase error within the first lock detecting range. Therefore, in this embodiment, a plurality of lock detecting ranges corresponding to various frequency changes are prepared in the lock detecting range setting unit 458, and an optimum lock detecting range is selected according to the frequency error of the transmission data and the processing gain of the transmission data, so that the synchronization with the transmission data can be easily held.

Also, in cases where a lock detecting signal, indicating that the synchronization with the transmission data is not held, is detected in the system control unit 420, a specific phase offset corresponding to a specific incoming wave having the highest electric power among those of a plurality of remaining phase offsets other than one or more particular phase offsets allocated to the finger units 430A, 430B and 430C is selected from the remaining phase offsets, and the specific incoming wave of the same particular code channel as that allocated to each finger unit 430 is newly allocated to the finger unit 430 in place of a particular incoming data wave of the particular phase offset allocated to the finger unit 430. Therefore, even though the receiving apparatus 400 fails in the holding of the synchronization with the transmission data, the holding of the synchronization with the specific incoming wave having the highest electric power can be immediately obtained in the finger units 430A, 430B and 430C.

Also, a plurality of groups of filter gain values are prepared in the gain setting unit 461, and an optimum group of filter gain values is selected according to the frequency error assumption information and the processing gain of the transmission data allocated to the finger unit 430.

Accordingly, because the pilot channel is allocated to one of the code channels in the transmitting apparatus 100 to transmit the pilot signal composed of the data known to the receiving side, even though noises or fading in a particular propagation path corresponding to the particular phase offset allocated to each finger unit 430 is changed with time to generate a frequency error in the particular incoming data wave of the particular phase offset allocated to the finger unit 430, the frequency error can be assumed from the incoming pilot wave of the particular phase offset originated in the pilot signal in the frequency error assuming unit 446 as the frequency error assumption information (the first frequency error assumption information and the second frequency error assumption information).

Also, because the frequency error in the particular incoming data wave of the particular phase offset allocated to each finger unit 430 is assumed, the synchronization timing signal can be produced in the synchronization holding unit 450 from the frequency error assumption information, so that a synchronization with a transmission signal can be stably held, and a phase detection for the transmission signal can be stably performed in a synchronized condition.

Also, because the transmission electric power of the pilot signal can be heightened as compared with that of each data channel, a service of a high speed data transmission can be performed at a high quality in a low signal electric power (Eb/No) environment as well as a service mainly performing a low speed data transmission such as an audio data transmission while a synchronization with a transmission signal in the low signal electric power Eb/No environment is stably held and a phase detection for the transmission signal is stably performed in a synchronized condition.

In this embodiment, the pilot signal of the pilot channel is always transmitted from the transmitting apparatus 100. However, it is applicable that the pilot signal be periodically inserted and transmitted during a pilot signal inserting time period. In this case, the frequency error of the particular incoming data wave to be demodulated in each finger unit is performed during the pilot signal inserting time period according to the processing gains of the data channels allocated to the finger units, and the reference signal of each finger unit is set. In a no-pilot signal period in which the pilot signal is not inserted, an interpolated reference signal is set according to an interpolation using the reference signal set in the pilot signal inserting time period, the interpolated reference signal is used as an integration dump value in the no-pilot signal period, and a frequency error is assumed from the integration dump value. Therefore, a synchronization with a transmission signal can be stably held, and a phase detection for the transmission signal can be stably performed in a synchronized condition.

Also, in cases where the particular phase offset or the particular code channel allocated to each finger unit 430 is changed or in cases where the particular processing gain corresponding to each finger unit 430 is changed, this changing information is written in the data format information or the finger allocation information included in the channel information, and the changing information is informed the transmitting apparatus 400, the integration time period corresponding to each finger unit is adjusted according to the changing information, and the time constant and the loop gain in the loop filter 460 are adjusted according to the changing information.

Also, the number of code channels in the transmitting apparatus 100 can be arbitrarily set.

Also, in this embodiment, the number of finger units is 3. However, the present invention is not limited to 3, and the number of finger units can be arbitrarily set.

(Third Embodiment)

In this embodiment, a single code channel or a plurality of code channels are used for the transmission of one input data string, and the number of code channels allocated to the input data string is determined according to an importance degree of the input data string and/or a data transfer rate of the input data string to transmit the input data string at a variable data transfer rate and a high quality. In a spread spectrum signal receiving apparatus, even though a signal corresponding to the single code channel or the code channels is received, the single code channel or the code channels are allocated to a plurality of finger units, so that the input data string is reproduced.

Figure 20:
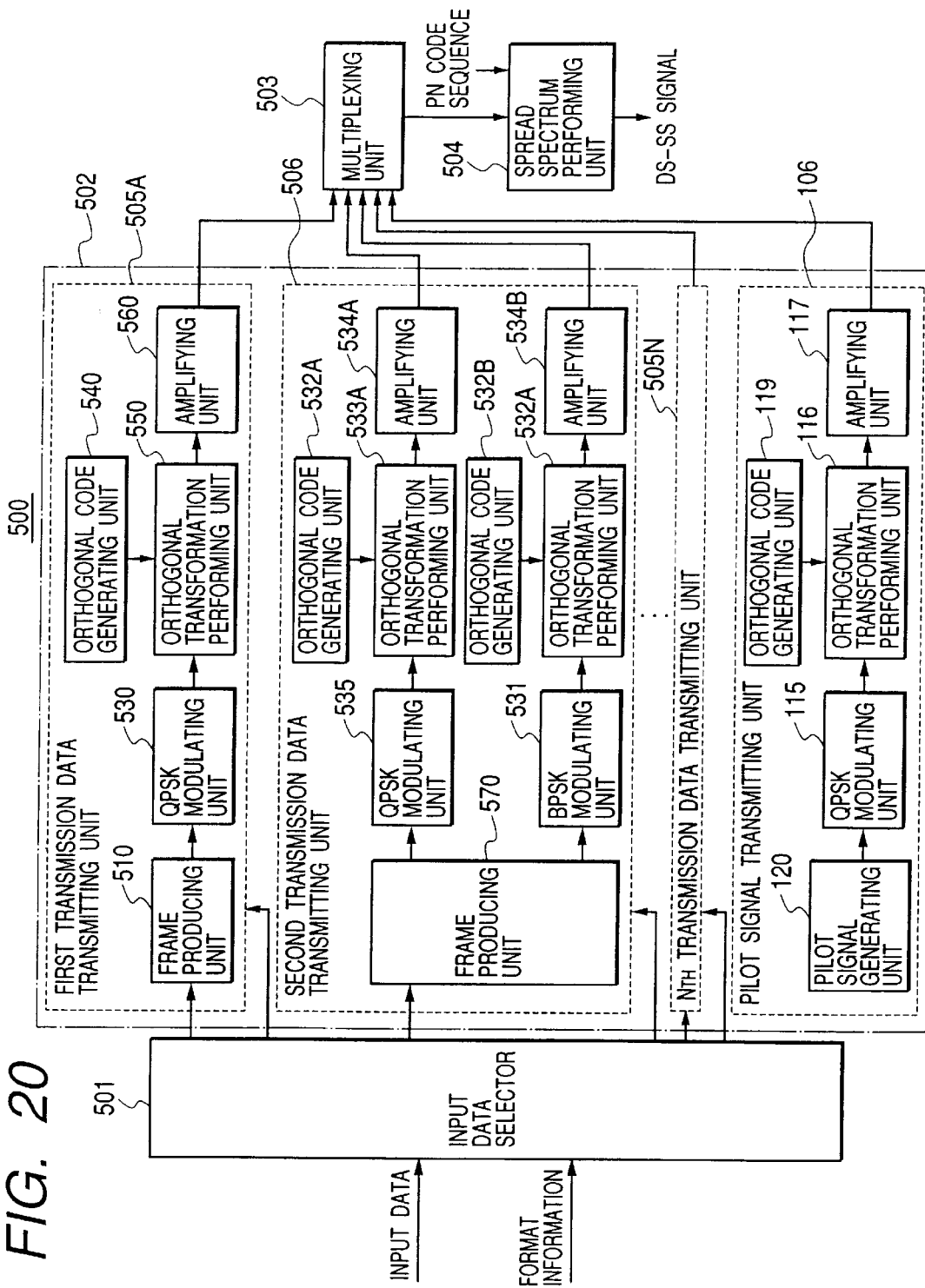
FIG. 20 is a block diagram of a spread spectrum signal transmitting apparatus of a spread spectrum communication apparatus according to a third embodiment of the present invention.

FIG. 20 is a block diagram of a spread spectrum signal transmitting apparatus of a spread spectrum communication apparatus according to a third embodiment of the present invention.

As shown in FIG. 20, a spread spectrum signal transmitting apparatus 500 comprises:

- an input data selector 501 for receiving format information and a plurality of strings of input data respectively corresponding to a data transfer rate (or a data speed), a communication quality and an importance degree and selecting each input data string according to the format information;
- a data transmitting unit 502, corresponding to a plurality of code channels, for transforming one input data string selected by the input data selector 501 for each code channel to produce a string of transmission data, generating a pilot signal, transforming the pilot signal, transmitting the strings of transmission data through the code channels and transmitting the pilot signal through a pilot channel allocated as one code channel;
- a multiplexing unit 503 for multiplexing the strings of transmission data of the code channels and the pilot signal of the pilot channel obtained in the data transmitting unit 502 to obtain multiplexed data; and
- a spread spectrum performing unit 504, functioning as a code transforming means, for performing a spread spectrum for the multiplexed data obtained in the multiplexing unit 503 with a pseudo noise (PN) code allocated to a direct sequence spread spectrum (DS-SS) to obtain a DD-SS signal and outputting the DD-SS signal as a spread spectrum data signal.

The data transmitting unit 502 comprises:

N−1 transmission data transmitting units 505 such as a first transmission data transmitting unit 505A, a third transmission data transmitting unit 505B and an N-th transmission data transmitting unit 505N respectively corresponding to one code channel;

a second transmission data transmitting unit 506 corresponding to a second code channel and a third code channel; and the pilot signal transmitting unit 106.

Each transmission data transmitting unit 505 comprises:

- a frame producing unit 510 for adaptively producing a sting of first transmission symbols from one input data string selected by the input data selector 501 at a time slot (or a data speed) and a processing gain of the input data string for each frame time period;
- a quadrature phase shift keying (QPSK) modulating unit 530 for selecting a QPSK modulation as a modulation type according to an importance degree of the input data string and a data transfer rate of the input data string and performing the QPSK modulation for the string of first transmission symbols produced in the frame producing unit 510 to produce a string of modulated symbols for each frame time period;
- an orthogonal code generating unit 540 for generating an orthogonal code C1, C3, C4, . . . or Cn allocated to the corresponding code channel by the input data selector 501;
- an orthogonal transformation performing unit 550, functioning as a code channel producing means, for performing an orthogonal transformation for the string of modulated symbols produced in the QPSK modulating unit 530 with the orthogonal code C1, C2 . . . or Cn generated in the orthogonal code generating unit 540 to produce a string of orthogonally coded modulated symbols corresponding to the code channel allocated to the orthogonal code for each frame time period; and
- an amplifying unit 560 for amplifying the string of orthogonally coded modulated symbols produced in the orthogonal transformation performing unit 550 with a gain value set for the string of modulated symbols by the input data selector 501 for each frame time period and outputting the string of orthogonally coded modulated symbols as one piece of transmission data of the corresponding code channel to the multiplexing unit 103.

The second transmission data transmitting unit 506 comprises:

- a frame producing unit 570 for adaptively producing a string of first transmission symbols and a string of second transmission symbols from the input data string selected by the input data selector 501 at a time slot (or a data speed) and a processing gain of the input data string for each frame time period;

a QPSK modulating unit 535 for selecting a QPSK modulation as a modulation type according to an importance degree of the string of first transmission symbol and a data transfer rate of the string of first transmission symbol and performing the QPSK modulation for the string of first transmission symbols produced in the frame producing unit 570 to produce a string of first modulated symbols for each frame time period;

a binary phase shift keying (BPSK) modulating unit 531 for selecting a BPSK modulation as a modulation type according to an importance degree of the string of second transmission symbol and a data transfer rate of the string of second transmission symbol and performing a BPSK modulation for the string of second transmission symbols produced in the frame producing unit 570 to produce a string of second modulated symbols for each frame time period;

an orthogonal code generating unit 532A for generating an orthogonal code C2A allocated to the second code channel by the input data selector 501;

an orthogonal code generating unit 532B for generating an orthogonal code C2B allocated to the third code channel by the input data selector 501;

an orthogonal transformation performing unit 533A, functioning as a code channel producing means, for performing an orthogonal transformation for the string of first modulated symbols produced in the QPSK modulating unit 535 with the orthogonal code C2A generated in the orthogonal code generating unit 532A to produce a string of orthogonally coded modulated symbols corresponding to the second code channel allocated to the orthogonal code C2A for each frame time period;

an orthogonal transformation performing unit 533B, functioning as a code channel producing means, for performing an orthogonal transformation for the string of second modulated symbols produced in the BPSK modulating unit 531 with the orthogonal code C2B generated in the orthogonal code generating unit 532B to produce a string of orthogonally coded modulated symbols corresponding to the third code channel allocated to the orthogonal code C2B for each frame time period;

an amplifying unit 534A for amplifying the string of orthogonally coded modulated symbols produced in the orthogonal transformation performing unit 532A with a gain value set for the string of first modulated symbol by the input data selector 501 and outputting the string of orthogonally coded modulated symbols as one piece of transmission data of the second code channel to the multiplexing unit 103; and an amplifying unit 534B for amplifying the string of orthogonally coded modulated symbols produced in the orthogonal transformation performing unit 532B with a gain value set for the string of second modulated symbols by the input data selector 501 and outputting the string of orthogonally coded modulated symbols as one piece of transmission data of the third code channel to the multiplexing unit 103.

The orthogonal codes C0, C1, . . . Cn used in the orthogonal transformation performing units 505, 506 and 116 of the transmission data transmitting units 105 and the pilot signal transmitting unit 106 are different from each other, and the pieces of transmission data of the code channels output from the transmission data transmitting units 505 and 506 and the pilot signal of the pilot channel are coded orthogonally to each other. Also, the pilot signal corresponding to the pilot channel is distinguishable from the pieces of transmission data of the code channels output from the transmission data transmitting units 505 and 506 according to the orthogonal code C0, and the piece of transmission data of the code channel output from each transmission data transmitting unit 505 or 506 is distinguishable from the pieces of transmission data of the other code channels and the pilot signal of the pilot channel according to the corresponding orthogonal code Ci (i=1,2, . . . or n).

The pilot signal of the pilot channel is output from the pilot signal transmitting unit 106 at an electric power higher than those of the pieces of transmission data output from the transmission data transmitting units 505 and 506. For example, an electric power for the pilot signal is ranged from 20 to 40% of that for the pilot signal and the pieces of transmission data.

Figure 21:
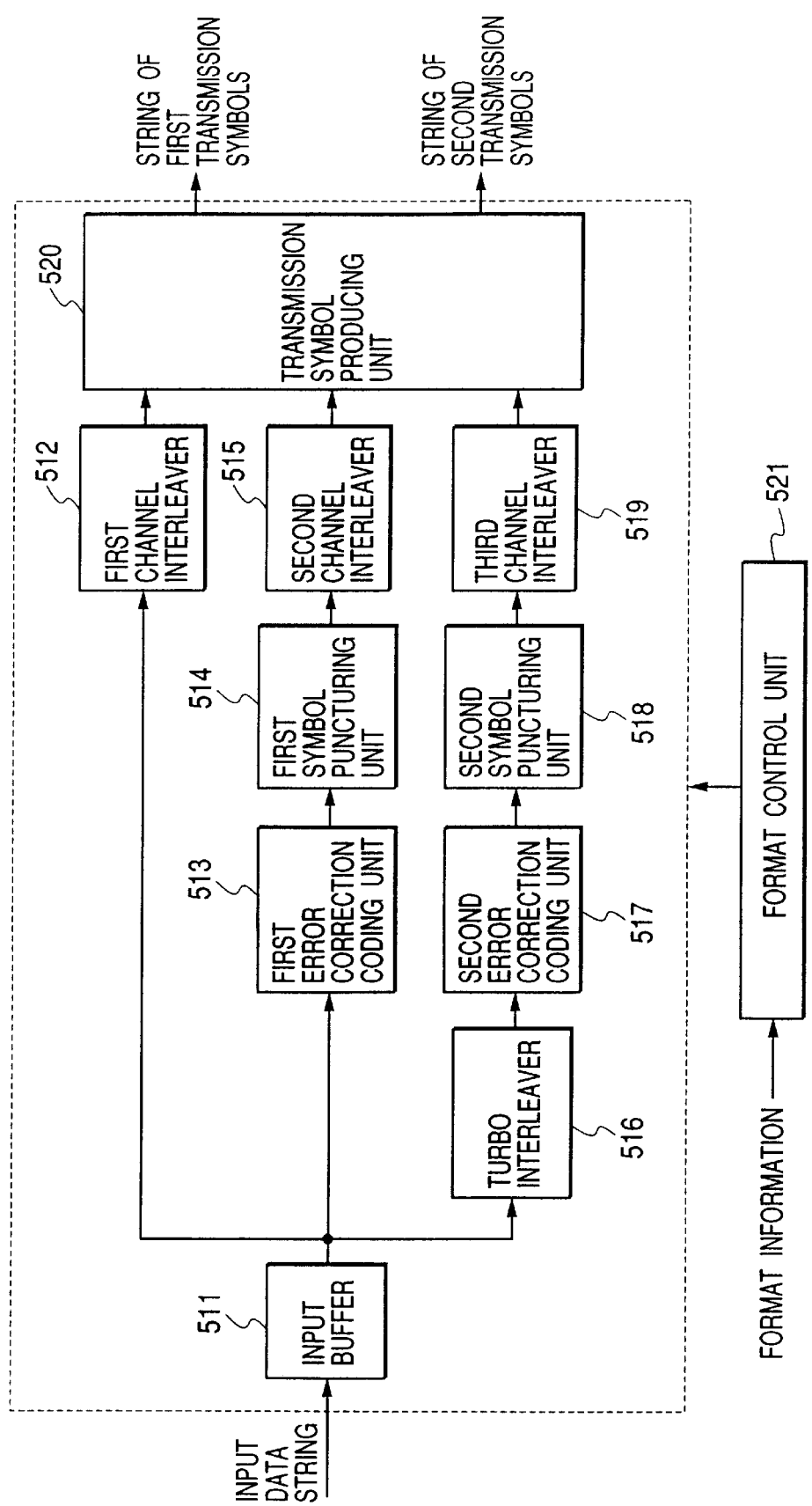
FIG. 21 is a block diagram of a frame producing unit arranged in the spread spectrum signal transmitting apparatus shown in FIG. 20.

FIG. 21 is a block diagram of the frame producing unit 510 arranged in each transmission data transmitting unit 505 or 506.

As shown in FIG. 21, each of the frame producing units 510 and 570 comprises:

an input buffer 511 for storing the input data string X'i (i=1 to n) selected in the input data selector 501 for each frame time period;

a first channel interleaver 512 for performing a channel interleaving operation at moments of need for the input data string X'i read out from the input buffer 511 in an interleaving time period Tn to rearrange the input data string X'i and to produce a string of first interleaved symbols, a burst error based on fading occurring in the input data string X'i being made random in this channel interleaving operation;

a first error correction coding unit 513, functioning as a redundant data adding means, for performing an error correction coding for the input data string X'i read out from the input buffer 511 according to a production polynomial while adding error correction codes (or redundant data) determined according to an importance degree of the input data string X'i and a data speed of the input data string X'i to the input data string X'i to produce a string of error correction coded symbols;

a first symbol puncturing unit 514 for performing a symbol puncturing operation for either the input data string X'i read out from the input buffer 511 or the string of error correction coded symbols produced in the first error correction coding unit 513 according to a first symbol puncture pattern to produce a string of first punctured symbols;

a second channel interleaver 515 for performing a channel interleaving operation for either the string of first punctured symbols produced in the first symbol puncturing unit 514 in an interleaving time period Tn/2 or the string of error correction coded symbols produced in the first error correction coding unit 513 in the interleaving time period Tn to rearrange the string of first punctured symbols and to produce a string of second interleaved symbols;

a turbo interleaver 516 for performing a turbo interleaving operation for the input data string X'i read out from the input buffer 511 in the interleaving time period Tn to produce a turbo interleaved data string;

a second error correction coding unit 517, functioning as a redundant data adding means, for performing an error correction coding for the turbo interleaved data string produced in the turbo interleaver 516 according to the production polynomial, while adding error correction codes (or redundant data) determined according to an importance degree of the input data string X'i and a data speed of the input data string X'i to the turbo interleaved data string, to produce a string of error correction coded symbols;

a second symbol puncturing unit 518 for performing a symbol puncturing operation for either the string of error correction coded symbols produced in the second error correction coding unit 517 or the turbo interleaved data string produced in the turbo interleaver 516 according to a second symbol puncture pattern to produce a string of second punctured symbols;

a third channel interleaver 519 for performing a channel interleaving operation for either the string of second punctured symbols produced in the second symbol puncturing unit 518 in the interleaving time period Tn/2 or the string of error correction coded symbols produced in the second error correction coding unit 517 in the interleaving time period Tn to rearrange the string of second punctured symbols and to produce a string of third coded symbols Ybi;

a transmission symbol producing unit 520 for receiving the string of first interleaved symbols produced in the first channel interleaver 512 or the input data string X'i read out from the input buffer 511 as a string of first coded symbols Xi, receiving the string of error correction coded symbols produced in the first error correction coding unit 513, the string of first punctured symbols produced in the first symbol puncturing unit 514 or the string of second interleaved symbols produced in the second channel interleaver 515 as a string of second coded symbols Yai, receiving the string of error correction coded symbols produced in the second error correction coding unit 517, the string of second punctured symbols produced in the second symbol puncturing unit 518 or the string of third interleaved symbols produced in the third channel interleaver 519 as a string of third coded symbols Ybi, performing a parallel-serial conversion for the string of first coded symbols Xi, the string of second coded symbols Yai and the string of third coded symbols Ybi received in parallel to each other to produce a string of first transmission symbols in which the coded symbols Xi, Yai and Ybi are serially arranged, in case of the frame producing unit 510, or performing a parallel-serial conversion for the string of second coded symbols Yai and the string of third coded symbols Ybi received in parallel to each other from the channel interleavers 515 and 519 to produce a string of first transmission symbols in which the coded symbols Yai and Ybi are serially arranged, in case of the frame producing unit 570, and setting the string of first coded symbols Xi as a string of second transmission symbols in case of the frame producing unit 570; and a format control unit 521 for setting the production polynomial adopted in the first and second error correction coding units 513 and 517, setting the first symbol puncture pattern adopted in the first symbol puncturing unit 514, setting the second symbol puncture pattern adopted in the second symbol puncturing unit 518, determining the number of string of transmission symbols produced in the transmission symbol producing unit 520 according to an importance degree of the input data string X'i and a data transfer rate of the input data string X'i, and controlling the input buffer 511, the error correction coding units 513 and 517, the symbol puncturing units 514 and 518, the channel interleavers 512, 515 and 519 and the transmission symbol producing unit 520 according to the format information transmitted from the input data selector 501.

In the first symbol puncturing unit 514, the string of error correction coded symbols is punctured to eliminate odd-numbered error correction coded symbols from the string of error correction coded symbols according to the first symbol puncture pattern. Also, in the second symbol puncturing unit 518, the string of error correction coded symbols is punctured to eliminate even-numbered error correction coded symbols from the string of error correction coded symbols according to the second symbol puncture pattern.

Because the strings of error correction coded symbols are punctured, even though the error correction codes are added to the input data string X'i and the turbo interleaver data string in the error correction coding units 514 and 517, a data transfer rate of the transmission data can be improved, and the transmission data can be transmitted as the DS-SS signal to a spread spectrum signal receiving apparatus at a high speed.

In the above configuration, an operation of the spread spectrum transmitting apparatus 500 is described according to a modulation symbol producing timing shown in each of FIG. 22, FIG. 23, FIG. 24 and FIG. 25.

Figure 22:
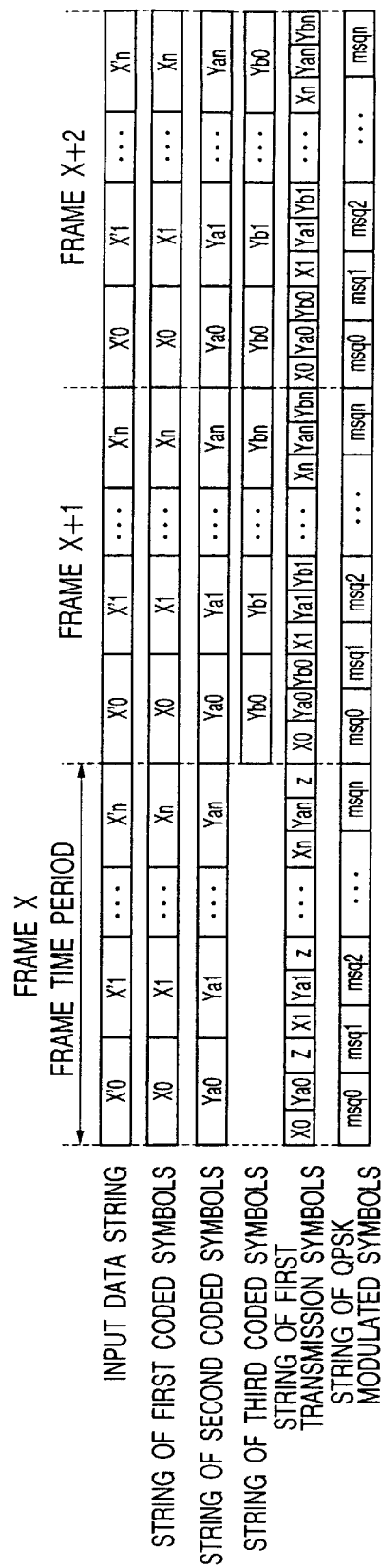
FIG. 22 shows a first example of the production of a string of modulated symbols at a modulation symbol producing timing in which a channel interleaving operation is not performed or a string of error correction coded symbols is not punctured.

FIG. 22 shows a first example of the production of the string of modulated symbols at a modulation symbol producing timing in which the channel interleaving operation is not performed in any of the channel interleavers 512, 515 and 519 or the string of error correction coded symbols is not punctured in any of the symbol puncturing units 514 and 518.

In cases where the modulation symbol producing timing shown in FIG. 22 is adopted in the frame producing unit 510, the input data string X'i not rearranged in the first channel interleaver 512 is transmitted to the transmission symbol producing unit 520 as a string of first coded symbols Xi, and a string of error correction coded symbols obtained by performing an error correction coding for the string of input X'i in the first error correction coding unit 513 is transmitted to the transmission symbol producing unit 520 as a string of second coded symbols Yai. Also, turbo interleaver data string is obtained by performing a turbo interleaving operation for the string of input X'i in the interleaving time period Tn in the turbo interleaver 516, and a string of error correction coded symbols obtained by performing an error correction coding for the turbo interleaver data string in the second error correction coding unit 517 is transmitted to the transmission symbol producing unit 520 as a string of third coded symbols Ybi. Because the string of third coded symbols Ybi is turbo-interleaved, the transmission of the string of third coded symbols Ybi to the producing unit 520 is delayed by one frame time period as compared with the transmission of both the string of first coded symbols Xi and the string of second coded symbols Yai.

Thereafter, in the transmission symbol producing unit 520, a parallel-serial conversion is performed for the string of first coded symbols Xi and the string of second coded symbols Yai in the first frame time period in the order of Xi and Yai to produce a string of first transmission symbols for a fame X, and a parallel-serial conversion is performed for the string of first coded symbols Xi, the string of second coded symbols Yai and the string of third coded symbols Ybi delayed by one frame time period in the order of Xi, Yai and Ybi for each following frame time period to produce a string of first transmission symbols for each following frame. In this case, the parallel-serial conversion is performed while shortening a time width of each coded symbol Xi, Yai or Ybi to 1/3. Therefore, a coding rate in this modulation symbol producing timing is 1/3. Also, because the string of third coded symbols Ybi does not exist in the first frame time period, a code indicating data "0" is allocated as indefinite data Z in place of the string of third coded symbols Ybi.

Thereafter, a QPSK modulation is performed for the string of first transmission symbols in the QPSK modulating unit 530, and a string of QPSK modulated symbols msq0, msq1, . . . , msqn is produced for each frame time period. Thereafter, the string of QPSK modulated symbols is multiplied by the orthogonal code C1, C3, . . . or Cn allocated to the string of QPSK modulated symbols in the orthogonal transformation performing unit 550 to produce a string of orthogonally coded modulated symbols, and the string of orthogonally coded modulated symbols is amplified with a prescribed gain value in the amplifying unit Also, in cases where the modulation symbol producing timing shown in FIG. 22 is adopted in the frame producing unit 570, the string of first transmission symbols is only produced in the transmission symbol producing unit 520.

Figure 23:
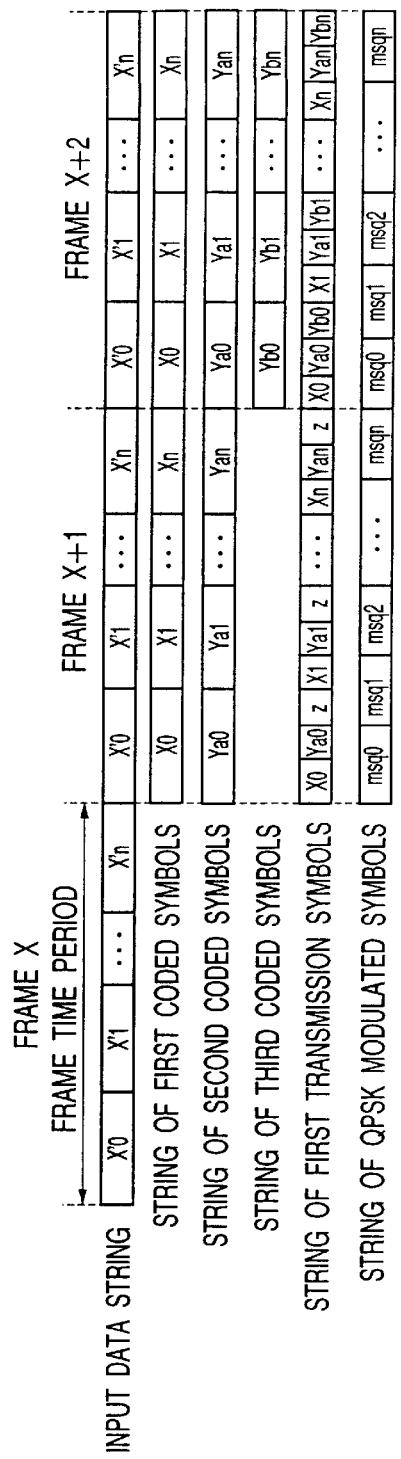
FIG. 23 shows a second example of the production of the string of modulated symbols at a modulation symbol producing timing in which a string of error correction coded symbols is not punctured but a channel interleaving operation is performed.

FIG. 23 shows a second example of the production of the string of modulated symbols at a modulation symbol producing timing in which the string of error correction coded symbols is not punctured in any of the symbol puncturing units 514 and 518 but the channel interleaving operation is performed in the channel interleavers 512, 515 and 519.

In cases where the modulation symbol producing timing shown in FIG. 23 is adopted in the frame producing unit 510, a string of first coded symbols Xi obtained by performing a channel interleaving operation for the string of input X'i in the interleaving time period Tn in the first channel interleaver 512 is transmitted to the transmission symbol producing unit 520. Also, a string of error correction coded symbols is obtained by performing an error correction coding for the string of input X'i in the first error correction coding unit 513, and a string of second coded symbols Yai obtained by performing a channel interleaving operation for the string of error correction coded symbols in the interleaving time period Tn in the second channel interleaver 515 is transmitted to the transmission symbol producing unit 520. Also, turbo interleaver data string is obtained by performing a turbo interleaving operation for the string of input X'i in the interleaving time period Tn in the turbo interleaver 516, a string of error correction coded symbols is obtained by performing an error correction coding for the turbo interleaver data string in the second error correction coding unit 517, and a string of third coded symbols Ybi obtained by performing a channel interleaving operation for the string of error correction coded symbols in the interleaving time period Tn in the third channel interleaver 519 is transmitted to the transmission symbol producing unit 520. Because the string of third coded symbols Ybi is turbo-interleaved, the transmission of the string of third coded symbols Ybi to the producing unit 520 is delayed by one frame time period as compared with the transmission of both the string of first coded symbols Xi and the string of second coded symbols Yai. Also, because the strings of coded symbols Xi, Yai and Ybi are obtained by performing the channel interleaving operation, the transmission of the strings of coded symbols Xi, Yai and Ybi is delayed by one frame time period as compared with that in the modulation symbol producing timing shown in FIG. 22.

Thereafter, in the transmission symbol producing unit 520, a parallel-serial conversion is performed for the string of first coded symbols Xi, the string of second coded symbols Yai and the string of third coded symbols Ybi delayed by one frame time period in the order of Xi, Yai and Ybi for each frame time period to produce a string of first transmission symbols for each frame. In this case, the parallel-serial conversion is performed while shortening a time width of each coded symbol Xi, Yai or Ybi to 1/3. Therefore, a coding rate in this modulation symbol producing timing is 1/3.

Thereafter, a QPSK modulation is performed for the string of first transmission symbols in the QPSK modulating unit 530, and a string of QPSK modulated symbols msq0, msq1, . . . , msqn is produced for each frame time period. Thereafter, the string of QPSK modulated symbols is multiplied by the orthogonal code C1, C3, . . . or Cn allocated to the string of QPSK modulated symbols in the orthogonal transformation performing unit 550 to produce a string of orthogonally coded modulated symbols, and the string of orthogonally coded modulated symbols is amplified with a prescribed gain value in the amplifying unit 560.

Also, in cases where the modulation symbol producing timing shown in FIG. 23 is adopted in the frame producing unit 570, the string of first transmission symbols is only produced in the transmission symbol producing unit 520.

FIG. 24 shows a third example of the production of the string of modulated symbols in the frame producing unit 510 at a modulation symbol producing timing in which the channel interleaving operation is performed in the channel interleavers 512, 515 and 519 and the channel interleaving operation is performed in the symbol puncturing units 514 and 518.

In cases where the modulation symbol producing timing shown in FIG. 24 is adopted in the frame producing unit 510, a string of first coded symbols Xi obtained by performing a channel interleaving operation for the string of input X'i in the interleaving time period Tn in the first channel interleaver 512 is transmitted to the transmission symbol producing unit 520. Also, a string of error correction coded symbols obtained by performing an error correction coding for the string of input X'i in the first error correction coding unit 513 is punctured in the first symbol puncturing unit 514 to eliminate all odd-numbered symbols from the string of error correction coded symbols and to produce a string of first punctured symbols, and a string of second coded symbols Yai obtained by performing a channel interleaving operation for the string of first punctured symbols in an interleaving time period Tn/2 in the second channel interleaver 515 is transmitted to the transmission symbol producing unit 520. Also, turbo interleaver data string is obtained by performing a turbo interleaving operation for the string of input X'i in the interleaving time period Tn in the turbo interleaver 516, a string of error correction coded symbols obtained by performing an error correction coding for the turbo interleaver data string in the second error correction coding unit 517 is punctured in the second symbol puncturing unit 518 to eliminate all even-numbered symbols from the string of error correction coded symbols and to produce a string of second punctured symbols, and a string of third coded symbols Ybi obtained by performing a channel interleaving operation for the string of second punctured symbols in the interleaving time period Tn/2 in the third channel interleaver 519 is transmitted to the transmission symbol producing unit 520. Because the string of third coded symbols Ybi is turbo-interleaved, the transmission of the string of third coded symbols Ybi to the producing unit 520 is delayed by one frame time period as compared with the transmission of both the string of first coded symbols Xi and the string of second coded symbols Yai. Also, because the strings of coded symbols Xi, Yai and Ybi are obtained by performing the channel interleaving operation, the transmission of the strings of coded symbols Xi, Yai and Ybi is delayed by one frame time period as compared with that in the modulation symbol producing timing shown in FIG. 22. Also, because the string of second coded symbols Yai and the third coded symbols Ybi are alternately punctured, the number of symbols in the string of second coded symbols Yai and the number of symbols in the third coded symbols Ybi are respectively half of the number of symbols in the string of first coded symbols Xi.

Thereafter, in the transmission symbol producing unit 520, a parallel-serial conversion is performed for the string of first coded symbols Xi, the string of second coded symbols Yai and the string of third coded symbols Ybi delayed by one frame time period in the order of Xi, Yai and Ybi for each frame time period to produce a string of first transmission symbols for each frame. In this case, because the symbols in the string of second coded symbols Yai and the symbols in the string of third coded symbols Ybi are halved, the parallel-serial conversion is performed while shortening a time width of each coded symbol Xi, Yai or Ybi to 1/2. Therefore, a coding rate in this modulation symbol producing timing is 1/2.

Thereafter, a QPSK modulation is performed for the string of first transmission symbols in the QPSK modulating unit 530, and a string of QPSK modulated symbols msq0, msq1, . . . , msqn is produced for each frame time period. Thereafter, the string of QPSK modulated symbols is multiplied by the orthogonal code C1, C3, . . . or Cn allocated to the string of QPSK modulated symbols in the orthogonal transformation performing unit 550 to produce a string of orthogonally coded modulated symbols, and the string of orthogonally coded modulated symbols is amplified with a prescribed gain value in the amplifying unit 560.

Also, in cases where the modulation symbol producing timing shown in FIG. 24 is adopted in the frame producing unit 570, the string of first transmission symbols is only produced in the transmission symbol producing unit 520.

FIG. 25 shows a fourth example of the production of the production of the string of first modulated symbols and the string of second modulated symbols in the frame producing unit 570 at a modulation symbol producing timing in which the channel interleaving operation is performed in the channel interleavers 512, 515 and 519 and the channel interleaving operation is performed in the symbol puncturing units 514 and 518.

In cases where the modulation symbol producing timing shown in FIG. 25 is adopted in the frame producing unit 570, a string of first coded symbols Xi obtained by performing a channel interleaving operation for the string of input X'i in the interleaving time period Tn in the first channel interleaver 512 is transmitted to the transmission symbol producing unit 520. Also, a string of error correction coded symbols obtained by performing an error correction coding for the string of input X'i in the first error correction coding unit 513 is punctured in the first symbol puncturing unit 514 to eliminate all odd-numbered symbols from the string of error correction coded symbols and to produce a string of first punctured symbols, and a string of second coded symbols Yai obtained by performing a channel interleaving operation for the string of first punctured symbols in the interleaving time period Tn/2 in the second channel interleaver 515 is transmitted to the transmission symbol producing unit 520. Also, turbo interleaver data string is obtained by performing a turbo interleaving operation for the string of input X'i in the interleaving time period Tn in the turbo interleaver 516, a string of error correction coded symbols obtained by performing an error correction coding for the turbo interleaver data string in the second error correction coding unit 517 is punctured in the second symbol puncturing unit 518 to eliminate all even-numbered symbols from the string of error correction coded symbols and to produce a string of second punctured symbols, and a string of third coded symbols Ybi obtained by performing a channel interleaving operation for the string of second punctured symbols in the interleaving time period Tn/2 in the third channel interleaver 519 is transmitted to the transmission symbol producing unit 520. Because the string of third coded symbols Ybi is turbo-interleaved, the transmission of the string of third coded symbols Ybi to the producing unit 520 is delayed by one frame time period as compared with the transmission of both the string of first coded symbols Xi and the string of second coded symbols Yai. Also, because the strings of coded symbols Xi, Yai and Ybi are obtained by performing the channel interleaving operation, the transmission of the strings of coded symbols Xi, Yai and Ybi is delayed by one frame time period as compared with that in the modulation symbol producing timing shown in FIG. 22. Also, because the string of second coded symbols Yai and the third coded symbols Ybi are alternately punctured, the number of symbols in the string of second coded symbols Yai and the number of symbols in the third coded symbols Ybi are respectively half of the number of symbols in the string of first coded symbols Xi.

Thereafter, in the transmission symbol producing unit 520, a parallel to serial conversion is performed for the string of second coded symbols Yai and the string of third coded symbols Ybi delayed by one frame time period in the order of Yai and Ybi for each frame time period to produce a string of first transmission symbols for each frame. Also, the string of first coded symbols Xi is output as a string of second transmission symbols for each frame. In this case, because the symbols in the string of second coded symbols Yai and the symbols in the string of third coded symbols Ybi are halved, the parallel-serial conversion is performed while shortening a time width of each coded symbol Xi, Yai or Ybi to 1/2. Therefore, a coding rate in this modulation symbol producing timing is 1/2.

Thereafter, a QPSK modulation is performed for the string of first transmission symbols in the QPSK modulating unit 535, and a string of first modulated symbols msq0, msq1, . . . , msqn is produced for each frame time period. Thereafter, the string of first modulated symbols is multiplied by the orthogonal code C2A allocated to the string of first modulated symbols in the orthogonal transformation performing unit 533A to produce a string of orthogonally coded modulated symbols, and the string of orthogonally coded modulated symbols is amplified with a prescribed gain value in the amplifying unit 534A. Also, a BPSK modulation is performed for the string of second transmission symbols in the BPSK modulating unit 531, and a string of second modulated symbols msb0, msb1, . . . , msbn is produced for each frame time period. Thereafter, the string of second modulated symbols is multiplied by the orthogonal code C2B allocated to the string of second modulated symbols in the orthogonal transformation performing unit 533B to produce a string of orthogonally coded modulated symbols, and the string of orthogonally coded modulated symbols is amplified with a prescribed gain value in the amplifying unit 534B.

Thereafter, the strings of orthogonally coded modulated symbols and a string of modulated symbols of the pilot signal orthogonally coded and amplified are multiplexed in the multiplexing unit 503 while adjusting a multiplying timing to hold the orthogonality in the modulated symbols, a spread spectrum is performed with the PN code sequence for the modulated symbols in the spread spectrum performing unit 504, and a DD-SS signal spectrum-spread is output from the spread spectrum performing unit 504.

The DS-SS signal output from the spread spectrum signal transmitting apparatus 500 is received in a spread spectrum signal receiving apparatus as a receiving signal. The receiving signal is composed of a plurality of incoming data waves, which are originated in each piece of transmission data and pass through different propagation paths, and a plurality of incoming pilot waves which are originated in the pilot signal and pass through the different propagation paths.

Also, channel information, in which the number of code channels corresponding to pieces of transmission data transmitted from the spread spectrum signal transmitting apparatus 500, a transmission electric power of one piece of transmission data for each code channel, an importance degree for the piece of transmission data transmitted through each code channel, information of the pilot channel and a multiplexing type (such as a frequency division multiplex, a time division multiplex or a code division multiplex) used in the orthogonal transformation performing units 113 and 116 are included, is transmitted from the spread spectrum signal transmitting apparatus 500.

Accordingly, because the pilot signal originated in the known data is output at a high electric power from the spread spectrum signal transmitting apparatus 500, the incoming pilot waves can be received in the receiving apparatus at a superior synchronization with the incoming pilot waves, and conditions of the different propagation paths and an interference of pilot signals based on other users can be easily detected from the incoming pilot waves.

Also, not only each string of transmission symbols produced in the transmission symbol producing unit 520 is output as the transmission data of one code channel orthogonal to the other code channels, but also two strings of transmission symbols produced from one piece of transmission data corresponding to one data transfer rate, one communication quality and one importance degree in the transmission symbol producing unit 520 can be transmitted through two code channels orthogonal to each other. Therefore, the pieces of transmission data can be adaptively hierarchically transmitted according to an importance degrees of the pieces of transmission data, data transfer rates of the pieces of transmission data and conditions of propagation paths.

Also, in cases where the string of first coded symbols, the string of second coded symbols and the string of third coded symbols produced in the transmission symbol producing unit 520 are output through three code channels, each string of coded symbols can be demodulated independently of the other strings of coded symbols, an orthogonal code can be allocated for each string of coded symbols independently of the other strings of coded symbols, and each string of coded symbols can be amplified with a gain. Therefore, the pieces of transmission data can be adaptively hierarchically transmitted according to an importance degrees of the pieces of transmission data, data transfer rates of the pieces of transmission data and conditions of propagation paths.

Next, a spread spectrum signal receiving apparatus for receiving the spectrum-spread DD-SS signal transmitted from the spread spectrum signal transmitting apparatus 500 is described.

Figure 26:
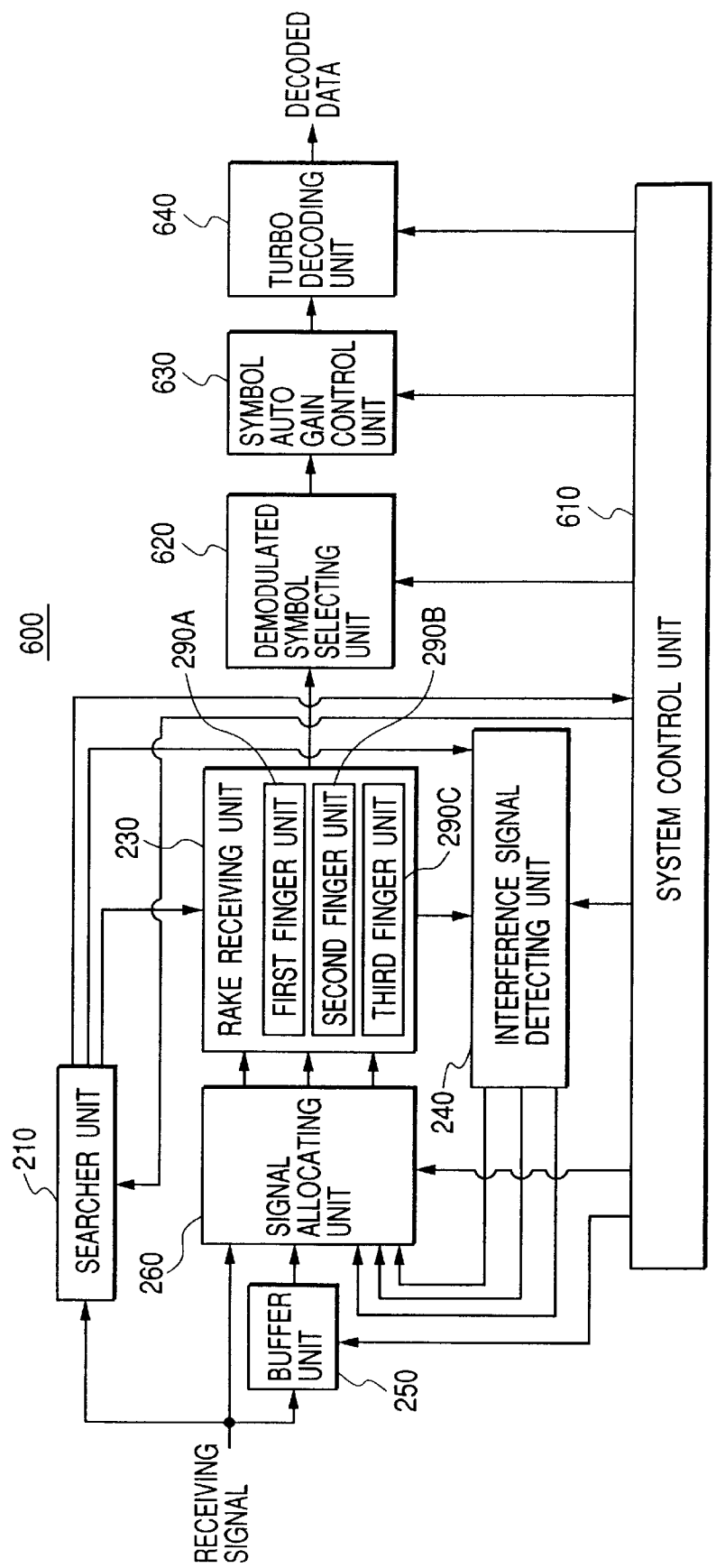
FIG. 26 is a block diagram of a spread spectrum signal receiving apparatus of the spread spectrum communication apparatus according to the third embodiment.

FIG. 26 is a block diagram of a spread spectrum signal receiving apparatus of the spread spectrum communication apparatus according to the third embodiment.

As shown in FIG. 26, a spread spectrum signal receiving apparatus 600, in which one input data string X'i processed in one frame producing unit 510 or 570 is reproduced, comprises:

the searcher unit 210; the RAKE receiving unit 230 having the finger units 290A, 290B and 290C; the interference signal detecting unit 240; the buffer unit 250; the signal allocating unit 260;

a demodulated symbol selecting unit 620 for dividing the RAKE demodulated symbol string produced in the RAKE receiving unit 230 into a string of first divided demodulation symbols corresponding to the first coded symbols Xi transmitted to the transmission symbol producing unit 520, a string of second divided demodulation symbols corresponding to the second coded symbols Yai transmitted to the transmission symbol producing unit 520 and a string of third divided demodulation symbols corresponding to the third coded symbols Ybi transmitted to the transmission symbol producing unit 520 for each frame time period and outputting the strings of divided demodulation symbols in synchronization with a symbol dividing timing produced from system information;

a symbol auto gain control (AGC) unit 630 for receiving the string of first divided demodulation symbols, the string of second divided demodulation symbols and the string of third divided demodulation symbols produced in the demodulated symbol selecting unit 620 for each frame time period, normalizing each string of divided demodulation symbols in a normalizing operation, in which an average of the symbols in the string is calculated for each predetermined average calculating time period (for example, the corresponding interleaving time period Tn or Tn/2) and the string of divided demodulation symbols is divided by the average, to remove a periodic change from the string of divided demodulation symbols and multiplying each string of divided demodulation symbols by a gain value adjusted according to the conditions of the propagation paths and the channel information produced from system information to produce a string of first demodulated symbols, a string of second demodulated symbols and a string of third demodulated symbols;

a turbo decoding unit 640 for performing a turbo decoding for the strings of demodulated symbols transmitted from the symbol AGC unit 630 to reproduce decoded data; and a system control unit 610 for judging whether or not an interference removing operation is performed in the RAKE receiving unit 230 according to the channel information (including the number of code channels corresponding to the transmission data transmitted from the spread spectrum signal transmitting apparatus 500, a transmission electric power of the transmission data for each code channel, an importance degree for the transmission data transmitted through each code channel, information of the pilot channel and a multiplexing type such as a frequency division multiplex, a time division multiplex or a code division multiplex used in the spread spectrum signal transmitting apparatus 500, the number of code channels to be processed in the RAKE receiving unit 230, the interleaving time period Tn, the interleaving time period Tn/2, information of the channel interleaving operation performed in the spread spectrum signal transmitting apparatus 500 for each string of coded symbols, the channel interleaving pattern and information of the symbol puncturing operation performed in the symbol puncturing units 514 and 518), allocating a single particular code channel to the finger units 290A, 290B and 290C in cases where one string of modulated symbols corresponding to the single particular code channel is produced from one string of transmission symbols obtained from the input data string X'i in one frame reproducing unit 510, allocating a plurality of particular code channels to the finger units 290A, 290B and 290C in cases where a plurality of strings of modulated symbols corresponding to the particular code channels are produced from a plurality of strings of transmission symbols obtained from the input data string X'i in one frame reproducing unit 570 or the like, determining the number of interference removing operations performed in the RAKE receiving unit 230, setting an iteration number K corresponding to the number of decoding operations repeated in the turbo decoding unit 640 for each frame time period, producing the system information to be transmitted to the demodulated symbol selecting unit 620, the symbol AGC unit 630 and the turbo decoding unit 640 according to the channel information, the conditions of the propagation paths indicated by the searcher detecting signal produced in the searcher unit 210, and controlling signal receiving and processing operations of the searcher unit 210, the RAKE receiving unit 230, the interference signal detecting unit 240, the buffer unit 250, the signal allocating unit 260, the demodulated symbol selecting unit 620, the symbol AGC unit 630 and the turbo decoding unit 640 according to the channel information, the conditions of the propagation paths indicated by the searcher detecting signal produced in the searcher unit 210 and the conditions of the propagation paths indicated by the reference signals produced in the RAKE receiving unit 230.

Figure 27:
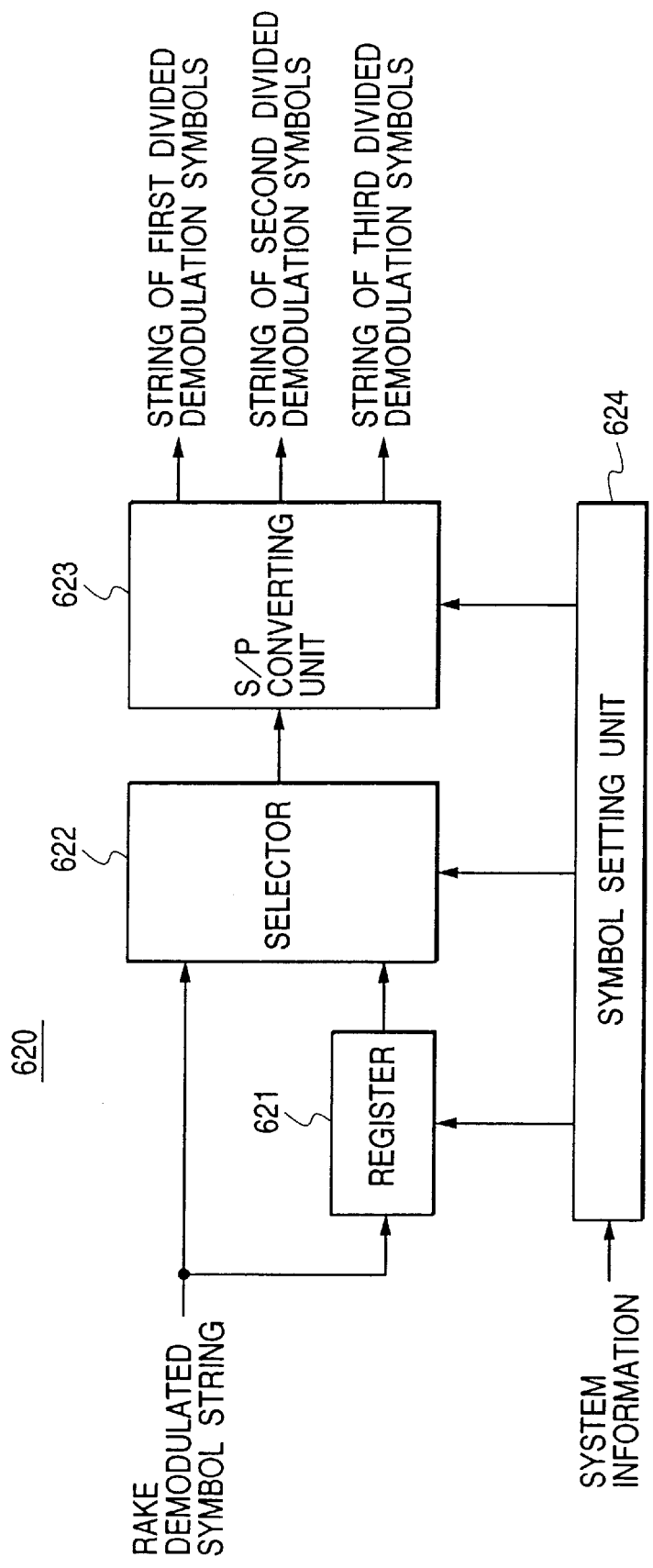
FIG. 27 is a block diagram of a demodulated symbol selecting unit of the spread spectrum signal receiving apparatus shown in FIG. 26.

FIG. 27 is a block diagram of the demodulated symbol selecting unit 620.

As shown in FIG. 27, the demodulated symbol selecting unit 620 comprises:

a register 621 for registering the RAKE demodulated symbol string output from the RAKE receiving unit 230;

a selector 622 for selecting either the RAKE demodulated symbol string output from the RAKE receiving unit 230 or a delayed RAKE demodulated symbol string read out from the register 621;

a serial-parallel (S/P) converting unit 623 for dividing the RAKE demodulated symbol string output from the selector 622 in series into the string of first divided demodulation symbols, the string of second divided demodulation symbols and the string of third divided demodulation symbols arranged in parallel to each other; and a symbol setting unit 624 for controlling the register 621, the selector 622 and the S/P converting unit 623 to divide the RAKE demodulated symbol string into three strings of divided demodulation symbols, according to system information transmitted from the system control unit 610.

Figure 28:
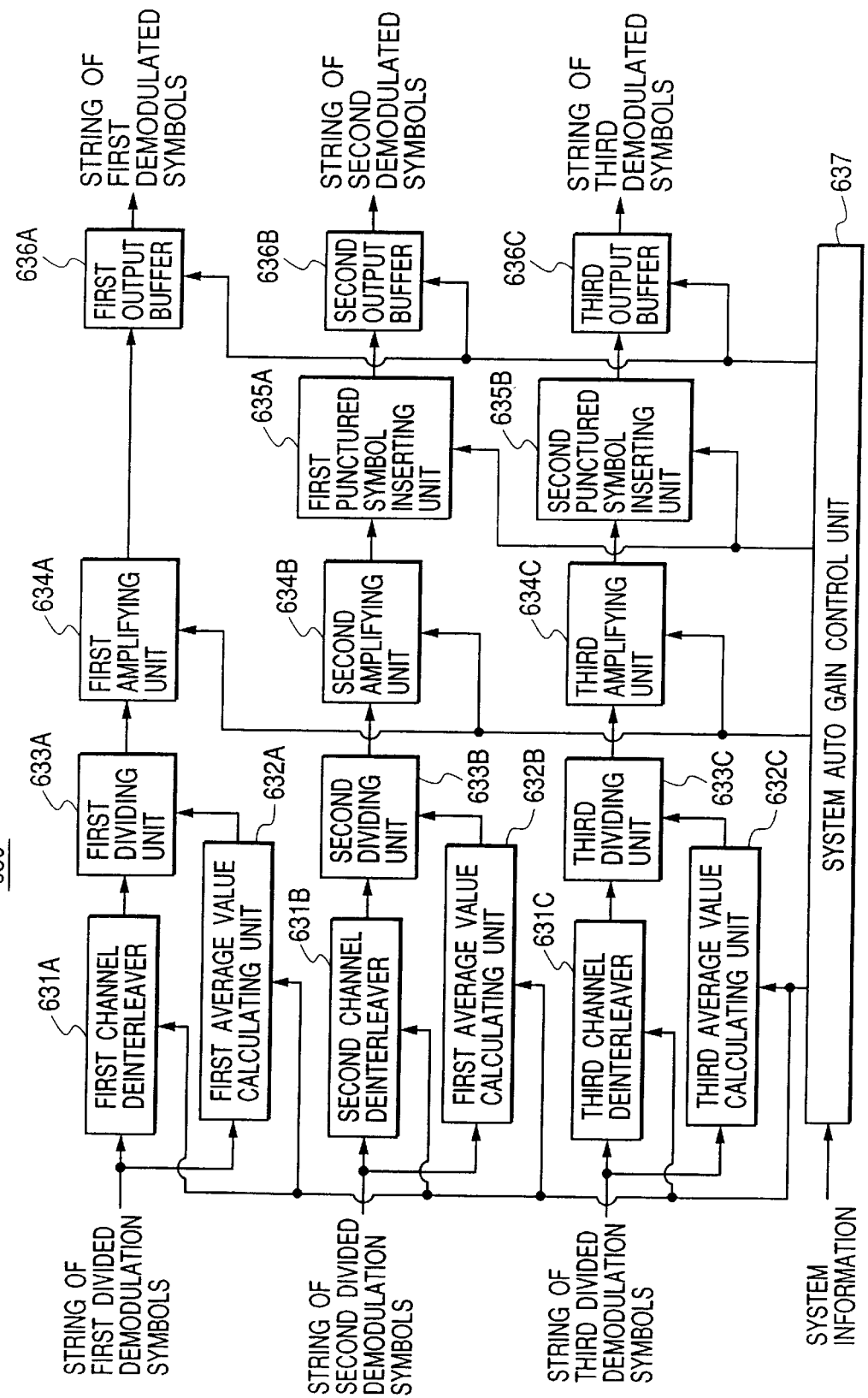
FIG. 28 is a block diagram of a symbol auto gain control (AGC) unit of the spread spectrum signal receiving apparatus shown in FIG. 26.

FIG. 28 is a block diagram of the symbol AGC unit 630.

As shown in FIG. 28, the symbol AGC unit 630 comprises:

a first channel deinterleaver 631A for holding the string of first divided demodulation symbols of each frame transmitted from the S/P converting unit 623 in cases where the channel interleaving operation is not performed for the string of first coded symbols Xi in the predetermined average calculating time period in the transmitting apparatus 500, performing a channel deinterleaving operation corresponding to the channel interleaving pattern for the string of first divided demodulation symbols of each frame in cases where the channel interleaving operation is performed for the string of first coded symbols Xi in the first channel interleaver 512 of the transmitting apparatus 500 in the predetermined average calculating time period (that is, the interleaving time period Tn);

a second channel deinterleaver 631B for holding the string of second divided demodulation symbols of each frame transmitted from the S/P converting unit 623 in cases where the channel interleaving operation is not performed for the string of second coded symbols Yai in the predetermined average calculating time period in the transmitting apparatus 500, performing a channel deinterleaving operation corresponding to the channel interleaving pattern for the string of second divided demodulation symbols of each frame in cases where the channel interleaving operation is performed for the string of second coded symbols Yai in the second channel interleaver 515 of the transmitting apparatus 500 in the predetermined average calculating time period (that is, the corresponding interleaving time period Tn or Tn/2);

a third channel deinterleaver 631C for holding the string of third divided demodulation symbols of each frame transmitted from the S/P converting unit 623 in cases where the channel interleaving operation is not performed for the string of third coded symbols Ybi in the predetermined average calculating time period in the transmitting apparatus 500, performing a channel deinterleaving operation corresponding to the channel interleaving pattern for the string of third divided demodulation symbols of each frame in cases where the channel interleaving operation is performed for the string of third coded symbols Ybi in the third channel interleaver 519 of the transmitting apparatus 500 in the predetermined average calculating time period (that is, the corresponding interleaving time period Tn or Tn/2);

a first average value calculating unit 632A for calculating an average value of the symbols in the string of first divided demodulation symbols of each frame transmitted from the S/P converting unit 623;

a second average value calculating unit 632B for calculating an average value of the symbols in the string of second divided demodulation symbols of each frame transmitted from the S/P converting unit 623;

a third average value calculating unit 632C for calculating an average value of the symbols in the string of third divided demodulation symbols of each frame transmitted from the S/P converting unit 623;

a first dividing unit 633A for dividing each first divided demodulation symbol of the string of first divided demodulation symbols output from the first channel deinterleaver 631A by the average value calculated in the first average value calculating unit 632A to normalize the string of first divided demodulation symbols;

a second dividing unit 633B for dividing each second divided demodulation symbol of the string of second divided demodulation symbols output from the second channel deinterleaver 631B by the average value calculated in the second average value calculating unit 632B to normalize the string of second divided demodulation symbols;

a third dividing unit 633C for dividing each third divided demodulation symbol of the string of third divided demodulation symbols output from the third channel deinterleaver 631C by the average value calculated in the third average value calculating unit 632C to normalize the string of third divided demodulation symbols;

a first amplifying unit 634A for amplifying the string of first divided demodulation symbols normalized in the first dividing unit 633A with a first gain K1;

a second amplifying unit 634B for amplifying the string of second divided demodulation symbols normalized in the second dividing unit 633B with a second gain K2;

a third amplifying unit 634C for amplifying the string of third divided demodulation symbols normalized in the third dividing unit 633C with a third gain K3;

a first punctured symbol inserting unit 635A for inserting a plurality of puncture symbols Ps into a plurality of puncture positions of the string of second divided demodulation symbols output from the second amplifying unit 634B, in cases where the string of second coded symbols Yai is periodically punctured in the first symbol puncturing unit 514 of the transmitting apparatus 500, to obtain a string of second demodulated symbols in which the number of symbols is the same as that in the string of first coded symbols Xi;

a second punctured symbol inserting unit 635B for inserting a plurality of puncture symbols Ps into a plurality of puncture positions of the string of third divided demodulation symbols output from the third amplifying unit 634C, in cases where the string of third coded symbols Ybi is periodically punctured in the second symbol puncturing unit 518 of the transmitting apparatus 500, to obtain a string of third demodulated symbols in which the number of symbols is the same as that in the string of first coded symbols Xi;

a first output buffer 636A for holding the string of first divided demodulation symbols amplified in the first amplifying unit 634A for each frame and outputting the string of first divided demodulation symbols as a string of first demodulated symbols according to a turbo decoding timing;

a second output buffer 636B for holding the string of second demodulated symbols depunctured in the first punctured symbol inserting unit 635A for each frame and outputting the string of second demodulated symbols according to the turbo decoding timing;

a third output buffer 636C for holding the string of third demodulated symbols depunctured in the second punctured symbol inserting unit 635B for each frame and outputting the string of third demodulated symbols according to the turbo decoding timing; and a symbol AGC control unit 637 for setting values of the gains K1, K2 and K3 according to the conditions of the propagation paths and the channel information to control the amplifying units 634A, 634B and 634C, specifying the puncture positions of the string of second divided demodulation symbols and the puncture positions of the string of third divided demodulation symbols according to the information of the symbol puncturing operation to control the punctured symbol inserting units 635A and 635B, setting the turbo decoding timing according to the iteration number K transmitted from the system control unit 610 to control symbol output operations of the output buffers 636A, 636B and 636C in synchronization with the turbo decoding timing, and control the channel deinterleaver 631A, 631B and 631C, the average value calculating units 632A, 632B and 632C and the dividing units 633A, 633B and 633C according to system information transmitted from the system control unit 610.

Because the strings of divided demodulation symbols are normalized in the dividing units 633A, 633B and 633C, even though levels of the divided demodulation symbols are changed with time because of an amplitude change based on fading, the interference based on a multi-path communication and/or the interference from signals of other users, levels of the divided demodulation symbols can be made to a constant value.

Figure 29:
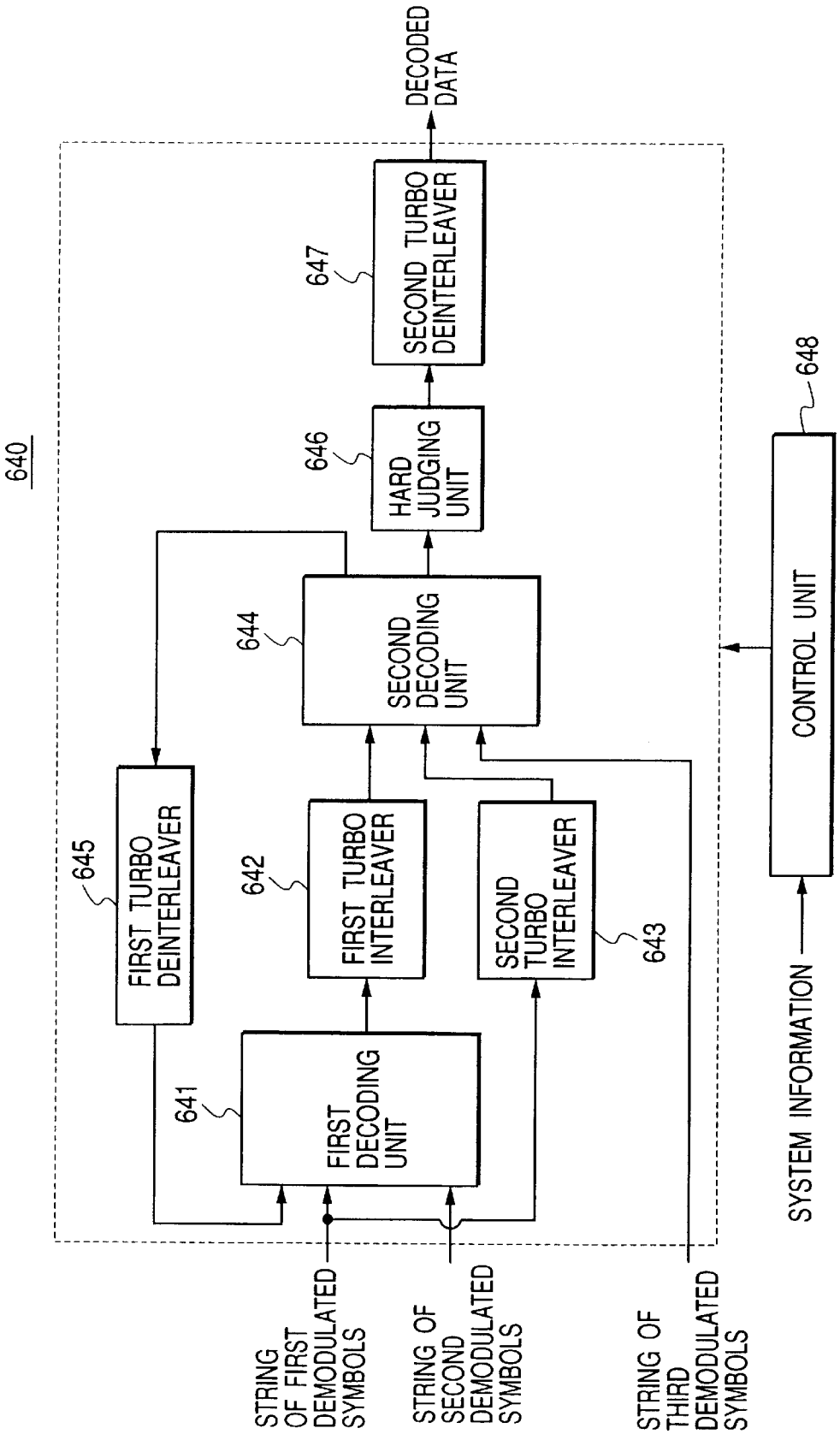
FIG. 29 is a block diagram of a turbo decoding unit of the spread spectrum signal receiving apparatus shown in FIG. 26.

FIG. 29 is a block diagram of the turbo decoding unit 640.

As shown in FIG. 29, the turbo decoding unit 640 comprises:

a first decoding unit 641 for performing a first decoding operation called Maximum A Posteriori probability (MAP) for the string of first demodulated symbols output from the first output buffer 636A and the string of second demodulated symbols output from the second output buffer 636B to output a priori information probability, and performing following decoding operations of the MAP for the string of first demodulated symbols, the string of second demodulated symbols and a turbo-deinterleaved priori information probability to output a priori information probability for each decoding operation, the decoding operation being repeated by the iteration number K;

a first turbo interleaver 642 for performing a turbo interleaving operation for the priori information probability output from the first decoding unit 641 to produce a turbo-interleaved priori information probability each time the priori information probability is received;

a second turbo interleaver 643 for performing a turbo interleaving operation for the string of first demodulated symbols each time the decoding operation is performed in the first decoding unit 641;

a second decoding unit 644 for performing a decoding operation of the MAP for the turbo-interleaved priori information probability produced in the first turbo interleaver 642, the string of first demodulated symbols processed in the second turbo interleaver 643 and the string of third demodulated symbols output from the third output buffer 636C each time the decoding operation is performed in the first decoding unit 641 to produce a decoded priori information probability for each decoding operation and performing the final decoding operation according to a Soft Output Viteri Algorithm (SOVA) to produce soft judgement decoded data, the string of third coded symbols corresponding to the string of third demodulated symbols being turbo-interleaved in the turbo interleaver 516;

a first turbo deinterleaver 645 for performing a turbo deinterleaving operation for the decoded priori information probability produced in the second decoding unit 644 each time the priori information probability is received and outputting the turbo-deinterleaved priori information probability to the first decoding unit 641;

a hard judging unit 646 for performing a hard judgement for the soft judgement decoded data output from the second decoding unit 644 to produce hard judgement decoded data expressed by binary data;

a second turbo deinterleaver 647 for performing a turbo deinterleaving operation for the hard judgement decoded data produced in the hard judging unit 646 and outputting decoded data indicating the reproduction of one or more strings of input data X'i corresponding to transmission data of one or more particular code channels allocated to the finger units 290A, 290B and 290C; and a control unit 648 for receiving the iteration number K from the system control unit 610, controlling the decoding units 641 and 644, the turbo interleavers 642 and 643 and the first turbo deinterleaver 645 to repeatedly perform the turbo decoding operation by the iteration number K, and controlling the decoding units 641 and 644, the turbo interleavers 642 and 643, the tubo deinterleavers 645 and 647 and the hard judging unit 646 according to system information transmitted from the system control unit 610 to perform the turbo decoding for the strings of demodulated symbols.

In the above configuration, a single particular code channel is allocated to the finger units 290A, 290B and 290C under the control of the system control unit 610 according to the channel information in cases where one string of modulated symbols corresponding the single particular code channel is produced from one input data string X'i processed in one frame producing unit 510. Also, a plurality of particular code channels is allocated to the finger units 290A, 290B and 290C under the control of the system control unit 610 according to the channel information in cases where a plurality of strings of modulated symbols corresponding the particular code channels are produced from one input data string X'i processed in one frame producing unit 570 or the like. Also, the number of interference removing operations performed before a RAKE demodulated symbol string is produced in the RAKE receiving unit 230 is determined under the control of the system control unit 610 according to the channel information.

An operation of the spread spectrum signal receiving apparatus 600 performed at a demodulated symbol producing timing is described with reference to FIG. 30, FIG. 31, FIG. 32 and FIG. 33 on condition that the channel interleaving operation is performed in the channel interleavers 512, 515 and 519 to obtain the strings of coded symbols.

FIG. 30 shows a first example of the production of the strings of demodulated symbols from the RAKE demodulated symbol string at a demodulated symbol producing timing on condition that any interference removing operation is not performed in the RAKE receiving unit 230 or any symbol puncturing operation is not performed in any of the symbol puncturing units 514 and 518.

As shown in FIG. 30, a RAKE demodulated symbol string agreeing with the string of first transmission symbols shown in FIG. 23 is obtained in the RAKE receiving unit 230 for each frame, and the RAKE demodulated symbols of the string are serially input to the demodulated symbol selecting unit 620. Because one first demodulated symbol Xi, one second demodulated symbol Yai and one third demodulated symbol Ybi arranged in that order $X_i$-$Ya_i$-$Yb_i$ in a normal condition are repeatedly arranged in the RAKE demodulated symbol string, the demodulated symbols arranged in the repetition of the order X-$Ya_i$-$Tb_i$ are serially input to the demodulated symbol selecting unit 620. In the unit 620, the serial-parallel conversion is performed for the RAKE demodulated symbol string, so that the RAKE demodulated symbol string is divided into a string of first divided demodulation symbols Xi corresponding to the string of first coded symbols Xi shown in FIG. 23, a string of second divided demodulation symbols Yai corresponding to the string of second coded symbols Yai shown in FIG. 23 and a string of third divided demodulation symbols Ybi corresponding to the string of third coded symbols Ybi shown in FIG. 23 for each frame. Because the turbo interleaving operation is performed to obtain the string of third coded symbols Ybi, the string of third divided demodulation symbols Ybi is delayed by one frame time period as compared with the string of first divided demodulation symbols Xi and the string of second divided demodulation symbols Yai. Thereafter, the string of first divided demodulation symbols Xi, the string of second divided demodulation symbols Yai and the string of third divided demodulation symbols Ybi are output from the S/P converting unit 623 for each frame. In this case, a time width of each symbol in the strings of divided demodulation symbols is expanded to an expanded time width which is three times the time width of each symbol in the RAKE demodulated symbol string.

Thereafter, the string of first divided demodulation symbols Xi, the string of second divided demodulation symbols Yai and the string of third divided demodulation symbols Ybi output from the S/P converting unit 623 are input to the symbol AGC unit 630. In the symbol AGC unit 630, a channel deinterleaving operation is performed for the strings of divided demodulation symbols Xi, Yai and Ybi in the channel interleavers 631A, 631B and 631C, an average value of the first divided demodulation symbols Xi, of which the number is (n+1) and correspond to an interleaving length (which is equal to one frame time period), is calculated in the first average value calculating unit 632A, an average value of the second divided demodulation symbols Yai, of which the number is (n+1) and correspond to one interleaving length, is calculated in the second average value calculating unit 632B, and an average value of the third divided demodulation symbols Ybi, of which the number is (n+1) and correspond to one interleaving length, is calculated in the third average value calculating unit 632C. The string of first divided demodulation symbols Xi channel-interleaved is divided by its average value in the first dividing unit 633A to normalize the string of first divided demodulation symbols Xi in the interleaving length for each frame, the string of second divided demodulation symbols Yai channel-interleaved is divided by its average value in the second dividing unit 633B to normalize the string of second divided demodulation symbols Yai in the interleaving length for each frame, and the string of third divided demodulation symbols Ybi channel-interleaved is divided by its average value in the third dividing unit 633C to normalize the string of third divided demodulation symbols Ybi in the interleaving length for each frame. The strings of divided demodulation symbols Xi, Yai and Ybi normalized are respectively amplified with a prescribed gain K1, K2 or K3 in the corresponding amplifying unit 634A, 634B or 634C, so that a string of first demodulated symbols Xi, a string of second demodulated symbols Yai and a string of third demodulated symbols Ybi are produced and are respectively held in the corresponding output buffer 636A, 636B or 636C for each frame. Because any symbol puncturing operation is not performed in any of the symbol puncturing units 514 and 518, any of the punctured symbol inserting units 635A and 635B is not operated.

Thereafter, each of the strings of demodulated symbols held in the output buffers 636A, 636B and 636C in a current frame time period is repeatedly output to the turbo decoding unit 640 in a frame time period succeeding to the current frame time period according to a turbo decoding timing for each current frame. In this case, an iteration number is set to K. Therefore, the output operation for each string of demodulated symbols is repeated K times for each frame time period.

Thereafter, one decoding operation is performed in the decoding units 641 and 644, the turbo interleavers 642 and 643 and the first turbo deinterleaver 645 of the turbo decoding unit 640 each time the string of first demodulated symbols, the string of second demodulated symbols and the string of third demodulated symbols are received in the turbo decoding unit 640. That is, the decoding operation is repeated by the iteration number K.

When the RAKE demodulated symbol string corresponding to the first frame X is produced in the RAKE receiving unit 230, because any of the RAKE demodulated symbols Ybi corresponding to the first frame X is not included in the RAKE demodulated symbol string corresponding to the first frame X but is included in the RAKE demodulated symbol string corresponding to the second frame X+1, the string of first divided demodulation symbols Xi and the string of second divided demodulation symbols Yai are produced in the same first frame X, the string of third divided demodulation symbols Ybi is produced in the second frame X+1 from the RAKE demodulated symbol string corresponding to the second frame X+1. Thereafter, the string of first demodulated symbols and the string of second demodulated symbols are produced in the second frame X+1 from the string of first divided demodulation symbols and the string of second divided demodulation symbols and are repeatedly transmitted K times to the turbo decoding unit 640 in the second frame X+1, and the string of third demodulated symbols is produced in the third frame X+2 from the string of third divided demodulation symbols and are repeatedly transmitted K times to the turbo decoding unit 640 in the third frame X+2.

FIG. 31 shows a second example of the production of the strings of demodulated symbols from the RAKE demodulated symbol string at a demodulated symbol producing timing on condition that any interference removing operation is not performed in the RAKE receiving unit 230 but the symbol puncturing operation is performed in the symbol puncturing units 514 and 518.

As shown in FIG. 31, a RAKE demodulated symbol string agreeing with the string of first transmission symbols shown in FIG. 24 is obtained in the RAKE receiving unit 230 for each frame, and the RAKE demodulated symbols of the string are serially input to the demodulated symbol selecting unit 620. Because one first demodulated symbol $X_{2j}$, one second demodulated symbol $Ya_{2j}$, one first demodulated symbol $X_{2j+1}$ and one third demodulated symbol $Yb_{2j+1}$ arranged in that order $X_{2j}$-$Ya_{2j}$-$X_{2j+1}$-$Yb_{2j+1}$ (j=0,1,2, . . . (n−1)/2) in a normal condition are repeatedly arranged in the RAKE demodulated symbol string, the demodulated symbols arranged in the repetition of the order $X_{2j}$-$Ya_{2j}$-$X_{2j+1}$-$Yb_{2j+1}$ are serially input to the demodulated symbol selecting unit 620. In the unit 620, the serial-parallel 1 conversion is performed for the RAKE demodulated symbol string, so that the RAKE demodulated symbol string is divided into a string of first divided demodulation symbols Xi corresponding to the string of first coded symbols Xi shown in FIG. 24, a string of second divided demodulation symbols Yai corresponding to the string of second coded symbols Yai shown in FIG. 24 and a string of third divided demodulation symbols Ybi corresponding to the string of third coded symbols Ybi shown in FIG. 24 for each frame. Because the turbo interleaving operation is performed to obtain the string of third coded symbols Ybi, the string of third divided demodulation symbols Ybi is delayed by one frame time period as compared with the string of first divided demodulation symbols Xi and the string of second divided demodulation symbols Yai. Also, the number of first divided demodulation symbols Xi is (n+1) for each frame, the number of second divided demodulation symbols Yai is (n+1)/2 for each frame because the odd-numbered second coded symbols are eliminated in the first symbol puncturing units 514, and the number of third divided demodulation symbols Ybi is (n+1)/2 for each frame because the even-numbered third coded symbols are eliminated in the second symbol puncturing units 518. Thereafter, the string of first divided demodulation symbols Xi, the string of second divided demodulation symbols Yai and the string of third divided demodulation symbols Ybi are output from the S/P converting unit 623 for each frame. In this case, a time width of each first divided demodulation symbol Xi is expanded to an expanded time width which is twice the time width of each symbol in the RAKE demodulated symbol string, and a time width of each second divided demodulation symbol Yai and a time width of each third divided demodulation symbol Ybi are respectively expanded to an expanded time width which is four times the time width of each symbol in the RAKE demodulated symbol string.

Thereafter, the string of first divided demodulation symbols Xi, the string of second divided demodulation symbols Yai and the string of third divided demodulation symbols Ybi output from the S/P converting unit 623 are input to the symbol AGC unit 630. In the symbol AGC unit 630, a channel deinterleaving operation is performed for the strings of divided demodulation symbols Xi, Yai and Ybi in the channel interleavers 631A, 631B and 631C, an average value of the first divided demodulation symbols Xi, of which the number is (n+1) and correspond to one interleaving length (which is equal to one frame time period), is calculated in the first average value calculating unit 632A, an average value of the second divided demodulation symbols Yai, of which the number is (n+1)/2 and correspond to half of one interleaving length, is calculated in the second average value calculating unit 632B, and an average value of the third divided demodulation symbols Ybi, of which the number is (n+1)/2 and correspond to half of one interleaving length, is calculated in the third average value calculating unit 632C. The string of first divided demodulation symbols Xi channel-interleaved is divided by its average value in the first dividing unit 633A to normalize the string of first divided demodulation symbols Xi in the interleaving length for each frame, the string of second divided demodulation symbols Yai channel-interleaved is divided by its average value in the second dividing unit 633B to normalize the string of second divided demodulation symbols Yai in the half interleaving length for each frame, and the string of third divided demodulation symbols Ybi channel-interleaved is divided by its average value in the third dividing unit 633C to normalize the string of third divided demodulation symbols Ybi in the half interleaving length for each frame. The string of first divided demodulation symbols Xi normalized is amplified with a prescribed gain K1 in the first amplifying unit 634A to produce a string of first demodulated symbols Xi, the string of second divided demodulation symbols Yai normalized is amplified with a prescribed gain K2 in the second amplifying unit 634B, a plurality of prescribed puncture symbols Ps are inserted into puncture positions in the string of second divided demodulation symbols Yai, which correspond to positions of the odd-numbered second coded symbols eliminated on the transmitting side, in the first puncture symbol inserting unit 635A to produce a string of second demodulated symbols Yai, the string of third divided demodulation symbols Ybi normalized is amplified with a prescribed gain K3 in the third amplifying unit 634C, and a plurality of prescribed puncture symbols Ps are inserted into puncture positions in the string of third divided demodulation symbols Ybi, which correspond to positions of the even-numbered third coded symbols eliminated on the transmitting side, in the second puncture symbol inserting unit 635B to produce a string of third demodulated symbols Ybi. The string of first demodulated symbols Xi, the string of second demodulated symbols Yai and the string of third demodulated symbols Ybi are respectively held in the corresponding output buffer 636A, 636B or 636C for each frame.

Thereafter, each of the strings of demodulated symbols held in the output buffers 636A, 636B and 636C in a current frame time period is repeatedly output to the turbo decoding unit 640 during a frame time period succeeding to the current frame time period according to a turbo decoding timing for each current frame. In this case, an iteration number is set to K. Therefore, the output operation for each string of demodulated symbols is repeated K times for each frame time period.

Thereafter, one decoding operation is performed in the decoding units 641 and 644, the turbo interleavers 642 and 643 and the first turbo deinterleaver 645 of the turbo decoding unit 640 each time the string of first demodulated symbols, the string of second demodulated symbols and the string of third demodulated symbols are received in the turbo decoding unit 640. That is, the decoding operation is repeated by the iteration number K.

When the RAKE demodulated symbol string corresponding to the first frame X is produced in the RAKE receiving unit 230, because any of the RAKE demodulated symbols Ybi corresponding to the first frame X is not included in the RAKE demodulated symbol string corresponding to the first frame X but is included in the RAKE demodulated symbol string corresponding to the second frame X+1, the string of first divided demodulation symbols Xi and the string of second divided demodulation symbols Yai are produced in the same first frame X, the string of third divided demodulation symbols Ybi is produced in the second frame X+1 from the RAKE demodulated symbol string corresponding to the second frame X+1. Thereafter, the string of first demodulated symbols and the string of second demodulated symbols are produced in the second frame X+1 from the string of first divided demodulation symbols and the string of second divided demodulation symbols and are repeatedly transmitted K times to the turbo decoding unit 640 in the second frame X+1, and the string of third demodulated symbols is produced in the third frame X+2 from the string of third divided demodulation symbols and are repeatedly transmitted K times to the turbo decoding unit 640 in the third frame X+2.

Figure 32:
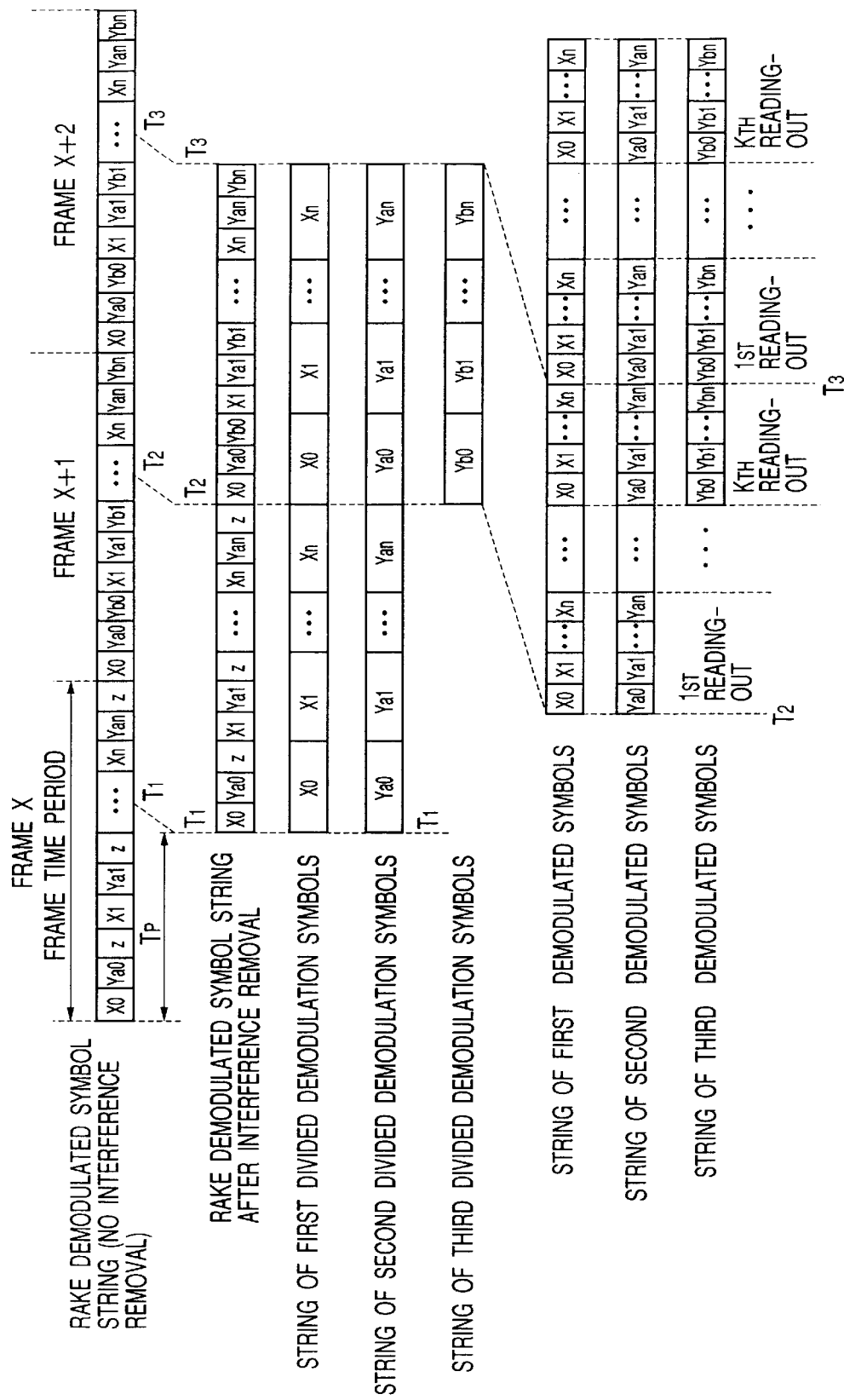
FIG. 32 shows a third example of the production of three strings of demodulated symbols from a string of RAKE demodulated symbols at a demodulated symbol producing timing on condition that any symbol puncturing operation is not performed but one or more interference removing operations is performed before the demodulation is performed for an interference removed received signal.

FIG. 32 shows a third example of the production of the strings of demodulated symbols from the RAKE demodulated symbol string at a demodulated symbol producing timing on condition that the symbol puncturing operation is not performed in any of the symbol puncturing units 514 and 518 but one or more interference removing operations is performed in the RAKE receiving unit 230 before the demodulation is performed for an interference removed received signal.

In the RAKE receiving unit 230, before the demodulation is performed for an interference removed received signal, one or more interference removing operations are performed to completely remove an interference signal from the receiving signal under the control of the system control unit 610, and a RAKE demodulated symbol string is produced from the interference removed received signal. In this case, any RAKE demodulated symbol string is not produced from an incompletely interference removed receiving signal, in which the interference signal is not completely removed, on the middle of the interference removing operations.

As shown in FIG. 32, because the RAKE demodulated symbol string is received in the demodulated symbol selecting unit 620 after the interference removing operations are completed in the RAKE receiving unit 230, the reception of the RAKE demodulated symbol string is delayed by an interference removing time period Tp required for the interference removing operations as compared with the reception of the RAKE demodulated symbol string according to the first example shown in FIG. 30. Thereafter, the string of first divided demodulation symbols, the string of second divided demodulation symbols, the string of third divided demodulation symbols, the string of first demodulated symbols, the string of second demodulated symbols and the string of third demodulated symbols are produced in the same manner as those produced according to the first example shown in FIG. 30 on condition that the production is delayed by the interference removing time period Tp.

Figure 33:
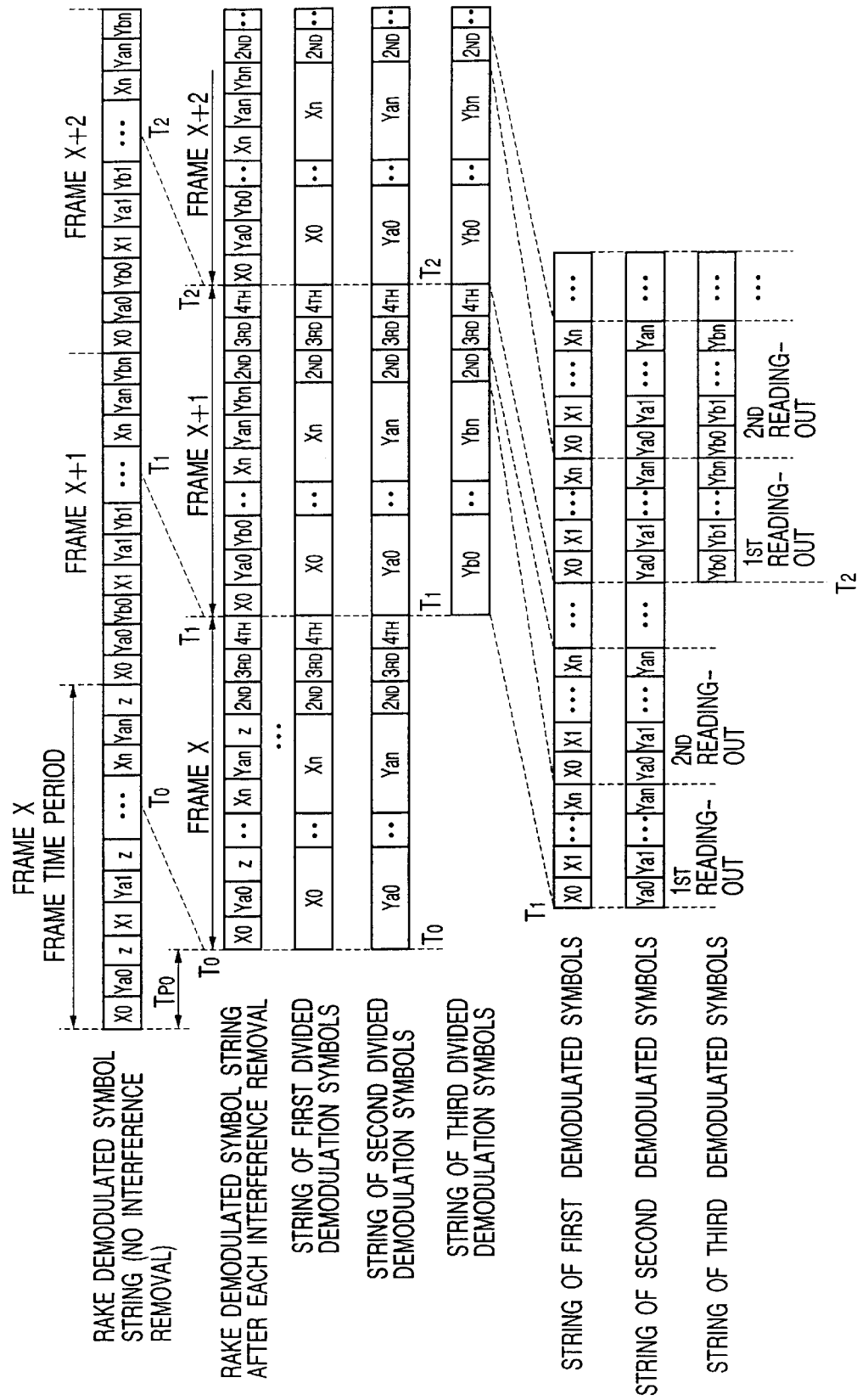
FIG. 33 shows a fourth example of the production of three strings of demodulated symbols from a string of RAKE demodulated symbols at a demodulated symbol producing timing on condition that any symbol puncturing operation is not performed but a string of RAKE demodulated symbols is produced from an incompletely interference removed receiving signal or an interference removed receiving signal each time one interference removing operation is performed.

FIG. 33 shows a fourth example of the production of the strings of demodulated symbols from the RAKE demodulated symbol string at a demodulated symbol producing timing on condition that the symbol puncturing operation is not performed in any of the symbol puncturing units 514 and 518 but a RAKE demodulated symbol string is produced from an incompletely interference removed receiving signal or an interference removed receiving signal each time one interference removing operation is performed in the RAKE receiving unit 230.

In the RAKE receiving unit 230, before the demodulation is performed for an interference removed received signal, four interference removing operations are, for example, performed under the control of the system control unit 610 to completely remove an interference signal from the receiving signal. Also, a RAKE demodulated symbol string is produced in the RAKE receiving unit 230 from an incompletely interference removed receiving signal each time one interference removing operation is completed before the final (that is, fourth) interference removing operation is performed, and a RAKE demodulated symbol string is produced in the RAKE receiving unit 230 from an interference removed receiving signal after the final interference removing operation is completed. In this case, each interference removing operation is performed at a clock which is four times as fast as a symbol rate.

As shown in FIG. 33, because a first RAKE demodulated symbol string is received in the demodulated symbol selecting unit 620 after the first interference removing operation is completed in the RAKE receiving unit 230, the reception of the first RAKE demodulated symbol string is delayed by an interference removing time period $Tp_0$ required for one interference removing operation as compared with the reception of the RAKE demodulated symbol string according to the first example shown in FIG. 30. Thereafter, a second RAKE demodulated symbol string is received in the demodulated symbol selecting unit 620 after the second interference removing operation is completed in the RAKE receiving unit 230, a third RAKE demodulated symbol string is received in the demodulated symbol selecting unit 620 after the third interference removing operation is completed in the RAKE receiving unit 230, and a fourth RAKE demodulated symbol string is received in the demodulated symbol selecting unit 620 after the final interference removing operation is completed in the RAKE receiving unit 230. Therefore, the RAKE demodulated symbols included in four strings of RAKE demodulated symbols are serially input in the demodulated symbol selecting unit 620 for each frame time period, and each RAKE demodulated symbol string is received in the demodulated symbol selecting unit 620 for each divided frame time period equal to 1/4 of one frame time period. The arrangement of the symbols in each RAKE demodulated symbol string agrees with that in the string of first transmission symbols shown in FIG. 23. Because one first demodulated symbol Xi, one second demodulated symbol Yai and one third demodulated symbol Ybi arranged in that order X-Ya$_i$-Tb$_i$ in a normal condition are repeatedly arranged in each RAKE demodulated symbol string, the demodulated symbols arranged in the repetition of the order X-Ya$_i$-Tb$_i$ are serially input to the demodulated symbol selecting unit 620. In the unit 620, the serial-parallel conversion is performed for each RAKE demodulated symbol string, so that each RAKE demodulated symbol string is divided into a string of first divided demodulation symbols Xi corresponding to the string of first coded symbols Xi shown in FIG. 23, a string of second divided demodulation symbols Yai corresponding to the string of second coded symbols Yai shown in FIG. 23 and a string of third divided demodulation symbols Ybi corresponding to the string of third coded symbols Ybi shown in FIG. 23 for each divided frame time period. Because the turbo interleaving operation is performed to obtain the string of third coded symbols Ybi, the string of third divided demodulation symbols Ybi is delayed by one frame time period as compared with the string of first divided demodulation symbols Xi and the string of second divided demodulation symbols Yai. Thereafter, the string of first divided demodulation symbols Xi, the string of second divided demodulation symbols Yai and the string of third divided demodulation symbols Ybi are output from the S/P converting unit 623 for each divided frame time period. In this case, a time width of each symbol in the strings of divided demodulation symbols is expanded to an expanded time width which is three times the time width of each symbol in the strings of RAKE demodulated symbols.

Thereafter, the strings of divided demodulation symbols output from the S/P converting unit 623 are input to the symbol AGC unit 630. In the symbol AGC unit 630, a channel deinterleaving operation is performed for the strings of divided demodulation symbols Xi, Yai and Ybi in the channel interleavers 631A, 631B and 631C, an average value of the divided demodulation symbols, of which the number is (n+1) and correspond to one interleaving length (which is equal to one divided frame time period), is calculated in the corresponding average value calculating unit 632A, 632B or 632C for each string, each string of divided demodulation symbols channel-interleaved is divided by its average value in the corresponding dividing unit 633A, 633B or 633C to normalize the string of divided demodulation symbols in the interleaving length for each divided frame time period. Thereafter, the strings of divided demodulation symbols Xi, Yai and Ybi normalized are respectively amplified with a prescribed gain K1, K2 or K3 in the corresponding amplifying unit 634A, 634B or 634C, so that a string of first demodulated symbols Xi, a string of second demodulated symbols Yai and a string of third demodulated symbols Ybi are produced and are respectively held in the corresponding output buffer 636A, 636B or 636C for each divided frame time period. In each output buffer 636A, 636B or 636C, the four strings of demodulated symbols corresponding to one frame are held for each frame. Because any symbol puncturing operation is not performed in any of the symbol puncturing units 514 and 518, any of the punctured symbol inserting units 635A and 635B is not operated.

The production of the strings of demodulated symbols from each of the four strings of RAKE demodulated symbols corresponding to the four interference removing operations performed for each frame is performed independently of the production of the strings of demodulated symbols from the other strings of RAKE demodulated symbols.

Thereafter, the string of first demodulated symbols, the string of second demodulated symbols and the string of third demodulated symbols corresponding to the first RAKE demodulated symbol string in a current frame time period is output from the output buffers 636A, 636B and 636C to the turbo decoding unit 640 in a succeeding frame time period following the current frame time period according to a first turbo decoding timing to perform a turbo decoding at a first iteration in the turbo decoding unit 640, the three strings of demodulated symbols corresponding to the second RAKE demodulated symbol string in the current frame time period is output from the output buffers 636A, 636B and 636C to the turbo decoding unit 640 in the succeeding frame time period according to a second turbo decoding timing to perform a turbo decoding at a second iteration in the turbo decoding unit 640, the three strings of demodulated symbols corresponding to the third RAKE demodulated symbol string in the current frame time period is output from the output buffers 636A, 636B and 636C to the turbo decoding unit 640 in the succeeding frame time period according to a third turbo decoding timing to perform a turbo decoding at a third iteration in the turbo decoding unit 640, and the three strings of demodulated symbols corresponding to the fourth RAKE demodulated symbol string in the current frame time period is output from the output buffers 636A, 636B and 636C to the turbo decoding unit 640 in the succeeding frame time period according to a fourth turbo decoding timing to perform a turbo decoding at a fourth iteration in the turbo decoding unit 640. The twelfth strings of demodulated symbols corresponding to the four strings of RAKE demodulated symbols are output to the turbo decoding unit 640 for each current frame.

Thereafter, the decoding operation is repeatedly performed four times (corresponding to the iteration number set to K=4) in the decoding units 641 and 644, the turbo interleavers 642 and 643 and the first turbo deinterleaver 645 of the turbo decoding unit 640.

When the RAKE demodulated symbol string corresponding to the first frame X is produced in the RAKE receiving unit 230, because any of the RAKE demodulated symbols Ybi corresponding to the first frame X is not included in the RAKE demodulated symbol string corresponding to the first frame X but is included in the RAKE demodulated symbol string corresponding to the second frame X+1, the string of first divided demodulation symbols Xi and the string of second divided demodulation symbols Yai are produced in the same first frame X, the string of third divided demodulation symbols Ybi is produced in the second frame X+1 from the RAKE demodulated symbol string corresponding to the second frame X+1. Thereafter, the string of first demodulated symbols and the string of second demodulated symbols are produced in the second frame X+1 from the string of first divided demodulation symbols and the string of second divided demodulation symbols and are transmitted to the turbo decoding unit 640 in the second frame X+1, and the string of third demodulated symbols is produced in the third frame X+2 from the string of third divided demodulation symbols and are transmitted to the turbo decoding unit 640 in the third frame X+2.

In this embodiment, the iteration number K indicating the number of turbo decoding operations performed in the turbo decoding unit 640 can be arbitrary set. Also, the number of interference removing operations is set to 4 in the fourth example shown in FIG. 33. However, the number of interference removing operations can be arbitrary set in the present invention.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A spread spectrum communication apparatus comprising:

a spread spectrum signal receiving means for receiving channel information from a spread spectrum signal transmitting means for receiving spread output data of code channels transmitted from the spread spectrum signal transmitting means as a received signal composed of a plurality of incoming waves transmitted through a plurality of propagation paths, the spread spectrum signal receiving means comprising:

searching means for searching the received signal for a plurality of specific incoming waves of a specific code channel according to channel information, whereby detecting a plurality of received electric powers of the specific incoming waves and a plurality of phase offsets of the specific incoming waves to search the received signal for conditions of their propagation paths, and for outputting a searcher detecting signal indicating the received electric powers of the specific incoming waves and the phase offsets of the specific incoming waves;

signal holding means for holding the received signal during an interference removing operation;

at least two finger units respectively having inverse code transforming means for detecting the received electric power of a particular incoming wave, which corresponds to a specific code channel and a particular phase offset allocated to the finger unit, from the signal that has been directly received from the spread spectrum signal transmitting means according to the channel information and the searcher detecting signal output from the searching means in the interference removing operation, specifying the spread code sequence and one particular distinguishing code corresponding to one particular code channel allocated to the finger unit according to the channel information, performing an inverse code transformation for the received signal with the particular distinguishing code and the spread code sequence in an interference removing demodulating operation to produce an inversely code transformed signal from the output data of the particular code channel distinguished by the particular distinguishing code, and demodulating means for demodulating the inversely code transformed signal produced by the inverse code transforming means to produce a finger demodulated symbol string of the particular code channel allocated to the finger unit;

interference electric power detecting means for selecting the specific code channel, with respect to which the specific incoming waves have a substantial interference removing effect, from the code channels according to the channel information, receiving the particular incoming waves from the finger units, receiving the specific incoming waves from the searching means, determining a plurality of weighting factors corresponding to all specific incoming waves of the specific code channel according to the received electric powers of the particular incoming waves and a plurality of received electric powers of one or more specific incoming waves other than the particular incoming waves, weighting the particular incoming waves and the specific incoming waves other than the particular incoming waves with the corresponding weighting factors, and performing a despread spectrum for the particular incoming waves other than one particular incoming wave detected in one finger unit and the specific incoming waves other than the particular incoming waves detected by all finger units with the spread code sequence corresponding to the phase offset of each particular incoming wave or specific incoming wave to produce an interference replica signal corresponding to the finger unit for each of the finger units;

signal allocating means for allocating the received signal directly transmitted from the spread spectrum signal transmitting apparatus to the finger units in the interference removing operation and allocating an interference removed received signal, which is obtained by subtracting the interference replica signal corresponding to one finger unit from the received signal held in the signal holding means, to the finger unit as the received signal in the interference removed demodulating operation for each of the finger units;

channel synthesizing means for synthesizing a demodulated symbol string from the finger demodulated symbol strings produced by the finger units;

decoding means for decoding the demodulated symbol string synthesized by the channel synthesizing means to reproduce the pieces of input data of the particular code channels allocated to the finger units; and control means for controlling the finger units, the interference electric power detecting means and the signal allocating means according to the channel information and the conditions of the propagation paths detected by the searching means to allocate the particular code channel to each finger unit according to the channel information, allocate the particular phase offset detected by the searching means to each finger unit, transmit the received signal directly transmitted from the spread spectrum signal transmitting means to the finger units in the interference removing operation and transmit the interference removed received signal produced by the interference electric power detecting means to the corresponding finger unit in the interference-removed demodulating operation for each of the interference-removed demodulating operations, wherein, in cases where the allocation of one particular code channel to all finger units is indicated by the channel information, the same particular code string corresponding to the particular code channel is selected from the code strings in the finger units according to the channel information under the control of the control means to perform an inverse code transformation with the same particular distinguishing code in each of the finger units, the phase offsets corresponding to the specific incoming waves detected by the searching means are allocated to the finger units in the order of decreasing of the received electric power of the specific incoming wave under the control of the control means, and the demodulation of a RAKE reception is performed in the finger units, and wherein, in cases where the allocation of a plurality of particular code channels to all finger units is indicated by the channel information, the particular distinguishing code corresponding to the particular code channel allocated to one finger unit is specified in the finger unit according to the channel information under the control of the control means for each of the finger units, a particular phase offset corresponding to the highest received electric power is selected from the phase offsets of the specific incoming waves detected by the searching means and is allocated to the finger units under the control of the control means, and the demodulations in the finger units are serially performed.

2. A spread spectrum communication apparatus according to claim 1, in which the channel information indicates a degree of importance of each code channel, and wherein the number of finger units, to which one particular code channel is allocated, depends on the degree of importance of the particular code channel.

3. A spread spectrum communication apparatus according to claim 1, in which the channel information indicates an importance degree of each code channel, and wherein the control means judges whether or not the interference removing operation for one particular code channel allocated to each finger unit is performed according to the importance degree of the particular code channel.

4. A spread spectrum communication apparatus according to claim 1, further comprising means for performing an interference removing operation for one finger unit as well as for each finger unit in cases where the control means judges, according to the channel information, that the received electric powers of the particular incoming waves other than one particular incoming wave detected in the finger unit and the received electric powers of the specific incoming waves other than the particular incoming waves detected by all finger units, have a substantial interference removing effect.

5. A spread spectrum communication apparatus according to claim 1, further comprising means to obtains transmission electric powers of the piece of output data transmitted through the code channels and means to multiplex the pieces of output data in the spread spectrum signal transmitting apparatus based on the channel information, wherein said control means comprises means for determining the specific code channel having a substantial interference removing effect from the other code channels according to the transmission electric powers of the piece of output data, and means for producing the interference replica signal from the specific incoming waves of the specific code channel by the interference electric power detecting means.

6. A spread spectrum communication apparatus according to claim 5, in which the piece of output data transmitted through the specific code channel has a highest transmission electric power value among those of the pieces of output data transmitted through the code channels.

7. A spread spectrum communication apparatus according to claim 1, in which the channel synthesizing means comprises:

weighting factor determining means for determining a weighting factor corresponding to the finger demodulated symbol string produced by each finger unit according to the received electric powers of the particular incoming waves detected by the finger units;

amplifying means for amplifying the finger demodulated symbol string produced by each finger unit with the corresponding weighting factor determined by the weighting factor determining means to produce a weighted finger demodulated symbol string for each finger unit;

timing determining means for determining a synthesizing timing for the weighted finger demodulated symbol string obtained by the amplifying means according to the particular phase offset allocated to each finger unit;

adding means for adding the weighted finger demodulated symbol strings obtained by the amplifying means according to the synthesizing timing corresponding to each finger unit in the demodulation of the RAKE reception to produce and output a first synthesized demodulated symbol string; and in response to inputs from the amplifying means, parallel to serial converting means, is adapted to serially connect the weighted finger demodulated symbol strings obtained by the amplifying means, according to the synthesizing timing corresponding to each finger unit in the demodulation of the plural code channel, to produce a second synthesized demodulated symbol string, that serially connects the first synthesized demodulated symbol string produced by the adding means, with the second synthesized demodulated symbol string according to the synthesizing timing corresponding to each finger unit, the demodulation of the RAKE reception and the demodulation of the plural code channel are added to each other to produce a third synthesized demodulated symbol string, and wherein the -first synthesized demodulated symbol string, the second synthesized demodulated symbol string or the third synthesized demodulated symbol string is adapted to be selected by a selecting means and the thus selected string is decoded by the decoding means.

8. A spread spectrum communication apparatus, comprising:

a plurality of finger units, each finger unit having means to despread a spectrum of received data of one code channel allocated to the finger unit, and inverse code transformation performing means for inversely performing the code transformation on the received data output from the spectrum despreading means to produce a finger demodulated symbol string corresponding to the finger unit;

channel synthesizing means for synthesizing a demodulated symbol string from the finger demodulated symbol strings produced by the plurality of finger units;

interference replica signal producing means for producing an interference replica signal functioning as an interference signal for the demodulation of the transmission data processed in the plurality of finger units for each finger unit;

received signal storing means for storing a received signal in which pieces of received data of the plurality of code channels are included; and signal allocating means for selecting the received data to be allocated to each finger unit from the signal directly received from a transmitting apparatus in an interference removing operation, selecting the received data to be allocated to each finger unit from the received signal stored in the received signal storing means in a demodulating operation and allocating the received data to each finger unit in the interference removing operation and the demodulating operation, further comprising:

means for performing the interference removing operation and the demodulation of a RAKE reception and for synthesizing the demodulated symbol string performed by the channel synthesizing means for each code channel, and means for repeating the interference removing operation and the outputting of the received data, read out from the received signal storing means, to each finger unit through the signal allocating means until the pieces of received data of all code channels are demodulated.

* * * * *

UNITED STATES PATENT AND TRADEMARK OFFICE
CERTIFICATE OF CORRECTION

PATENT NO. : 6,795,488 B1
DATED : September 21, 2004
INVENTOR(S) : Naohiko Iwakiri It is certified that error appears in the above-identified patent and that said Letters Patent is hereby corrected as shown below:

Title page,
Item [73], Assignee, change "YRP Mobile Telecommunications Key Technology Research Laboratories Co., LTD. Tokyo (JP)" to -- YRP Mobile Telecommunications Key Technology Research Laboratories Co., LTD. Yokosuka-Shi, Kanagawa-Ken, (JP) --
Item [56], References Cited, U.S. PATENT DOCUMENTS, change "6,157,685 A * 12/2000 Tanaka et al. 375/148" to -- 6,157,685 A * 12/2000 Tanaka et al. 375/346 --; and change "6,473,415 B1 * 10/2002 Kim et al. 375/346" to -- 6,473,415 B1 * 10/2002 Kim et al. 375/148 --

Column 89,
Line 41, insert a comma -- , -- after "waves"
Line 48, change "obtains" to -- obtain --;
Line 49, change "powers" to -- power -- and
Line 56, change "powers" to -- power --;

Column 90,
Line 3, after "string" insert a comma -- , --; and
Line 38, delete the dash "-"

Signed and Sealed this

Nineteenth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,795,488 B1  Page 1 of 1
DATED : September 21, 2004
INVENTOR(S) : Naochiko Iwakiri It is certified that error appears in the above-identified patent and that said Letters Patent is hereby corrected as shown below:

<u>Column 90,</u>
Line 31, after "string" insert a comma -- , --.

Signed and Sealed this

Twenty-fifth Day of April, 2006

JON W. DUDAS
*Director of the United States Patent and Trademark Office*